(12) United States Patent
Glesinger et al.

(10) Patent No.: US 12,430,508 B2
(45) Date of Patent: Sep. 30, 2025

(54) SEMANTIC-BASED NAVIGATION OF TEMPORALLY SEQUENCED CONTENT

(71) Applicants: Jon Glesinger, Boulder, CO (US); Leslie Ackerman Glesinger, Boulder, CO (US); Jonathan Edward Jahlin Rowley, Houston, TX (US); Steven Dennis Flinn, Sugar Land, TX (US)

(72) Inventors: Jon Glesinger, Boulder, CO (US); Leslie Ackerman Glesinger, Boulder, CO (US); Jonathan Edward Jahlin Rowley, Houston, TX (US); Steven Dennis Flinn, Sugar Land, TX (US)

(73) Assignee: ManyWorlds, Inc., Brenham, TX (US)

( * ) Notice: Subject to any disclaimer, the term of this patent is extended or adjusted under 35 U.S.C. 154(b) by 168 days.

(21) Appl. No.: 17/953,569

(22) Filed: Sep. 27, 2022

(65) Prior Publication Data
US 2023/0140125 A1 May 4, 2023

Related U.S. Application Data

(60) Provisional application No. 63/273,328, filed on Oct. 29, 2021.

(51) Int. Cl.
*G06F 40/279* (2020.01)
*G06N 3/045* (2023.01)
*G06N 3/08* (2023.01)
*G06V 10/82* (2022.01)
*G06V 20/40* (2022.01)
*G10L 13/02* (2013.01)
(Continued)

(52) U.S. Cl.
CPC ........... *G06F 40/279* (2020.01); *G06N 3/045* (2023.01); *G06N 3/08* (2013.01); *G06V 10/82* (2022.01); *G06V 20/41* (2022.01); *G06V 20/47* (2022.01); *G10L 13/02* (2013.01); *G06F 16/71* (2019.01); *G06F 40/30* (2020.01); *G10L 15/25* (2013.01)

(58) Field of Classification Search
CPC ........ G06F 40/279; G06F 16/71; G06F 40/30; G06N 3/045; G06N 3/08; G06V 10/82; G06V 20/41; G06V 20/47; G10L 13/02; G10L 15/25
USPC .......................................................... 704/9
See application file for complete search history.

(56) References Cited

U.S. PATENT DOCUMENTS 10,510,018 B2 * 12/2019 Flinn ...................... G06F 40/216
10,997,240 B1 * 5/2021 Aschner ................ H04L 67/535
(Continued)

FOREIGN PATENT DOCUMENTS

CN 113807183 B * 6/2024 ............ G06F 18/211
EP 3885966 A1 * 9/2021 ............ G06F 40/56
(Continued)

*Primary Examiner* — Edwin S Leland, III

(57) ABSTRACT

A method and system for semantic-based navigation of temporally sequenced content such as videos interprets the image and audio-based content by applying computer-implemented neural networks and performs multi-modal inferences of temporally aligned content. The multi-modal inferences may be performed by means of the application of vectorized embeddings and/or by application of semantic chaining techniques. The multi-modal inferences are applied to generate navigational indicators and/or responses to user inputs that comprise natural language or images. The navigational indicators and responses to user inputs may be personalized based upon user behaviors.

19 Claims, 18 Drawing Sheets

(51) Int. Cl.
    *G06F 16/71*           (2019.01)
    *G06F 40/30*           (2020.01)
    *G10L 15/25*           (2013.01)

(56) References Cited

U.S. PATENT DOCUMENTS

| | | | |
|---|---|---|---|
| 11,012,662 B1* | 5/2021 | Baughman | H04N 7/0127 |
| 11,580,869 B2* | 2/2023 | Smith | G06Q 30/02 |
| 2008/0134203 A1* | 6/2008 | Weber | G06F 9/546 |
| | | | 719/314 |
| 2018/0165934 A1* | 6/2018 | Pan | G06V 20/41 |
| 2019/0065492 A1* | 2/2019 | Cheng | G06F 16/435 |
| 2020/0215695 A1* | 7/2020 | Cristache | G06N 5/025 |
| 2020/0372116 A1* | 11/2020 | Gao | G06F 17/10 |
| 2021/0117784 A1* | 4/2021 | Flinn | G06F 18/2148 |
| 2021/0232915 A1* | 7/2021 | Dalli | G06F 18/2113 |
| 2023/0017489 A1* | 1/2023 | Gupta | H04N 21/47217 |
| 2023/0140125 A1* | 5/2023 | Glesinger | G06N 3/08 |
| | | | 704/9 |
| 2024/0104305 A1* | 3/2024 | Glesinger | G06V 10/421 |
| 2024/0290187 A1* | 8/2024 | Trepanier | H04N 21/2187 |

FOREIGN PATENT DOCUMENTS

| | | | | |
|---|---|---|---|---|
| EP | 3885966 B1 | 9/2021 | | |
| EP | 3889803 A1 * | 10/2021 | | G06V 20/41 |
| EP | 3889803 B1 | 10/2021 | | |

\* cited by examiner

SEMANTIC-BASED NAVIGATION OF TEMPORALLY SEQUENCED CONTENT

CROSS-REFERENCE TO RELATED APPLICATIONS

The present application claims the benefit of U.S. Provisional Patent Application No. 63/273,328, filed Oct. 29, 2021, which is hereby incorporated by reference as if set forth herein in its entirety

FIELD OF THE INVENTION

This invention relates to systems and methods for facilitating the understanding of the contents of, and navigation within and across, temporally sequenced media such as videos and podcasts.

BACKGROUND OF THE INVENTION

Temporally sequenced media such as video and podcasts can be problematic for users in that only a portion of the media may be of relevance to the user and that portion may not be readily apparent to the user, requiring the user to either miss otherwise relevant information or to waste time consuming non-relevant content before being able to access the portion of the content that is relevant. Thus, there is a need for a system and method that facilitates an understanding of the contents of such media and facilitates an efficient way of identifying and navigating to specific segments within the media that are relevant to the user.

SUMMARY OF THE INVENTION

In accordance with the embodiments described herein, a processor-based method and system is disclosed that automatically inferentially attains a semantic-level of understanding of the contents of temporally sequenced media, and then applies this understanding to facilitate a user's efficient navigation within, and across, temporally sequenced media.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Adaptive System

Figure 1:
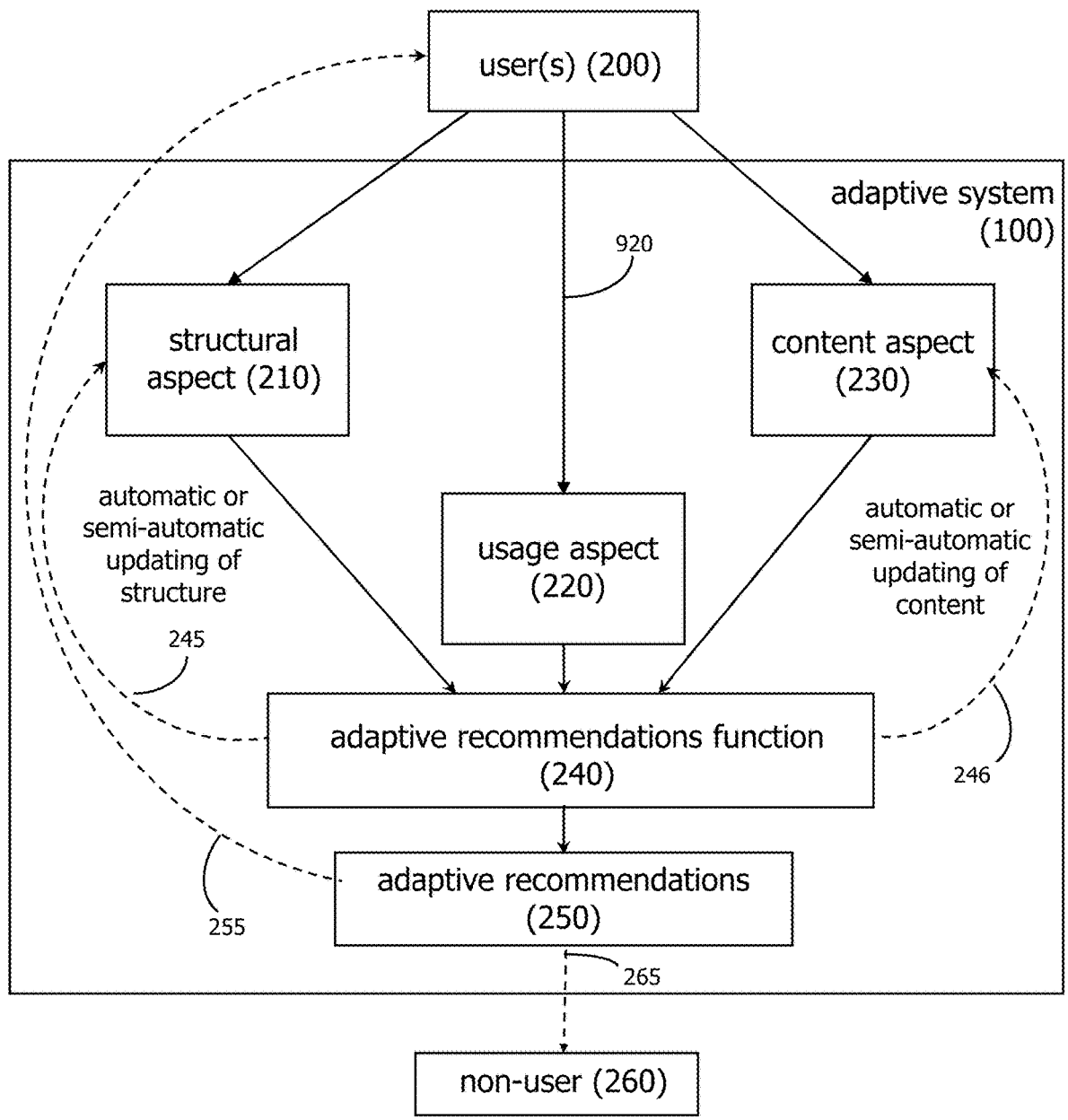
FIG. 1 is a block diagram of an adaptive system, according to some embodiments.

In some embodiments, the present invention may apply the methods and systems of an adaptive system as depicted by FIG. 1. FIG. 1 is a generalized depiction of an adaptive system 100, according to some embodiments. The adaptive system 100 includes three aspects: a structural aspect 210, a usage aspect 220, and a content aspect 230. One or more users 200 interact with the adaptive system 100. An adaptive recommendations function 240 may produce adaptive recommendations 250 based upon the user interactions, and the recommendations may be delivered to the user 200 or applied to the adaptive system 100.

As used herein, one or more users 200 may be a single user or multiple users. As shown in FIG. 1, the one or more users 200 may receive the adaptive recommendations 250. Non-users 260 of the adaptive system 100 may also receive adaptive recommendations 250 from the adaptive system 100.

A user 200 may be a human entity, a computer system, or a second adaptive system (distinct from the adaptive system 100) that interacts with, or otherwise uses the adaptive system. The one or more users 200 may therefore include non-human "users" that interact with the adaptive system 100. In particular, one or more other adaptive systems may serve as virtual system "users." Although not essential, these other adaptive systems may operate in accordance with the architecture of the adaptive system 100. Thus, multiple adaptive systems may be mutual users of one another. The user 200 may also represent the adaptive system 100 itself as a means of representing interactions with itself (or among its constituent elements) or as a means for referencing its own behaviors as embodied in the usage aspect 220.

It should be understood that the structural aspect 210, the content aspect 230, the usage aspect 220, and the recommendations function 240 of the adaptive system 100, and elements of each, may be contained within one processor-based device, or distributed among multiple processor-based devices, and wherein one or more of the processor-based devices may be portable. Furthermore, in some embodiments one or more non-adaptive systems may be transformed to one or more adaptive systems 100 by means of operatively integrating the usage aspect 220 and the recommendations function 240 with the one or more non-adaptive systems. In some embodiments the structural aspect 210 of a non-adaptive system may be transformed to a fuzzy network-based structural aspect 210 to provide a greater capacity for adaptation.

The term "computer system" or the term "system," without further qualification, as used herein, will be understood to mean either a non-adaptive or an adaptive system. Likewise, the terms "system structure" or "system content," as used herein, will be understood to refer to the structural aspect 210 and the content aspect 230, respectively, whether associated with a non-adaptive system or the adaptive system 100. The term "system structural subset" or "structural subset," as used herein, will be understood to mean a portion or subset of the elements of the structural aspect 210 of a system.

Structural Aspect

Figure 2A:
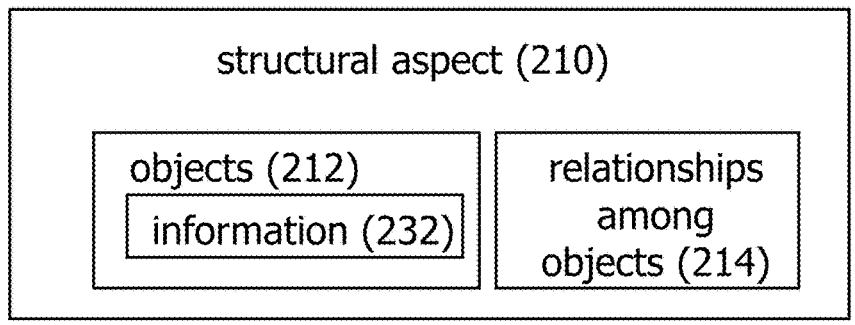
FIGS. 2A, 2B, and 2C are block diagrams of the structural aspect, the content aspect, and the usage aspect of the adaptive system of FIG. 1, according to some embodiments.
Figure 2B:
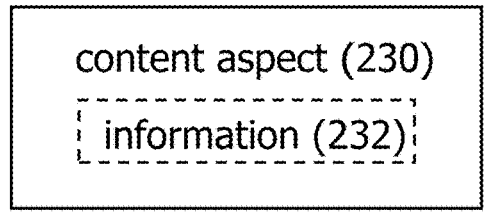

The structural aspect 210 of the adaptive system 100 is depicted in the block diagram of FIG. 2A. The structural aspect 210 comprises a collection of system objects 212 that are part of the adaptive system 100, as well as the relationships among the objects 214, if they exist. The relationships among objects 214 may be persistent across user sessions or may be transient in nature. The objects 212 may include or reference items of content, such as text, graphics, audio, video, interactive content, or embody any other type or item of computer-implemented information. The objects 212 may also include references, such as pointers, to content. Computer applications, executable code, or references to computer applications may also be stored as objects 212 in the adaptive system 100. The content of the objects 212 is known herein as information 232. The information 232, though part of the object 214, is also considered part of the content aspect 230, as depicted in FIG. 2B, and described below.

The objects 212 may be managed in a relational database, or may be maintained in structures such as, but not limited to, flat files, linked lists, inverted lists, hypertext networks, object-oriented databases, graph databases, or noSQL databases. The objects 212 may include meta-information 234 associated with the information 232 contained within, or referenced by, the objects 212.

As an example, in some embodiments, the World-wide Web could be considered a structural aspect, wherein web pages constitute the objects of the structural aspect and links between web pages constitute the relationships among the objects. Alternatively, or in addition, in some embodiments, the structural aspect could be composed of objects associated with an object-oriented programming language, and the relationships between the objects associated with the protocols and methods associated with interaction and communication among the objects in accordance with the object-oriented programming language.

The one or more users 200 of the adaptive system 100 may be explicitly represented as objects 212 within the system 100, therefore becoming directly incorporated within the structural aspect 210. The relationships among objects 214 may be arranged in a hierarchical structure, a relational structure (e.g. according to a relational database structure), or according to a network structure.

Content Aspect

The content aspect 230 of the adaptive system 100 is depicted in the block diagram of FIG. 2B. The content aspect 230 comprises the information 232 contained in, or referenced by, the objects 212 that are part of the structural aspect 210. The content aspect 230 of the objects 212 may include text, graphics, audio, images, video, and interactive forms of content, such as applets, tutorials, courses, demonstrations, modules, or sections of executable code or computer programs. The one or more users 200 interact with the content aspect 230.

The content aspect 230 may be updated based on the usage aspect 220, as well as associated metrics. To achieve this, the adaptive system 100 may use or access information from other systems. Such systems may include, but are not limited to, other computer systems, other networks, such as the World Wide Web, multiple computers within an organization, other adaptive systems, or other adaptive recombinant systems. In this manner, the content aspect 230 benefits from usage occurring in other environments.

Usage Aspect

Figure 2C:
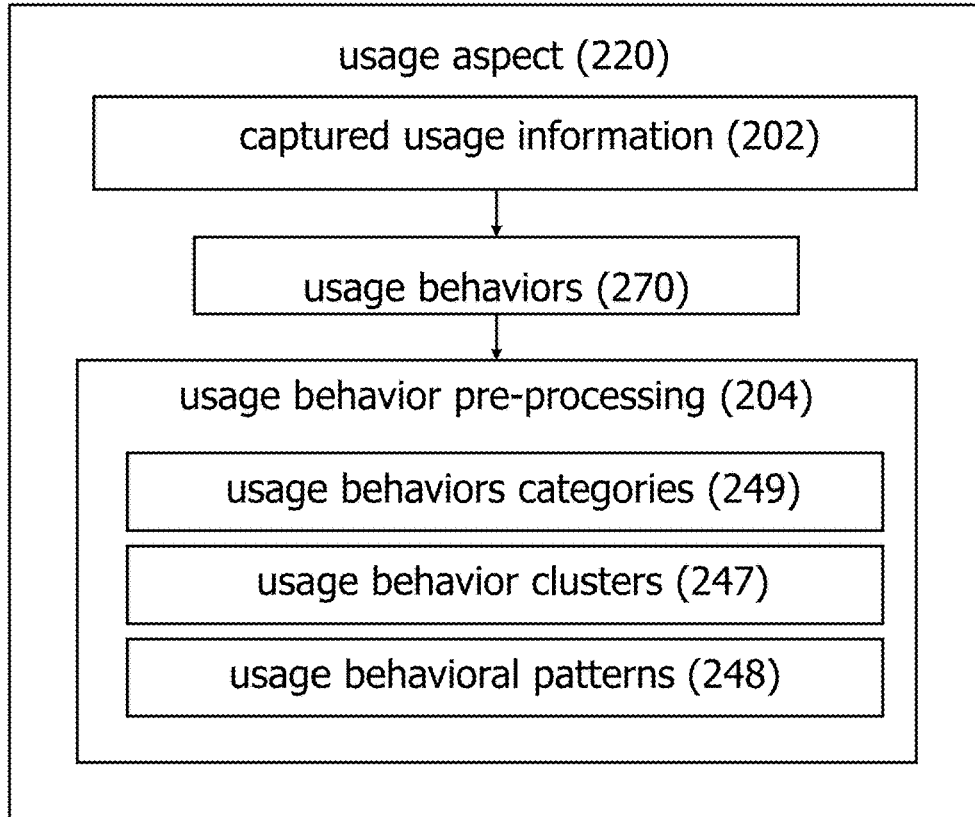

The usage aspect 220 of the adaptive system 100 is depicted in the block diagram of FIG. 2C, although it should be understood that the usage aspect 220 may also exist independently of adaptive system 100 in some embodiments. The usage aspect 220 denotes captured usage information 202, further identified as usage behaviors 270, and usage behavior pre-processing 204. The usage aspect 220 thus reflects the tracking, storing, categorization, and clustering of the use and associated usage behaviors of the one or more users 200 interacting with, or being monitored by, the adaptive system 100. Applying usage behavioral information 202, including, but not limited to the usage behavioral information described by Table 1, to generate relationships or affinities 214 among objects 212 may be termed "behavioral indexing" herein.

The captured usage information 202, known also as system usage or system use 202, may include any user behavior 920 exhibited by the one or more users 200 while using the system. The adaptive system 100 may track and store user key strokes and mouse clicks, for example, as well as the time period in which these interactions occurred (e.g., timestamps), as captured usage information 202. From this captured usage information 202, the adaptive system 100 identifies usage behaviors 270 of the one or more users 200 (e.g., a web page access or email transmission). Finally, the usage aspect 220 includes usage-behavior pre-processing, in which usage behavior categories 249, usage behavior clusters 247, and usage behavioral patterns 248 are formulated for subsequent processing of the usage behaviors 270 by the adaptive system 100. Non-limiting examples of the usage behaviors 270 that may be processed by the adaptive system 100, as well as usage behavior categories 249 designated by the adaptive system 100, are listed in Table 1, and described in more detail, below.

The usage behavior categories 249, usage behaviors clusters 247, and usage behavior patterns 248 may be interpreted with respect to a single user 200, or to multiple users 200; the multiple users may be described herein as a community, an affinity group, or a user segment. These terms are used interchangeably herein. A community is a collection of one or more users and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 249 include types of usage behaviors 270, such as accesses, referrals to other users, collaboration with other users, and so on. These categories and more are included in Table 1, below. Usage behavior clusters 247 are groupings of one or more usage behaviors 270, either within a particular usage behavior category 249 or across two or more usage categories. The usage behavior pre-processing 204 may also determine new clusterings of user behaviors 270 in previously undefined usage behavior categories 249, across categories, or among new communities. Usage behavior patterns 248, also known as "usage behavioral patterns" or "behavioral patterns," are also groupings of usage behaviors 270 across usage behavior categories 249. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, and/or monitored behaviors such as physiological responses, physical (i.e., geographic) location, and environmental conditions local to the user 200. The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences 252 associated with other adaptive or non-adaptive systems.

Adaptive Recommendations

As shown in FIG. 1, the adaptive system 100 generates adaptive recommendations 250 using the adaptive recommendations function 240. The adaptive recommendations 250, or suggestions, enable users to more effectively use and/or navigate the adaptive system 100.

The adaptive recommendations 250 are presented as structural subsets of the structural aspect 210, which may comprise an item of content, multiple items of content, a representation of one or more users, and/or a user activity or stream of activities. The recommended content or activities may include information generated automatically by a processor-based system or device, such as, for example, by a process control device. A recommendation may comprise a spatial or temporal sequence of objects. The adaptive recommendations 250 may be in the context of a currently conducted activity of the system 100, a current position while navigating the structural aspect 210, a currently accessed object 212 or information 232, or a communication with another user 200 or another system. The adaptive recommendations 250 may also be in the context of a historical path of executed system activities, accessed objects 212 or information 232, or communications during a specific user session or across user sessions. The adaptive recommendations 250 may be without context of a current activity, currently accessed object 212, current session path, or historical session paths. Adaptive recommendations 250 may also be generated in response to direct user requests or queries, including search requests or requests for matching content to other content. Such user requests may be in the context of a current system navigation, access or activity, or may be outside of any such context and the recommended content sourced from one or more systems. The adaptive recommendations 250 may comprise advertising or sponsored content. The adaptive recommendations may constitute automatically generated navigational indicators such as tags that facilitate user navigation of temporally sequenced content such as videos or podcasts. The adaptive recommendations 250 may be delivered through any computer-implemented means, including, but not limited to delivery modes in which the recommendation recipient 200, 260 can read and/or listen to the recommendation 250.

Fuzzy Content Network

Figure 3:
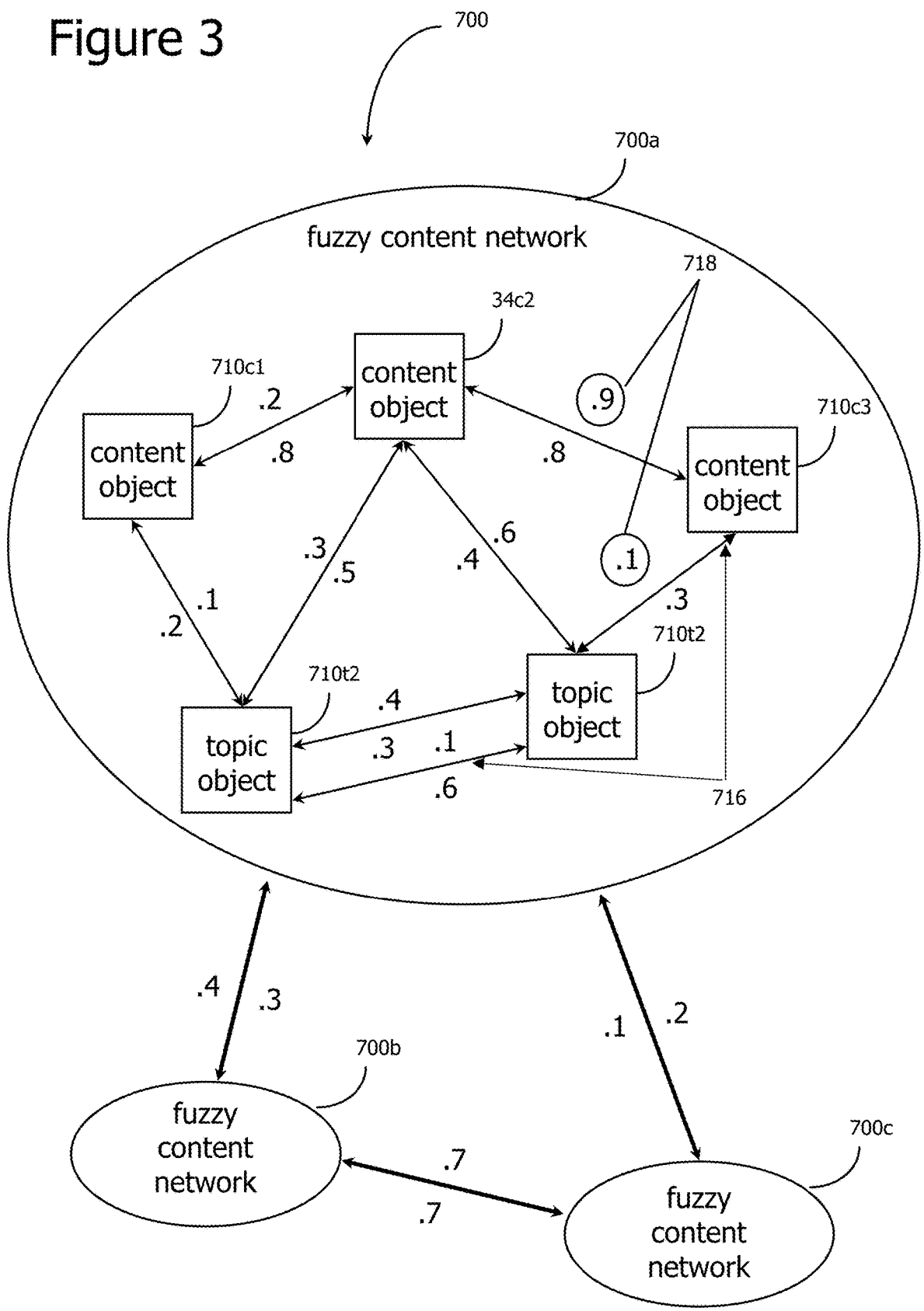
FIG. 3 is a block diagram of a fuzzy content network-based system, according to some embodiments.
Figure 4A:
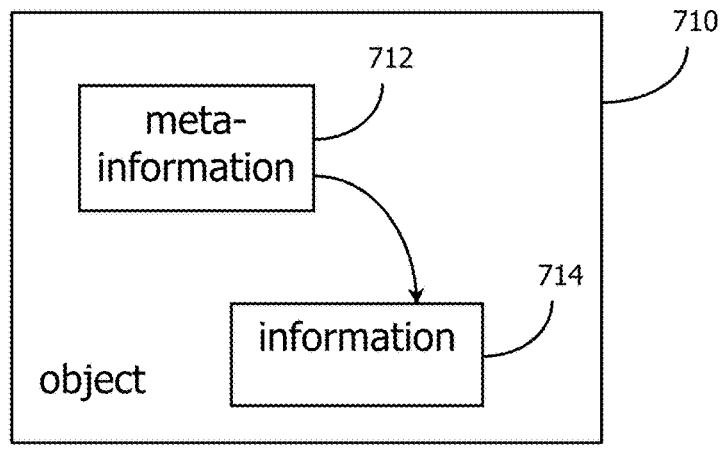
FIGS. 4A, 4B, and 4C are block diagrams of an object, a topic object, and a content object, according to some embodiments.

In some embodiments, the structural aspect 210 of the adaptive system 100, comprises a specific type of fuzzy network, a fuzzy content network. A fuzzy content network 700 is depicted in FIG. 3. The fuzzy content network 700 may include multiple content sub-networks, as illustrated by the content sub-networks 700a, 700b, and 700c, and fuzzy content network 700 includes "content," "data," or "information," packaged in objects 710. Details about how the object works internally may be hidden. In FIG. 4A, for example, the object 710 includes meta-information 712 and information 714. The object 710 thus encapsulates information 714.

Another benefit to organizing information as objects is known as inheritance. The encapsulation of FIG. 4A, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 4B:
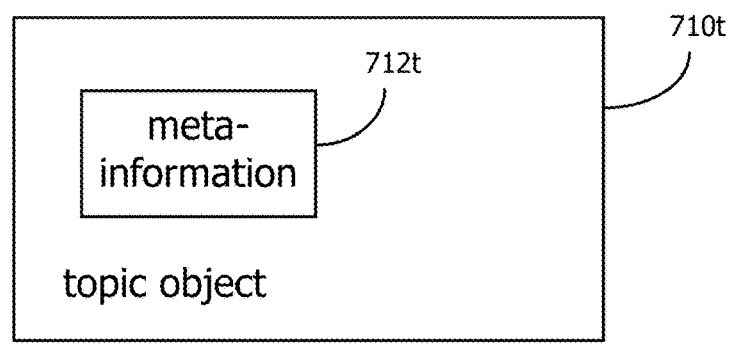
Figure 4C:
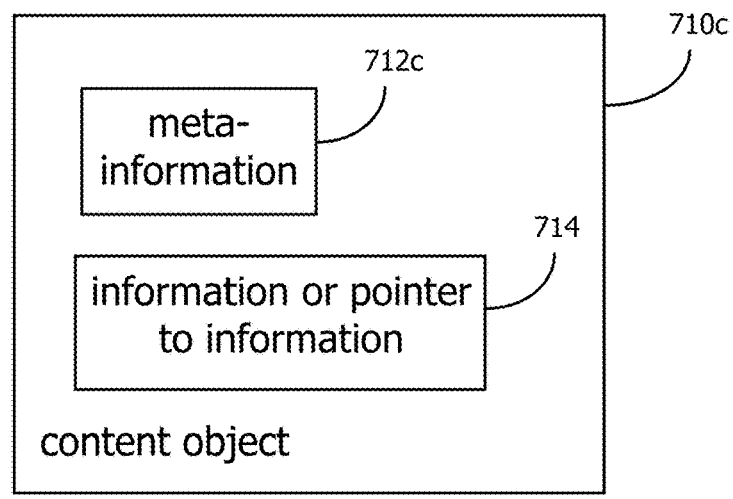

In the content network 700, the objects 710 may be either topic objects 710t or content objects 710c, as depicted in FIGS. 4B and 4C, respectively. Topic objects 710t are encapsulations that contain meta-information 712t and relationships to other objects (not shown), but do not contain an embedded pointer to reference associated information. The topic object 710t thus essentially operates as a "label" to a class of information. The topic object 710 therefore just refers to "itself" and the network of relationships it has with other objects 710. People may be represented as topic objects or content objects in accordance with some embodiments.

Content objects 710c, as shown in FIG. 4C, are encapsulations that optionally contain meta-information 712c and relationships to other objects 710 (not shown). Additionally, content objects 710c may include either an embedded pointer to information or the information 714 itself (hereinafter, "information 714").

The referenced information 714 may include files, text, documents, articles, images, audio, video, multi-media, software applications and electronic or magnetic media or signals. Where the content object 714c supplies a pointer to information, the pointer may be a memory address. Where the content network 700 encapsulates information on the Internet, the pointer may be a Uniform Resource Locator (URL).

The meta-information 712 supplies a summary or abstract of the object 710. So, for example, the meta-information 712$t$ for the topic object 710$t$ may include a high-level description of the topic being managed. Examples of meta-information 712$t$ include a title, a sub-title, one or more descriptions of the topic provided at different levels of detail, the publisher of the topic meta-information, the date the topic object 710$t$ was created, and subjective attributes such as the quality, and attributes based on user feedback associated with the referenced information. Meta-information may also include a pointer to referenced information, such as a uniform resource locator (URL), in one embodiment.

The meta-information 712$c$ for the content object 710$c$ may include relevant keywords associated with the information 714, a summary of the information 714, and so on. The meta-information 712$c$ may supply a "first look" at the objects 710$c$. The meta-information 712$c$ may include a title, a sub-title, a description of the information 714, the author of the information 714, the publisher of the information 714, the publisher of the meta-information 712$c$, and the date the content object 710$c$ was created, as examples. As with the topic object 710$t$, meta-information for the content object 710$c$ may also include a pointer.

In FIG. 3, the content sub-network 700$a$ is expanded, such that both content objects 710$c$ and topic objects 710$t$ are visible. The various objects 710 of the content network 700 are interrelated by degrees using relationships 716 (unidirectional and bidirectional arrows) and relationship indicators 718 (values). Each object 710 may be related to any other object 710, and may be related by a relationship indicator 718, as shown. Thus, while information 714 is encapsulated in the objects 710, the information 714 is also interrelated to other information 714 by a degree manifested by the relationship indicators 718.

The relationship indicator 718 is embodies an affinity comprising a value associated with a relationship 716, the value typically comprising a numerical indicator of the relationship between objects 710. Thus, for example, the relationship indicator 718 may be normalized to between 0 and 1, inclusive, where 0 indicates no relationship, and 1 indicates a subset or maximum relationship. Or, the relationship indicators 718 may be expressed using subjective descriptors that depict the "quality" of the relationship. For example, subjective descriptors "high," "medium," and "low" may indicate a relationship between two objects 710.

The relationship 716 between objects 710 may be bi-directional, as indicated by the double-pointing arrows. Each double-pointing arrow includes two relationship indicators 718, one for each "direction" of the relationships between the objects 710.

As FIG. 3 indicates, the relationships 716 between any two objects 710 need not be symmetrical. That is, topic object 710$t$1 has a relationship of "0.3" with content object 710$c$2, while content object 710$c$2 has a relationship of "0.5" with topic object 710$t$1. Furthermore, the relationships 716 need not be bi-directional—they may be in one direction only. This could be designated by a directed arrow, or by simply setting one relationship indicator 718 of a bi-directional arrow to "0," the null relationship value.

The content networks 700A, 700B, 700C may be related to one another using relationships of multiple types and associated relationship indicators 718. For example, in FIG. 3, content sub-network 700$a$ is related to content sub-network 700$b$ and content sub-network 700$c$, using relationships of multiple types and associated relationship indicators 718. Likewise, content sub-network 700$b$ is related to content sub-network 700$a$ and content sub-network 700$c$ using relationships of multiple types and associated relationship indicators 718.

Individual content and topic objects 710 within a selected content sub-network 700$a$ may be related to individual content and topic objects 710 in another content sub-network 700$b$. Furthermore, multiple sets of relationships of multiple types and associated relationship indicators 718 may be defined between two objects 710.

For example, a first set of relationships 716 and associated relationship indicators 718 may be used for a first purpose or be available to a first set of users while a second set of relationships 716 and associated relationship indicators 718 may be used for a second purpose or available to a second set of users. For example, in FIG. 3, topic object 710$t$1 is bi-directionally related to topic object 710$t$2, not once, but twice, as indicated by the two double arrows. An indefinite number of relationships 716 and associated relationship indicators 718 may therefore exist between any two objects 710 in the fuzzy content network 700. The multiple relationships 716 may correspond to distinct relationship types. For example, a relationship type might be the degree an object 710 supports the thesis of a second object 710, while another relationship type might be the degree an object 710 disconfirms the thesis of a second object 710. The content network 700 may thus be customized for various purposes and accessible to different user groups in distinct ways simultaneously.

The relationships among objects 710 in the content network 700, as well as the relationships between content networks 700$a$ and 700$b$, may be modeled after fuzzy set theory. Each object 710, for example, may be considered a fuzzy set with respect to all other objects 710, which are also considered fuzzy sets. The relationships among objects 710 are the degrees to which each object 710 belongs to the fuzzy set represented by any other object 710. Although not essential, every object 710 in the content network 700 may conceivably have a relationship with every other object 710.

The topic objects 710$t$ may encompass, and may be labels for, very broad fuzzy sets of the content network 700. The topic objects 710$t$ thus may be labels for the fuzzy set, and the fuzzy set may include relationships to other topic objects 710$t$ as well as related content objects 710$c$. Content objects 710$c$, in contrast, typically refer to a narrower domain of information in the content network 700.

Figure 5A:
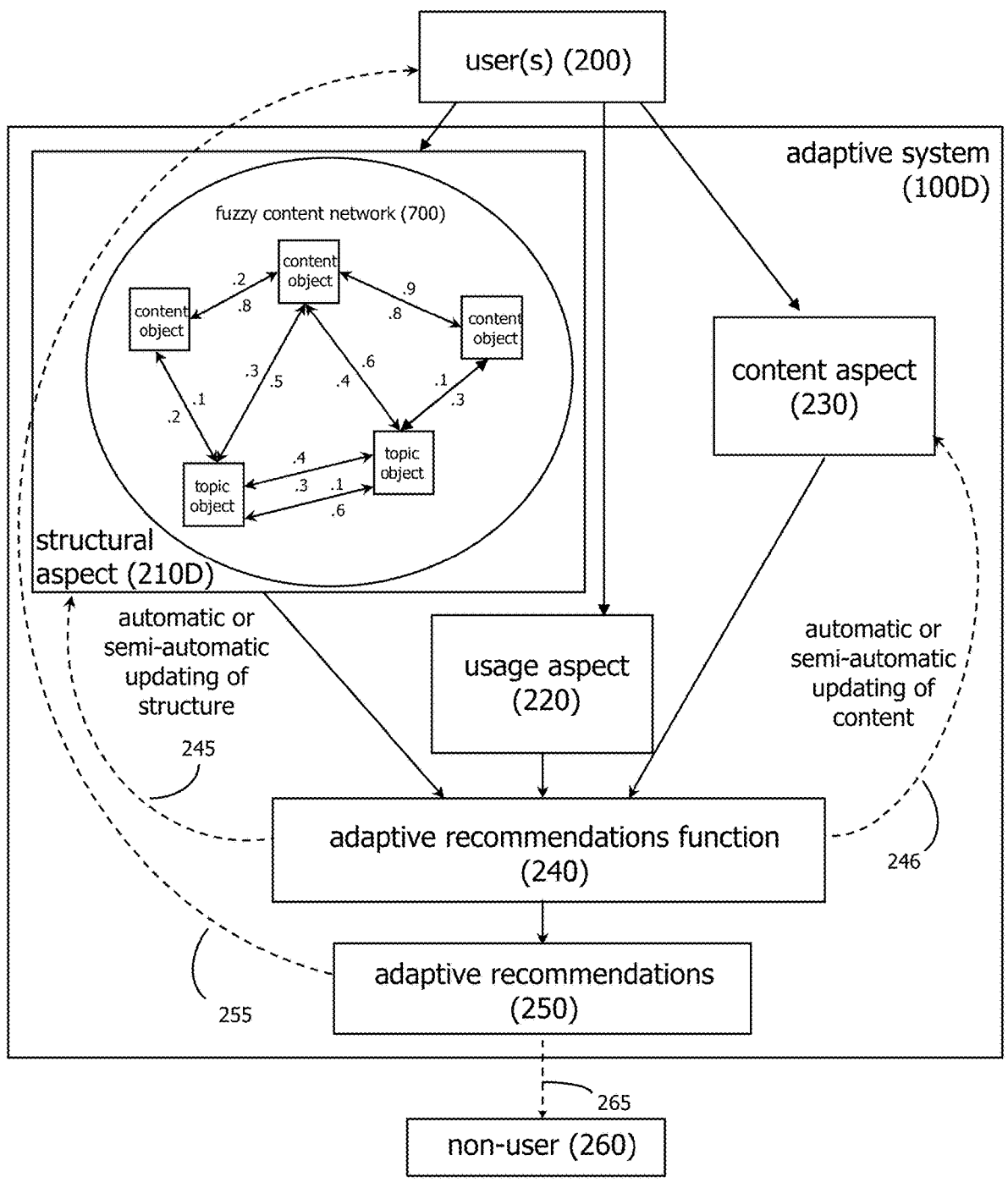
FIG. 5A is a block diagram of a fuzzy content network-based adaptive system, according to some embodiments.

The adaptive system 100 of FIG. 1 may operate in association with a fuzzy content network environment, such as the one depicted in FIG. 3. In FIG. 5A, an adaptive system 100D includes a structural aspect 210D that is a fuzzy content network. Thus, adaptive recommendations 250 generated by the adaptive system 100D are also structural subsets that may themselves comprise fuzzy content networks.

In some embodiments a computer-implemented fuzzy network or fuzzy content network 700 may be represented in the form of vectors or matrices in a computer-implemented system, and where the vectors or matrices may be represented in the form of computer-implemented data structures such as, but not limited to, relational, noSQL, graph databases, or, particularly if generated by vector embedding processes, vector databases. For example, the relationship indicators 718 or affinities among topics may be represented as topic-to-topic affinity vectors ("TTAV"). The relationship indicators 718 or affinities among content objects may be represented as content-to-content affinity vectors ("CCAV").

The relationship indicators 718 or affinities among content object and topic objects may be represented as content-to-topic affinity vectors ("CTAV"), which is also sometimes referred to an object-to-topic affinity vector ("OTAV") herein.

Further, affinity vectors between a user 200 and objects of a fuzzy network or fuzzy content network 700 may be generated. For example, a member (i.e., user)-to-topic affinity vector ("MTAV") may be generated in accordance with some embodiments (and an exemplary process for generating an MTAV is provided elsewhere herein). In some embodiments an affinity vector ("MMAV") between a specific user and other users 200 may be generated derivatively from MTAVs and/or other affinity vectors (and an exemplary process for generating an MMAV is provided elsewhere herein). In some embodiments a member-topic expertise vector (MTEV) is generated, which is defined as a vector of inferred member or user 200 expertise level values, wherein each value corresponds to an expertise level corresponding to a topic.

One or more of object 212 relationship mappings 214 represented by TTAVs, CCAVs, CTAVs (or OTAVs), MTAVs or MTEVs may be the result of the behavioral indexing of a structural aspect 210 (that is not necessarily fuzzy network-based) in conjunction with a usage aspect 220 and an adaptive recommendations function 240.

In some embodiments, indexes generated from information 232 within objects 212 may be applied to populate an MTAV and/or MTEV, and/or to modify an existing MTAV and/or MTEV. Computer-implemented algorithms may be applied to index objects 212 such that for each object 212 a vector or vectors comprising one or more constituent elements, such as words, phrases, or concepts, is generated, along with a numerical weight or value corresponding to each constituent element, wherein each of the corresponding weights is indicative of the inferred importance or relevance of each of the associated constituent elements with respect to the associated indexed object 212. By way of a non-limiting example, such a vector or vectors may be generated by a search engine function during the process of indexing the contents 232 of an object 212. This vector of constituent elements and associated weights or values, hereinafter called an "object contents vector," or "OCV," may be generated using neural network-based vector embedding process and/or statistical techniques such as Bayesian analytic approaches and/or or other statistical pattern matching and/or statistical learning techniques such as support vector machines, as are known by those skilled in the art. For example, word or phrase frequencies within an object 212 comprising a document will typically influence the OCV, as may the position of words or phrases within an object 212. These object contents-indexing techniques may further apply more general linguistic data such as word and phrase frequencies for a given language, synonym tables, and/or other lexicon-based information in generating OCVs.

In some embodiments OCVs may comprise one or more numeric-based codings that are generated, by, for example, an embedding process in which a trained neural network generates the OCV comprising a numeric-based vector that is generated from application of the trained neural network to language that is input to the embedding process. The trained neural network may be trained on a large, general corpus of content such as Wikipedia and/or more domain-specific content such as sector-specific content or organization-specific content, so as to attain the required degree of conceptual understanding by the system.

In some embodiments, a system may track a user's 200 behaviors 920, including, but not limited to, the behaviors described by Table 1, and map them to the OCVs of a collection of objects 212. Constituent elements of the OCVs of objects that are inferred from the tracked behaviors 920 to be of particular interest to one or more users 200 or to have some other inferred quality of interest are then identified. These inferences may be based on the relative number of occurrences of constituent elements among objects that are inferred to be interest to a user, as well as in accordance with the weights or values associated with these constituent elements and their associated OCVs. For example, everything else being equal, constituent elements (or synonyms thereof) of OCVs that occur frequently among the objects that are inferred to be of high interest to a user and that have relatively high relevance weightings in the OCVs are favored for identification.

These one or more identified constituent elements may then be transformed via, for example, application of appropriate lexicon-based information and techniques into, or directly serve without transformation as, topics 710t with associated weights in the user's MTAV and/or MTEV, wherein the associated weights are calculated in accordance with the inferred degree of affinity 214 between the user 200 and the objects 212 from which the associated OCVs are sourced. This process can be iteratively executed to continue to expand or refine the MTAV as additional or alternative sets of behaviors 920 are applied to OCVs of the same, additional, or different sets of object 212, enabling continuously improved capabilities for personalization.

In some embodiments a multi-dimensional mathematical construct or space (i.e., a latent space) may be generated based upon one or more of the affinity vectors. In some embodiments the dimensions of the space may be generated by application of neural networks. By way of a non-limiting example, topics may be represented by each dimension of a multi-dimensional space. Calculations of distances between objects and/or users in the multi-dimensional space and clusters among objects and/or users, may be determined by applying mathematical algorithms to the multi-dimensional space and its elements, such as, but not limited to cosine similarity or k-nearest neighbor calculations. These calculations may be used by the adaptive system 100 in generating recommendations and/or in clustering elements of the multi-dimensional space.

In some embodiments one or more topics 710t and/or relationship indicators 718 may be generated automatically by evaluating candidate clusters of content objects 710c based on behavioral information 920 and/or the matching of information within the content objects 710c, wherein the matching is performed, for example, through the application of probabilistic, statistical, and/or neural network-based techniques. In the application of the latter technique, the topics 710t may correspond to the dimensions in a latent space that the neural network derives from being applied to information within the content objects 710c.

User Behavior and Usage Framework

Figure 6:
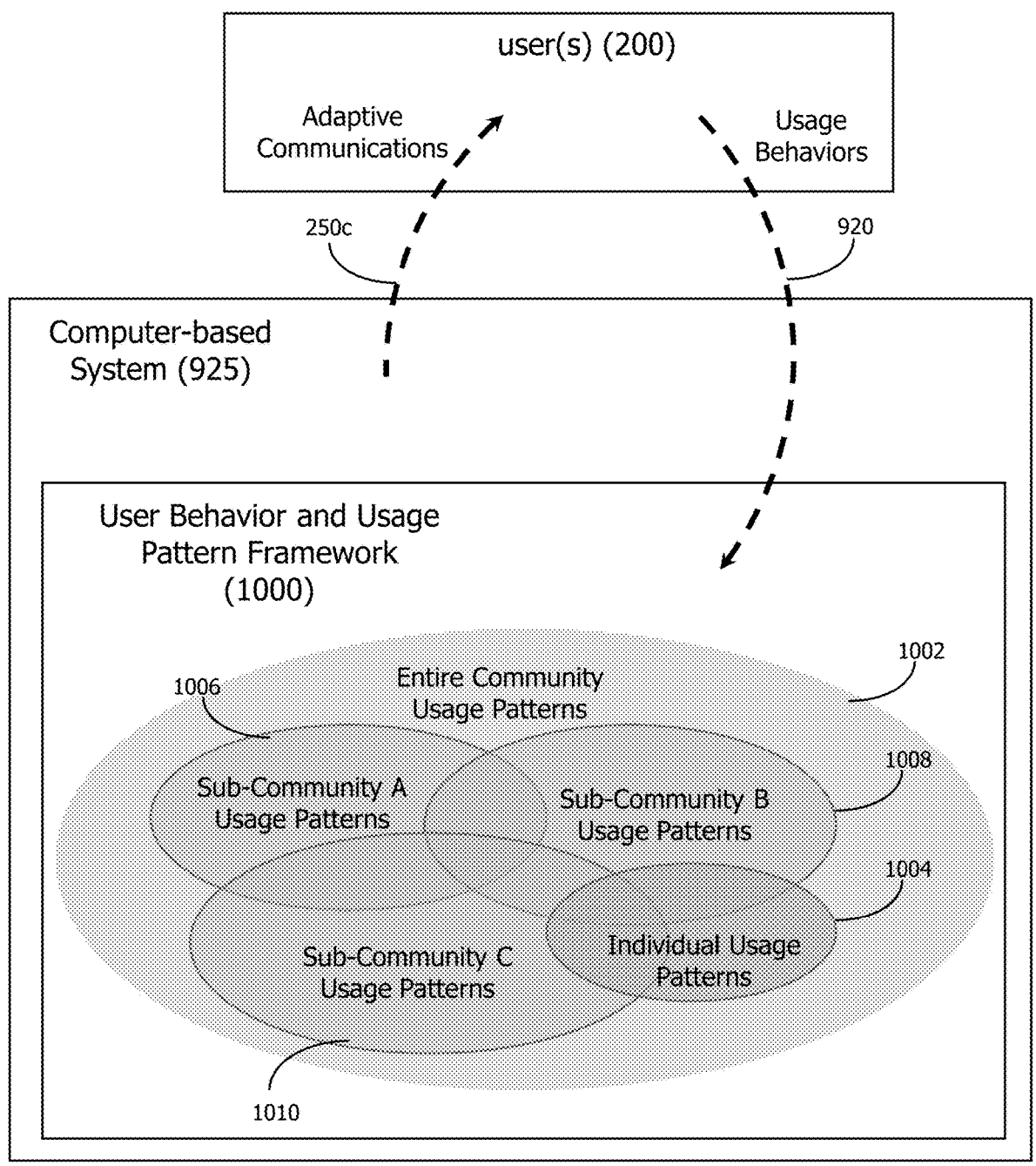
FIG. 6 is a block diagram of a computer-based system that enables adaptive communications, according to some embodiments.

FIG. 6 depicts a usage framework 1000 for performing preference and/or intention inferencing of tracked or monitored usage behaviors 920 by one or more computer-based systems 925. The one or more computer-based systems 925 may comprise an adaptive system 100. The usage framework 1000 summarizes the manner in which usage patterns are managed within the one or more computer-based systems 925. Usage behavioral patterns associated with an entire community, affinity group, or segment of users 1002 are captured by the one or more computer-based systems 925. In another case, usage patterns specific to an individual are captured by the one or more computer-based systems 925. Various sub-communities of usage associated with users may also be defined, as for example "sub-community A" usage patterns 1006, "sub-community B" usage patterns 1008, and "sub-community C" usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single user or multiple users. Sub-communities may likewise include one or more users. Thus, the individual usage patterns 1004 in FIG. 6 may also be described as representing the usage patterns of a community or a sub-community. For the one or more computer-based systems 925, usage behavior patterns may be segmented among communities and individuals so as to effectively enable adaptive communications 250c delivery for each sub-community or individual.

The usage behaviors 920 included in Table 1 may be categorized by the one or more computer-based systems 925 according to the usage framework 1000 of FIG. 6. For example, categories of usage behavior may be captured and categorized according to the entire community usage patterns 1002, sub-community usage patterns 1006, and individual usage patterns 1004. The corresponding usage behavior information may be used to infer preferences and/or intentions and interests at each of the user levels.

Multiple usage behavior categories shown in Table 1 may be used by the one or more computer-based systems 925 to make reliable inferences of the preferences and/or intentions and/or intentions of a user with regard to elements, objects, or items of content associated with the one or more computer-based systems 925. There are likely to be different preference inferencing results for different users.

As shown in FIG. 6, the one or more computer-based systems 925 delivers adaptive communications to the user 200. These adaptive communications 250c may include adaptive recommendations 250 and/or associated explanations for the recommendations, or may be other types of communications to the user 200, including sponsored recommendations. In some embodiments the adaptive communications 250c comprise one or more phrases, where phrases can comprise one or more words. The adaptive communications 250c may be delivered to the user 200, for example, in a written form, an audio form, or a combination of these forms.

By introducing different or additional behavioral characteristics, such as the duration of access of, or monitored or inferred attention toward, an object, a more adaptive communication 250c is enabled. For example, duration of access or attention will generally be much less correlated with navigational proximity than access sequences will be, and therefore provide a better indicator of true user preferences and/or intentions and/or intentions. Therefore, combining access sequences and access duration will generally provide better inferences and associated system structural updates than using either usage behavior alone. Effectively utilizing additional usage behaviors as described above will generally enable increasingly effective system structural updating. In addition, the one or more computer-based systems 925 may employ user affinity groups to enable even more effective system structural updating than are available merely by applying either individual (personal) usage behaviors or entire community usage behaviors.

In some embodiments, the one or more computer-based systems 925 may provide users 200 with a means to limit the tracking, storing, or application of their usage behaviors 920. A variety of limitation variables may be selected by the user 200. For example, a user 200 may be able to limit usage behavior tracking, storing, or application by usage behavior category described in Table 1. Alternatively, or in addition, the selected limitation may be specified to apply only to particular user communities or individual users 200. For example, a user 200 may restrict the application of the full set of her usage behaviors 920 to preference or interest inferences by one or more computer-based systems 925 for application to only herself, and make a subset of process behaviors 920 available for application to users only within her workgroup, but allow none of her process usage behaviors to be applied by the one or more computer-based systems 925 in making inferences of preferences and/or intentions and/or intentions or interests for other users.

User Communities

As described above, a user associated with one or more systems 925 may be a member of one or more communities of interest, or affinity groups, with a potentially varying degree of affinity associated with the respective communities. These affinities may change over time as interests of the user 200 and communities evolve over time. The affinities or relationships among users and communities may be categorized into specific types. An identified user 200 may be considered a member of a special sub-community containing only one member, the member being the identified user. A user can therefore be thought of as just a specific case of the more general notion of user or user segments, communities, or affinity groups.

Figure 7:
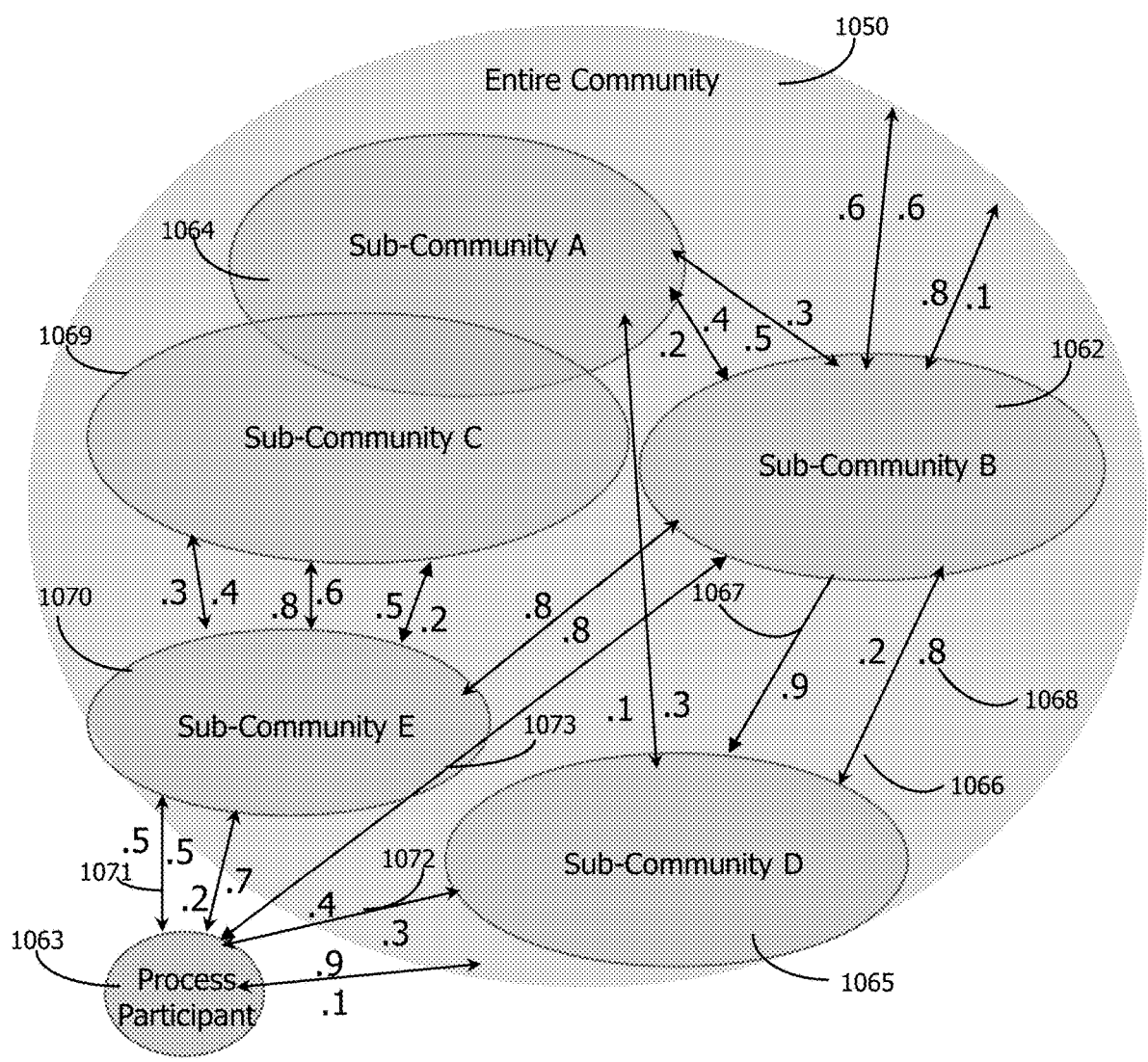
FIG. 7 is a diagram illustrating user communities and associated relationships, according to some embodiments.

FIG. 7 illustrates the affinities among user communities and how these affinities may automatically or semi-automatically be updated by the one or more computer-based systems 925 based on user preferences and/or intentions which are derived from user behaviors 920. An entire community 1050 is depicted in FIG. 7. The community may extend across organizational, functional, or process boundaries. The entire community 1050 includes sub-community A 1064, sub-community B 1062, sub-community C 1069, sub-community D 1065, and sub-community E 1070. A user 1063 who is not part of the entire community 1050 is also featured in FIG. 7.

Sub-community B 1062 is a community that has many relationships or affinities to other communities. These relationships may be of different types and differing degrees of relevance or affinity. For example, a first relationship 1066 between sub-community B 1062 and sub-community D 1065 may be of one type, and a second relationship 1067 may be of a second type. (In FIG. 7, the first relationship 1066 is depicted using a double-pointing arrow, while the second relationship 1067 is depicted using a unidirectional arrow.)

The relationships 1066 and 1067 may be directionally distinct and may have an indicator of relationship or affinity associated with each distinct direction of affinity or relationship. For example, the first relationship 1066 has a numerical value 1068, or relationship value, of "0.8." The relationship value 1068 thus describes the first relationship 1066 between sub-community B 1062 and sub-community D 1065 as having a value of 0.8.

The relationship value may be scaled as in FIG. 7 (e.g., between 0 and 1), or may be scaled according to another interval. The relationship values may also be bounded or unbounded, or they may be symbolically represented (e.g., high, medium, low).

The one or more computer-based systems 925 may automatically generate communities, or affinity groups, based on user behaviors 920 and associated preference inferences. In addition, communities may be identified by users, such as administrators of the process or sub-process instance 930. Thus, the one or more computer-based systems 925 utilizes automatically generated and manually generated communities.

Users 200 or communities may be explicitly represented as elements or objects 212 within the one or more computer-based systems 925. An object 212 representing a user 200 may include self-profiling information that is explicitly provided by the user 200. This user descriptive information may include, but are not limited to, for example, a photo or avatar, relationships to other people, subjects of interest, and affiliations.

reference and/or Intention Inferences

Figure 8:
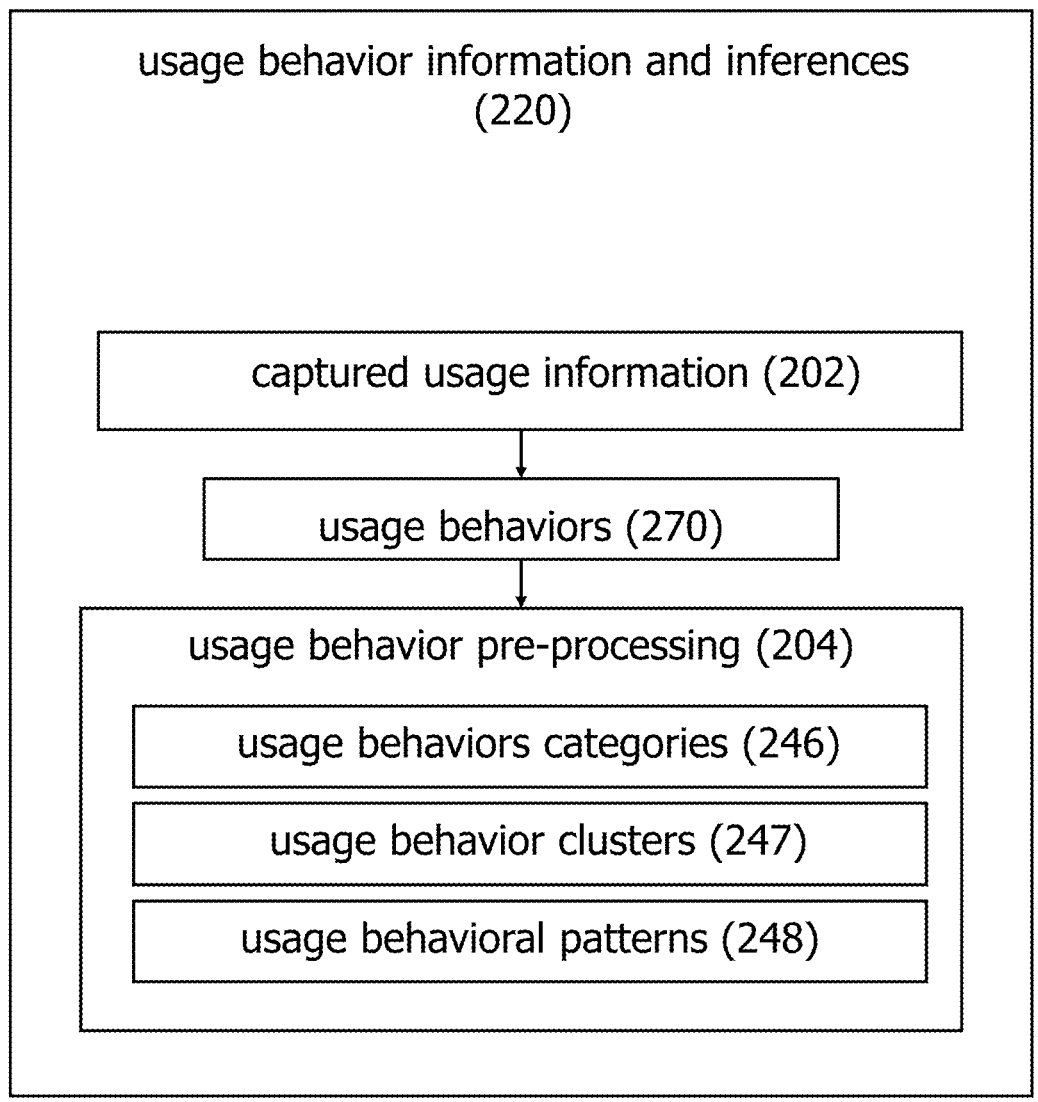
FIG. 8 is a block diagram of usage behavior processing functions of the computer-based system of FIG. 6, according to some embodiments.

The usage behavior information and inferences function 220 of the one or more computer-based systems 925 is depicted in the block diagram of FIG. 8. In embodiments where computer-based systems 925 is an adaptive system 100, then usage behavior information and inferences function 220 is equivalent to the usage aspect 220 of FIG. 1. The usage behavior information and inferences function 220 denotes captured usage information 202, further identified as usage behaviors 270, and usage behavior pre-processing 204. The usage behavior information and inferences function 220 thus reflects the tracking, storing, classification, categorization, and clustering of the use and associated usage behaviors 920 of the one or more users or users 200 interacting with the one or more computer-based systems 925.

The captured usage information 202, known also as system usage or system use 202, includes any interaction by the one or more users or users 200 with the system, or monitored behavior by the one or more users 200. The one or more computer-based systems 925 may track and store user key strokes and mouse clicks or other device controller information, for example, as well as the time period in which these interactions occurred (e.g., timestamps), as captured usage information 202. From this captured usage information 202, the one or more computer-based systems 925 identifies usage behaviors 270 of the one or more users 200 (e.g., web page access or physical location changes of the user). Finally, the usage behavior information and inferences function 220 includes usage-behavior pre-processing, in which usage behavior categories 246, usage behavior clusters 247, and usage behavioral patterns 248 are formulated for subsequent processing of the usage behaviors 270 by the one or more computer-based systems 925. Some usage behaviors 270 identified by the one or more computer-based systems 925, as well as usage behavior categories 246 designated by the one or more computer-based systems 925, are listed in Table 1, and are described in more detail below.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the user 200, potentially including environmental aspects of the physical location(s). The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering.

User Behavior Categories

In Table 1, a variety of different user behaviors 920 are identified that may be assessed by the one or more computer-based systems 925 and categorized. The usage behaviors 920 may be associated with the entire community of users, one or more sub-communities, or with individual users of the one of more computer-based applications 925.

TABLE 1

Usage behavior categories and usage behaviors

| usage behavior category | usage behavior examples |
| --- | --- |
| navigation and access | activity, content and computer application accesses, including buying/selling<br>paths of accesses or click streams<br>execution of searches and/or search history |
| subscription and self-profiling | personal or community subscriptions to, or following of, topical areas<br>interest and preference self-profiling<br>following other users<br>filters<br>affiliation self-profiling (e.g., job function) |
| collaborative | referral to others<br>discussion forum activity<br>direct communications (voice call, messaging)<br>content contributions or structural alterations<br>linking to another user |
| reference | personal or community storage and tagging<br>personal or community organizing of stored or tagged information |
| direct feedback | user ratings of activities, content, computer applications and automatic recommendations<br>user comments |
| physiological responses | direction of gaze<br>brain patterns<br>blood pressure<br>heart rate<br>voice modulation |

TABLE 1-continued

Usage behavior categories and usage behaviors

| usage behavior category | usage behavior examples |
|---|---|
| | facial expression |
| | kinetic expression of limbs such as tension, posture or movement |
| | expression of other users in the group |
| environmental conditions and location | current location |
| | location over time |
| | relative location to users/object references |
| | current time |
| | current weather condition |

A first category of process usage behaviors 920 is known as system navigation and access behaviors. System navigation and access behaviors include usage behaviors 920 such as accesses to, and interactions with computer-based applications and content such as documents, Web pages, images, videos, TV channels, audio, radio channels, multi-media, interactive content, interactive computer applications and games, e-commerce applications, or any other type of information item or system "object." These process usage behaviors may be conducted through use of a keyboard, a mouse, oral commands, or using any other input device. Usage behaviors 920 in the system navigation and access behaviors category may include, but are not limited to, the viewing, scrolling through, or reading of displayed information, typing written information, interacting with online objects orally, or combinations of these forms of interactions with computer-based applications. This category includes the explicit searching for information, using, for example, a search engine. The search term may be in the form of a word or phrase to be matched against documents, pictures, web-pages, or any other form of on-line content. Alternatively, the search term may be posed as a question by the user.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the one or more computer-based systems 925, or may be associated with any other subset of the one or more computer-based systems 925. "Following" is another term that may be used for a subscription behavior—i.e., following a topic is synonymous with subscribing to a topic. Subscriptions or following behaviors may also be with regard to other users—the subscriber or follower receives activity streams of the subscribed to or followed user. A user's following behavior is distinguished from a linking behavior with regard to another user in that a following relationship is asymmetric, while a linking (e.g., "friending") relationship is typically symmetric (and hence linking is considered in the collaborative behavior category herein). Subscriptions may thus indicate the intensity of interest with regard to elements of the one or more computer-based systems 925. The delivery of information to fulfill subscriptions may occur online, such as through activity streams, electronic mail (email), on-line newsletters, XML or RSS feeds, etc., or through physical delivery of media.

Self-profiling refers to other direct, persistent (unless explicitly changed by the user) indications explicitly designated by the one or more users regarding their preferences and/or intentions and interests, or other meaningful attributes. A user 200 may explicitly identify interests or affiliations, such as job function, profession, or organization, and preferences and/or intentions, such as representative skill level (e.g., novice, business user, advanced). Self-profiling enables the one or more computer-based systems 925 to infer explicit preferences and/or intentions of the user. For example, a self-profile may contain information on skill levels or relative proficiency in a subject area, organizational affiliation, or a position held in an organization. A user 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and/or intentions and interests with regard to system use and associated topical areas, and with regard to degree of affinity with other user community subsets. A user may identify preferred methods of information receipt or learning style, such as visual or audio, as well as relative interest levels in other communities.

A third category of usage behaviors 920 is known as collaborative behaviors. Collaborative behaviors are interactions among the one or more users. Collaborative behaviors may thus provide information on areas of interest and intensity of interest. Interactions including online referrals of elements or subsets of the one or more computer-based systems 925, such as through email, whether to other users or to non-users, are types of collaborative behaviors obtained by the one or more computer-based systems 925.

Other examples of collaborative behaviors include, but are not limited to, online discussion forum activity, contributions of content or other types of objects to the one or more computer-based systems 925, posting information that is then received by subscribers, categorizing subscribers so as to selectively broadcast information to subscribers, linking to another user, or any other alterations of the elements, objects or relationships among the elements and objects of one or more computer-based systems 925. Collaborative behaviors may also include general user-to-user communications, whether synchronous or asynchronous, such as email, instant messaging, interactive audio communications, and discussion forums, as well as other user-to-user communications that can be tracked by the one or more computer-based systems 925.

A fourth category of process usage behaviors 920 is known as reference behaviors. Reference behaviors refer to the marking, designating, saving or tagging of specific elements or objects of the one or more computer-based systems 925 for reference, recollection or retrieval at a subsequent time. An indicator such as "like" is a reference behavior when used as a tag for later retrieval of associated information. Tagging may include the user 200 creating one or more symbolic expressions, such as a word or words (e.g., a hashtag), associated with the corresponding elements or objects of the one or more computer-based systems 925 for the purpose of classifying the elements or objects. The saved or tagged elements or objects may be organized in a manner customizable by users. The referenced elements or objects, as well as the manner in which they are organized by the one or more users, may provide information on inferred interests of the one or more users and the associated intensity of the interests.

A fifth category of process usage behaviors 920 is known as direct feedback behaviors. Direct feedback behaviors include ratings or other indications of perceived quality by individuals of specific elements or objects of the one or more computer-based systems 925, or the attributes associated with the corresponding elements or objects. The direct feedback behaviors may therefore reveal the explicit preferences and/or intentions of the user. In the one or more computer-based systems 925, the recommendations 250 may be rated by users 200. This enables a direct, adaptive feedback loop, based on explicit preferences and/or intentions specified by the user. Direct feedback also includes user-written comments and narratives associated with elements or objects of the computer-based system 925.

A sixth category of process usage behaviors is known as physiological responses. These responses or behaviors are associated with the focus of attention of users and/or the intensity of the intention, or any other aspects of the physiological responses of one or more users 200. For example, the direction of the visual gaze of one or more users may be determined. This behavior can inform inferences associated with preferences and/or intentions or interests even when no physical interaction with the one or more computer-based systems 925 is occurring. Even more direct assessment of the level of attention may be conducted through access to the brain patterns or signals associated with the one or more users. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by one or more regions of the brain.

Physiological responses may include any other type of physiological response of a user 200 that may be relevant for making preference or interest inferences, independently, or collectively with the other usage behavior categories. Other physiological responses may include, but are not limited to, utterances, vocal range, intensity and tempo, gestures, movements, or body position. Attention behaviors may also include other physiological responses such as breathing rate, heart rate, temperature, blood pressure, or galvanic response.

A seventh category of process usage behaviors is known as environmental conditions and physical location behaviors. Physical location behaviors identify geographic location and mobility behaviors of users. The location of a user may be inferred from, for example, information associated with a Global Positioning System or any other position or location-aware system or device, or may be inferred directly from location information input by a user (e.g., inputting a zip code or street address, or through an indication of location on a computer-implemented map), or otherwise acquired by the computer-based systems 925. The physical location of physical objects referenced by elements or objects of one or more computer-based systems 925 may be stored for future reference. Proximity of a user to a second user, or to physical objects referenced by elements or objects of the computer-based application, may be inferred. The length of time, or duration, at which one or more users reside in a particular location may be used to infer intensity of interests associated with the particular location, or associated with objects that have a relationship, such as proximity, to the physical location. Derivative mobility inferences may be made from location and time data, such as the direction of the user, the speed between locations or the current speed, the likely mode of transportation used, and the like. These derivative mobility inferences may be made in conjunction with geographic contextual information or systems, such as through interaction with digital maps or map-based computer systems. Environmental conditions may include the time of day, the weather, temperature, the configuration of physical elements or objects in the surrounding physical space, lighting levels, sound levels, and any other condition of the environment around the one or more users 200.

Sentiment such as emotional disposition may be inferred from the natural language expressed within some user behavior categories such as collaborative behaviors and/or from physiological responses such as utterances of, for example, excitement or exasperation, or from blood pressure levels, etc.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the one or more computer-based systems 925. The temporal patterns may include historical patterns, including how recently an element, object or item of content associated with one or more computer-based systems 925. For example, more recent behaviors may be inferred to indicate more intense current interest than less recent behaviors.

Another temporal pattern that may be tracked and contribute to derive preference inferences is the duration associated with the access or interaction with, or inferred attention toward, the elements, objects or items of content of the one or more computer-based systems 925, or the user's physical proximity to physical objects referenced by system objects of the one or more computer-based systems 925, or the user's physical proximity to other users. For example, longer durations may generally be inferred to indicate greater interest than short durations. In addition, trends over time of the behavior patterns may be captured to enable more effective inference of interests and relevancy. Since delivered recommendations may include one or more elements, objects or items of content of the one or more computer-based systems 925, the usage pattern types and preference inferencing may also apply to interactions of the one or more users with the delivered recommendations 250 themselves, including accesses of, or interactions with, explanatory information regarding the logic or rationale that the one more computer-based systems 925 used in deciding to deliver the recommendation to the user.

Adaptive Communications Generation

In some embodiments, adaptive communications 250c or recommendations 250 may be generated for the one or more users 200 through the application of affinity vectors.

For example, in some embodiments, Member-Topic Affinity Vectors (MTAVs) may be generated to support effective recommendations, wherein for a user or registered member 200 of the one or more computer-based systems 925 a vector is established that indicates the relative affinity (which may be normalized to the [0,1] continuum) the member has for one or more object sub-networks the member has access to. For computer-based systems 925 comprising a fuzzy content network-based structural aspect, the member affinity values of the MTAV may be with respect to topic networks.

So, in general, for each identified user, which can be termed a registered member in some embodiments, e.g., member M, a hypothetical MTAV could be of a form as follows:

MTAV for Member M

| Topic 1 | Topic 2 | Topic 3 | Topic 4 | ... | Topic N |
|---------|---------|---------|---------|-----|---------|
| 0.35    | 0.89    | 0.23    | 0.08    | ... | 0.14    |

The MTAV will therefore reflect the relative interests of a user with regard to all N of the accessible topics. This type of vector can be applied in two major ways:

A. To serve as a basis for generating adaptive communications 250c or recommendations 250 to the user 200

B. To serve as a basis for comparing the interests with one member 200 with another member 200, and to therefore determine how similar the two members are In some embodiments, an expertise vector (MTEV) may be used as a basis for generating recommendations of people with appropriately inferred levels of expertise, rather than, or in addition to, using an MTAV as in the exemplary examples herein. That is, the values of an MTEV correspond to inferred levels of expertise, rather than inferred levels of interests, as in the case of an MTAV.

To generate a MTAV or MTEV, any of the behaviors of Table 1 may be utilized. For example, in some embodiments the following example behavioral information may be used in generating an MTAV:

1) The topics the member has subscribed to received updates
2) The topics the member has accessed directly
3) The accesses the member has made to objects that are related to each topic
4) The saves or tags the member has made of objects that are related to each topic This behavioral information is listed above in a generally reverse order of importance from the standpoint of inferring member interests; that is, access information gathered over a significant number of accesses or over a significant period of time will generally provide better information than subscription information, and save information is typically more informative of interests than just accesses.

The following fuzzy network structural information may also be used to generate MTAV values:

5) The relevancies of each content object to each topic (OTAV values)
6) The number of content objects related to each topic Personal topics or tags that are not shared with other users 200 may be included in MTAV calculations. Personal topics that have not been made publicly available cannot be subscribed to by all other members, and so could in this regard be unfairly penalized versus public topics. Therefore, for the member who created the personal topic and co-owners of that personal topic, in some embodiments the subscription vector to may be set to "True," i.e. 1. There may exist personal topics that are created by a member 200 and that have never been seen or contributed to by any other member. This may not otherwise affect the recommendations 250 since the objects within that personal topic may be accessible by other members, and any other relationships these objects have to other topics will be counted toward accesses of these other topics.

In some embodiments the first step of the MTAV calculation is to use information 1-4 above to generate the following exemplary table or set of vectors for the member, as depicted in the following hypothetical example:

TABLE 2

| | Member 1 Behaviors | | | | |
|---|---|---|---|---|---|
| | Topic 1 | Topic 2 | Topic 3 | Topic 4 | ... Topic N |
| Subscriptions | 1 | 1 | 0 | 0 | 1 |
| Topic Accesses | 14 | 3 | 57 | 0 | 8 |
| Weighted Accesses | 112 | 55 | 23 | 6 | 43 |
| Weighted Saves | 6 | 8 | 4 | 0 | ... 2 |

The Subscriptions vector of Table 2 contains either a 1 if the member has subscribed to a topic or is the owner/co-owner of a personal topic or a 0 if the member has not subscribed to the topic. The Topic Accesses vector contains the number of accesses to that topic's explore page by the member to a topic over a period of time, for example, the preceding 12 months.

The Weighted Accesses vector of Table 1 contains the number of the member's (Member 1) accesses over a specified period of time of each object multiplied by the relevancies to each topic summed across all accessed objects. (So for example, if Object 1 has been accessed 10 times in the last 12 months by Member 1 and it is related to Topic 1 by 0.8, and Object 2 has been accessed 4 times in the last 12 months by Member 1 and is related to Topic 1 at relevancy level 0.3, and these are the only objects accessed by Member 1 that are related to Topic 1, then Topic 1 would contain the value 10*0.8+4*0.3=9.2).

The Weighted Saves vector of Table 1 works the same way as the Weighted Accesses vector, except that it is based on Member 1's object save data instead of access data.

In some embodiments, topic object saves are counted in addition to content object saves. Since a member saving a topic typically is a better indicator of the member's interest in the topic than just saving an object related to the said topic, it may be appropriate to give more "credit" for topic saves than just content object saves. For example, when a user saves a topic object, the following process may be applied:

If the Subscriptions vector indicator is not already set to "1" for this topic in Table 1, it is set to "1". (The advantage of this is that even if the topic has been saved before 12 months ago, the user will still at least get subscription "credit" for the topic save even if they don't get credit for the next two calculations).

In exactly the same way as a saved content object, a credit is applied in the Weighted Accesses vector of Table 2 based on the relevancies of other topics to the saved topic. A special "bonus" weighting in the Weighted Accesses vector of Table 2 may be applied with respect to the topic itself using the weighting of "10"—which means a topic save is worth at least as much as 10 saves of content that are highly related to that topic.

The next step is to make appropriate adjustments to Table 2. For example, it may be desirable to scale the Weighted Accesses and Weighted Saves vectors by the number of objects that is related to each topic. The result is the number of accesses or saves per object per topic. This may be a better indicator of intensity of interest because it is not biased against topics with few related objects. However, per object accesses/saves alone could give misleading results when there are very few accesses or saves. So as a compromise, the formula that is applied to each topic, e.g., Topic N, may be a variation of the following in some embodiments:

((Weighted Accesses for Topic N)/(Objects related to Topic N))*Square Root(Weighted Accesses for Topic N)

This formula emphasizes per object accesses, but tempers this with a square root factor associated with the absolute level of accesses by the member. The result is a table, Table 2A, of the form:

TABLE 2A

| | Member 1 Behaviors | | | | |
|---|---|---|---|---|---|
| | Topic 1 | Topic 2 | Topic 3 | Topic 4 | ... Topic N |
| Subscriptions | 1 | 1 | 0 | 0 | 1 |
| Topic Accesses | 14 | 3 | 57 | 0 | 8 |
| Weighted Accesses | 9.1 | 12 | 3.2 | 0.6 | 2.3 |
| Weighted Saves | 0.9 | 1.3 | 1.1 | 0 | ... 0.03 |

In some embodiments, the next step is to transform Table 2A into a MTAV. In some embodiments, indexing factors, such as the following may be applied:

| Topic Affinity Indexing Factors | Weight |
|---|---|
| Subscribe Indexing Factor | 10 |
| Topic Indexing Factor | 20 |
| Accesses Indexing Factor | 30 |
| Save Indexing Factor | 40 |

These factors have the effect of ensuring normalized MTAV values ranges (e.g. 0-1 or 0-100) and they enable more emphasis on behaviors that are likely to provide relatively better information on member interests. In some embodiments, the calculations for each vector of Table 1A are transformed into corresponding Table 2 vectors as follows:
1. Table 3 Indexed Subscriptions for a topic by Member 1=Table 2A Subscriptions for a topic * Subscribe Indexing Factor
2. Table 3 Indexed Direct Topic Accesses by Member 1=Table 2A Topic Accesses* Topic Indexing Factor
3. Table 3 Indexed Accesses for a topic by Member 1=((Table 2A Weighted Accesses for a topic by Member 1)/(Max(Weighted Accesses of all Topics by Member 1))) * Accesses Indexing Factor
4. Table 3 Indexed Saves for a topic by Member 1=((Table 2A Weighted Saves for a topic by Member 1)/(Max (Weighted Saves of all Topics by Member 1))) * Saves Indexing Factor The sum of these Table 3 vectors results in the MTAV for the associated member 200 as shown in the hypothetical example of Table 3 below:

TABLE 3

| | Member 1 Indexed Behaviors | | | | |
|---|---|---|---|---|---|
| | Topic 1 | Topic 2 | Topic 3 | Topic 4 | ... Topic N |
| Subscriptions | 0 | 10 | 10 | 10 | 10 |
| Topic Accesses | 5 | 1 | 20 | 0 | 8 |
| Weighted Accesses | 11 | 1 | 30 | 12 | 6 |
| Weighted Saves | 0 | 10 | 40 | 1 | 2 |
| Member 1 MTAV | 16 | 22 | 100 | 23 | ... 26 |

In some embodiments, member-to-member affinities can be derived by comparing the MTAVs of a first member 200 and a second member 200. Statistical operators and metrics such as correlation coefficients or cosine similarity may be applied to derive a sense of the distance between members in n-dimensional topic affinity space, where there are N topics. Since different users may have access to different topics, the statistical correlation for a pair of members is preferentially applied against MTAV subsets that contain only the topics that both members have access to. In this way, a member-to-member affinity vector (MMAV) can be generated for each member or user 200, and the most similar members, the least similar members, etc., can be identified for each member 200. In some embodiments, a member-to-member expertise vector (MMEV) may be analogously generated by comparing the MTEVs of a pair of users 200 and applying vector similarity methods such as cosine similarity.

With the MTAVs, MMAVs, and Most Similar Member information available, a set of candidate objects to be recommended can be generated in accordance with some embodiments. These candidate recommendations may, in a later processing step, be ranked, and the highest ranked candidate recommendations will be delivered to the recommendation recipient 200,260. Recall that recommendations 250 may be in-context of navigating the system 925 or out-of-context of navigating the system 925.

A variation of the out-of-context recommendation process may be applied for in-context recommendations, where the process places more emphasis of the "closeness" of the objects to the object being viewed in generating candidate recommendation objects.

For both out-of-context and in-context recommendations, a ranking process may be applied to the set of candidate objects, according to some embodiments. The following is an exemplary set of input information that may be used to calculate rankings.
1. Editor Rating: If there is no editor rating for the object, this value is set to a default
2. Community Rating (If there is no community rating for the object, this value can be set to a default)
3. Popularity: Indexed popularity (e.g., number of views) of the object.
4. Change in Popularity: Difference in indexed popularity between current popularity of the object and the object's popularity some time ago
5. Influence: Indexed influence of the object, where the influence of an object is calculated recursively based on the influence of other objects related to said object, weighted by the degree of relationship to said object, and where the initial setting of influence of an object is defined as its popularity.
6. Author's Influence: Indexed influence of the highest influence author (based on the sum of the influences of the author's content) of the content referenced by the object
7. Publish Date: Date of publication of the object
8. Selection Sequence Type: An indicator the sequence step in which the candidate object was selected
9. Object Affinity to MTAV: The indexed vector product of the Object-Topic Affinity Vector (OTAV) and the MTAV. The values of the OTAV are just the affinities or relevancies between the object and each topic, which may be derived from behavioral and/or contents indexing processes.

A ranking is then developed based on applying a mathematical function to some or all or input items listed directly above, and/or other inputs not listed above. In some embodiments, user or administrator-adjustable weighting or tuning factors may be applied to the raw input values to tune the object ranking appropriately. These recommendation preference settings may be established directly by the user and remain persistent across sessions until updated by the user, in some embodiments.

Some non-limiting examples of weighting factors that can be applied dynamically by a user 200 or administrator are as follows:

1. Change in Popularity ("What's Hot" factor)
2. Recency Factor
3. Object Affinity to MTAV (personalization factor)

Another example tuning factor that may be applied by a user 200 or administrator is contextual affinity, which is the degree of affinity of the object that is providing the context for the recommendation and its affinity to other objects, wherein the affinities are determined by means, for example, of applying its CTAV, or by comparison of its OCV to the OCVs of other objects. These weighting factors could take any value (but might be typically in the 0-5 range) and could be applied to associated ranking categories to give the category disproportionate weightings versus other categories. They can provide control over how important, for example, change in popularity, freshness of content, and an object's affinity with the member's MTAV are in ranking the candidate objects.

The values of the weighting factors are combined with the raw input information associated with an object to generate a rating score for each candidate object. The objects can then be ranked by their scores, and the highest scoring set of X objects, where X is a defined maximum number of recommended objects, can be selected for deliver to a recommendation recipient 200,260. In some embodiments, scoring thresholds may be set and used in addition to just relative ranking of the candidate objects. The scores of the one or more recommended objects may also be used by the computer-based system 925 to provide to the recommendation recipient a sense of confidence in the recommendation. Higher scores would warrant more confidence in the recommendation of an object than would lower scores.

Knowledge and Expertise Discovery

Knowledge discovery and expertise discovery refer to "learning layer" functions that generate content recommendations and people recommendations 250, respectively.

For expertise discovery, there are at least two categories of people that may be of interest to other people within a user community:

1. People who have similar interest or expertise profiles to the recommendation recipient, which may be calculated, for example, in accordance with MMAVs and MMEVs.
2. People who are likely to have the most, or complementary levels of, expertise in specified topical areas Expertise discovery functions deliver recommendations 250 within a navigational context of the recommendation recipient 200, or without a navigational context. In some embodiments, a person or persons may be recommended consistent with the "navigational neighborhood," which may be in accordance with a topical neighborhood that the recommendation recipient 200 is currently navigating. The term "navigating" as used herein should be understood to most generally mean the movement of the user's 200 attention from one object 212 to another object 212 while interacting with, or being monitored by, a computer-implemented user interface (wherein the user interface may be visual, audio and/or kinesthetic-based). Interacting with a tag or semantic element associated with a temporally sequenced media, for example, is an act of navigating, as is browsing or scrolling through an activity stream or news feed through use of a mouse, keyboard, and/or gesture detection sensor.

In some embodiments expertise may be determined through a combination of assessing the topical neighborhood in conjunction with behavioral information 920. The behavioral information that may be applied includes, but is not limited to, the behaviors and behavior categories in accordance with Table 1. As a non-limiting example, an expertise score may be generated from the following information in some embodiments:

1. The scope of the topical neighborhood, as described herein
2. The topics created by each user within the topical neighborhood
3. The amount of content each user contributed in the topical neighborhood
4. The popularity (which may be derived from accesses and/or other behaviors) of the content
5. The ratings of the content Adaptive Auto-Learning Semantic System and Method Semantic approaches, as exemplified by, but not limited to, the Resource Description Framework (RDF), refer to system relationships that are represented in the form of a subject-predicate-object chain (a syntactic "triple"), or natural language-based extensions thereof, wherein the predicate is typically a descriptive phrase, but can be a verb phrase, that semantically connects the subject with the object of the predicate. Since the subject and the object of the predicate can be represented as computer-implemented objects 212, semantic chains can represent computer-implemented object-to-object relationships that are informed by the associated predicate in the semantic chain. Most generally, subjects, predicates, and objects of the predicates of semantic chains can each be represented in a computer-based system 925 as computer-implemented objects 212. Semantic chains may be established manually, but can also be generated automatically by the computer-based system 925 through, for example, natural language processing (NLP) techniques that are applied to text strings such as sentences within a computer-implemented object 212 so as to automatically decompose the text into one or more semantic triples. Additional or alternative automatic techniques that can be applied by the computer-based system 925 to extract semantic chains from natural language can include generating vectors of values for language elements such as words or phrases within one or more objects 212, and generating relationships based on vector comparisons among these language elements. Neural networks, such as, but not limited to, recurrent neural networks, LSTMs, GRUs, and/or transformer-based neural networks, or convolutional neural networks combined with attention-based techniques such as transformers, may be applied to facilitate the interpretation of text. Text can additionally or alternatively also be automatically analyzed through the application of a graphical-based logical form in which elements of text are represented as nodes and edges of the graph represent grammatical relationships to derive semantic chains. Semantic chains that are derived from natural language using these or other techniques known in the art may then be linked or chained together as is described in more detail herein. More generally, semantic chains can be represented by predicate calculus, and it should be understood that processes disclosed herein with respect to semantic chains apply more generally to predicate calculus-based representations.

Semantic chains automatically derived from natural language-based content sources by the system 925 can be categorized as 1) semantic chains pertaining to the source content itself, and 2) semantic chains that represent generalizations that are inferred from processing the source's content and, when applicable, in combination with the system's prior knowledge. The generalizations may be directed to be a representation of objective reality in accordance with some embodiments, but may also be directed to, for example, imaginative scenarios, whether received from external sources or imaginative scenarios internally generated by the system 925.

In some embodiments, weightings, which may comprise probabilities, are applied to semantic chains. For example, the semantic chain Object(1)-Predicate(1)-Object(2) may have a weighting (which may be normalized to the range 0-1), "W1" assigned to it: W1(Object(1)-Predicate(1)-Object(2)). Such a weighting (which may be termed a "W1-type" weight or probability hereinafter) may correspond to a probabilistic confidence level associated with the semantic chain that the semantic chain represents objective reality. The weighting may be calculated by inferential statistical means based upon content-based patterns and/or user behavioral patterns (such as word or phrase matching frequency and/or length matched chain sub-elements). For example, the semantic chain "Red Sox-is a-team" might be assigned a weighting of 0.80 based on an inferential confidence given a first set of textual content from which the semantic chain is statistically inferred (and where "textual" or "text" as used herein may be in written or audio language-based forms). This weighting might be increased, say to 0.99, based on an analysis of additional text that seems to strongly confirm the relationship. Such weightings may therefore be considered probabilities that the inference is true—that is, the probability that the inference accurately reflects objective reality (where "objective reality" is defined herein as the true state of the universe as it would be understood by an observer with benefit of perfect information). It should be understood that such probabilistic inferences with respect to semantic chains may be made based upon inputs other than just through the analytic processing of text-based computer-implemented objects. Such inferences can alternatively or additionally be made with respect to patterns of information that are identified with respect computer-implemented objects 212 comprising images, a sequence of images (e.g., videos), or audio-based information, for example. For example, in some embodiments, neural network-based systems are trained to make inferences of relevant semantic chains from text and/or images and to inform W1-type weights associated with the inferred semantic chains. In some embodiments Bayesian learning-based processes are applied to make inferences of relevant semantic chains from text and/or images and to inform W1-type weights associated with the inferred semantic chains.

In addition, or alternatively, to W1 weights (and W3 and W4 weights as described herein), a contextual weighting, "W2", may be applied that weights a semantic chain based on the relative importance or relevance of the relationships described by the semantic chain versus other relationships with respect to one or both of the objects (which may be included in one or more other semantic chains) within the semantic chain (and such weights may be termed a "W2-type" weight hereinafter). For example, a W2-type weight as applied to the semantic chain "Red Sox-is a-team" may be greater than the W2-type weight applied to the semantic chain "Red Sox-is a-logo" for a particular inferential application. While both semantic chains may be valid (that is, accurately reflect objective reality), the term "Red Sox" as used in a randomly selected item of content is more likely to be used in the context of being a team than as being used in the context of being a logo, and should therefore, everything else being equal, be more likely be used as a basis for subsequent computer-implemented semantic interpretations of content that includes a reference to "Red Sox". As in the case of W1-type weights, W2-type weights may correspond to probabilities, and may be established and/or adjusted based on statistical inferences from content (in a simple, non-limiting example, based on the frequency of co-occurrences of the respective objects in the semantic chain within a corpus of content) and/or from inferences derived from user 200 behaviors as described in Table 1. Alternatively, W2-type weightings may be explicitly established by humans.

So, in summary, whereas weightings of the type associated with W1 can be construed to be the probability that the associated semantic chain accurately reflects objective reality, weightings of the type associated with W2 can be construed to be the probability that the associated semantic chain validly applies semantically in the context of interpreting specified content.

These foregoing semantic representations are contrasted with behavioral-based user-predicate-object computer-implemented representations, which, while they can be represented in a similar chain or "triple" form as RDF, represent specific types of semantic chains that are distinguished in that the subject in behavioral-based chains represents or refers to an actual user 200 of the computer-based system 925, and the associated predicate represents actions or behaviors 920 that the user 200 of the system exhibits or performs in association with a system object 212, or in which the associated predicate is an inference, for example, of the user's 200 state of mind or, as another example, a historical event associated with the user 200. The predicates of the behavioral-based triple may include, but are not limited to, actions or behaviors 920 exhibited by the user as described by Table 1 and associated descriptions. The predicates of some types of behavioral-based triples may comprise computer-generated inferences rather than a specifically performed or monitored behavior 920 in some embodiments. For example, for the behavioral-based triple User(1)-Is Interested In-Object(1), the predicate "Is Interested In" may be an inference derived from one or more usage behaviors 920. As another example, for the behavioral-based triple User(1)-Has High Expertise In-Object(1), the predicate "Has High Expertise In" may be an inference derived from one or more usage behaviors 920 and/or an analysis of content. These two examples comprise inferences of a user's state of mind or capabilities. More concrete inferences, such as of events or relationships, may also be made—for example, the behavioral-based triple User(1)-Worked For-Object(1), the predicate "Worked For" may be an inference that is made from a statistical analysis of content and/or from one or more usage behaviors 920. In such event-based applications temporal indicators such as a timestamp or time period may be associated with the associated behavioral-based triple. Such temporal indicators can further enable the computer-based system 925 to make connections between events and promote more effective inferencing.

W1-type weights may be applied to behavioral-based chains that comprise an inferred predicate relationship between the user 200 and the object of the predicate, the W1-type weight thereby representing the degree of confidence that the behavioral-based chain represents objective reality, whereby objective reality in this case may constitute the user's current or future state-of-mind.

Behavioral-based triples may be with respect to "real-world" locations or physical objects that are located at a particular point or proximity in space and/or time, in some embodiments. For example, a user 200 may be determined to be at Fenway Park by, for example, matching the user's currently inferred location from a location-aware device that is associated with the user to a computer-implemented map that maps physical objects such as Fenway Park to particular geographical locations. This determination could be represented, for example, as the behavioral-based triple User(1)-Is Located At-Fenway Park, and with an associated time stamp t(1). This same approach can be applied to simulations of real-world environments or real world-like environments (i.e., virtual or augmented reality applications), where the user 200 in the behavioral triple is represented in the simulation, by, for example, an avatar.

Behavioral-based triples may be with respect to two people, and the object of the predicate of the triple may represent or reference another system user 200. For example, User(1)-Is Located Near-User(2) is an example of an event-based behavioral triple (and that may have an associated temporal indicator) and User(1)-Is a Friend of-User(2) is an example of an inferential behavioral triple, in which the system automatically infers the "Is a Friend of" predicate.

In summary, while the subjects and predicates in semantic triples are therefore generally different in nature from behavioral-based triples, the similarity of syntactical structure can be beneficially used to extend semantic-based approaches so that they are adaptive to users 200.

In some embodiments semantic chains are converted to OTAVs. Predicate relationships between objects are transformed to numerical values (i.e., affinities) in such embodiments, which can have, for example, scalability advantages. These OTAV affinities may correspond to, or be influenced by or calculated from, corresponding W1-type or W2-type (or W4-type) semantic chain weightings. In some embodiments semantic chains are converted to numeric-based constructs by a vector embedding process such as a Word2vec-type process that applies trained neural networks and OTAVs are then generated by comparing the resulting vectors to the vectors generated by a similar vector embedding process applied to topics, the comparison being performed by the application of vector similarity evaluation methods such as cosine similarity.

In some embodiments, the behavioral-based representations of user-predicate-object are linked to semantic-based object-to-object 212 relations 214. For example, for a specific computer-implemented object 212, denoted as Object (1), for which there is at least one user behavioral-based relationship, User-Predicate(1)-Object(1) (where Predicate (1) may comprise an inference), and at least one semantic relationship between objects—for example, an RDF-type relationship of the form, Object(1)-Predicate(2)-Object(2) (where Predicate(2) may comprise an inference), inferences with respect to User 200 and Object(2) may be derived from the extended chain of User-Predicate(1)-Object(1)-Predicate (2)-Object(2). In this example, Object(1) enables the linking because it is commonly referenced by the behavioral-based chain and the semantic chain. Most generally, such linking (or also termed "chaining" herein) can be performed when the subject (potentially in combination with its predicate) of a second semantic chain has a correspondence to the object of the predicate (potentially in combination with its predicate) of a first semantic chain (and either of the semantic chains may be a behavioral-based semantic chain). The correspondence between such subject and object pairs may be based, for example, on the subject and object referring to the same entity or information, or representing the same entity or information. The correspondence may be made by alphanumeric-based correspondences, potentially with aid of synonym tables and/or knowledge networks comprising ontologies. Additionally, or alternatively, the correspondence may be made by comparing the vectorized embeddings (generated by a trained neural network) of the subject and the object and determining the degree similarity between the vectors, such as via cosine similarity calculations. The calculated degree of similarity may be applied to influence a W1-type probability associated with the associated semantic chain comprising the first and second semantic chains.

Composite chains can be extended indefinitely by identifying the subject of a semantic chain that has a correspondence with the terminal object of a predicate of a composite chain, and linking the identified semantic chain to the end of the composite chain, thereby assembling a new, extended composite chain, which can in turn be extended, and so on.

In some embodiments, one or more of the constituent semantic chains of such composite chains may include W1-type and/or W2-type (and/or W4-type) weightings. Mathematical operations may be applied to these weightings to derive a composite weighting or probability for the composite chain. For example, where there are multiple individual semantic chain weightings that each correspond to a probability within a composite chain, the individual weightings may be aggregated by application of mathematical functions, such as, but not limited to, by application of a multiplicative function, to yield a composite chain probability, e.g., a probability that the composite chain is a valid inference of objective reality and/or a probability that the composite chain semantically validly applies to an interpretation of particular content.

Further, as previously described herein, behavioral-based chains may be weighted as well with W1-type weights that correspond to the probability that the inference of the behavioral-based chain accurately reflects objective reality—in some cases, objective reality constituting a conscious or unconscious mental state of the user that cannot be directly assessed but must rather be inferred from behaviors 920. This type of behavioral-based chain weighting may be combined with mathematical operations (such as multiplication) with one or more semantic chain weightings to yield a composite chain weighting or probability. Such composite weightings may correspond to affinity values of MTAVs or MTEVs in some embodiments; for example, where a composite chain includes a terminal object (last object in the semantic chain) that comprises a topic that is also associated with an MTAV or MTEV.

Recommendations 250 can then be generated based on these linked or composite chains. As a simple non-limiting example, assume that a behavioral-based triple is, User(1)-"likes"-Object(1), whereby the predicate "like" is a user action 920 of "liking" a computer-implemented object as described by the descriptions that are associated with Table 1. This behavioral-based triple might be applied directly, or it may serve as a basis (along with potentially other behavioral-based chains) for an inferential behavioral-based chain such as, User(1)-Is Favorably Disposed Toward-Object(1), whereby the predicate "Is Favorably Disposed Toward" is inferred from one or more usage behaviors 920 (such as a "like" action by a user 200) and/or from content-based pattern matching. The confidence with respect to this inference may be encoded as a W1-type weighting that is associated with the inferred behavioral-based triple.

As a further example, assume that there exists a semantic triple of Object(1)-"is a"-Object(2), wherein the "is a" predicate designates that Object(1) is a type of, or subset of, Object(2). The system can then generate the composite chain User(1)-"likes"-Object(1)-"is a"-Object(2). The system can then make an inference that User(1) likes or is favorably disposed toward Object(2), and may apply weightings that are associated with the behavioral-based based chain and/or the semantic chain in quantifying the degree of confidence with respect to the inference. Such quantifications may be encoded as one or more affinity values within the MTAV of User(1), in some embodiments. Other composite chains terminating with Object(2) could additionally be applied that could have a further effect on the inference quantification (e.g., strengthening or weakening the confidence in the inference).

It should be recalled that a computer-implemented object 212 as defined herein can comprise content, or a pointer to content, that is in the form of a document, image, video, or audio file, but can also be a topic object, which comprises a label or description of other objects. So another non-limiting example is, User(1)-"viewed"-Object(1), where the predicate "viewed" is a user 200 action of viewing a computer-implemented object as described by Table 1, and Object(1)-"is about"-Object(2), where Object(2) is a topic object or tag that designates "baseball." The system can then determine the composite chain User(1)-viewed-Object(1)-is about-Object(2). The system therefore determines that user(1) has viewed content that is about baseball, and could therefore be able to infer a user interest with respect to baseball. To continue the example, assume a semantic triple of Object (1)-"is about"-Object(3), wherein Object(3) is a topic object or tag that designates "Red Sox." Then, assume there also exists the semantic triple, Red Sox-is located-Boston. The system can then assemble the chain, User(1)-viewed-Object (1)-is about-Red Sox-is located-Boston, which could allow the system to infer that User(1) has an interest in Boston or things located in Boston in general, although this would likely be a very weak inference in this example given only one view behavior, and this weak inference could be encoded as a corresponding low weighting or probability associated with the composite chain that is derived from weightings or probabilities associated with the composite chain's behavioral-based chain (or weightings or probabilities of a corresponding inferred behavioral-based chain derived, at least in part, from the User(1)-"viewed"-Object (1) chain) and/or with one or more of the composite chain's constituent semantic chains.

Figure 14A:
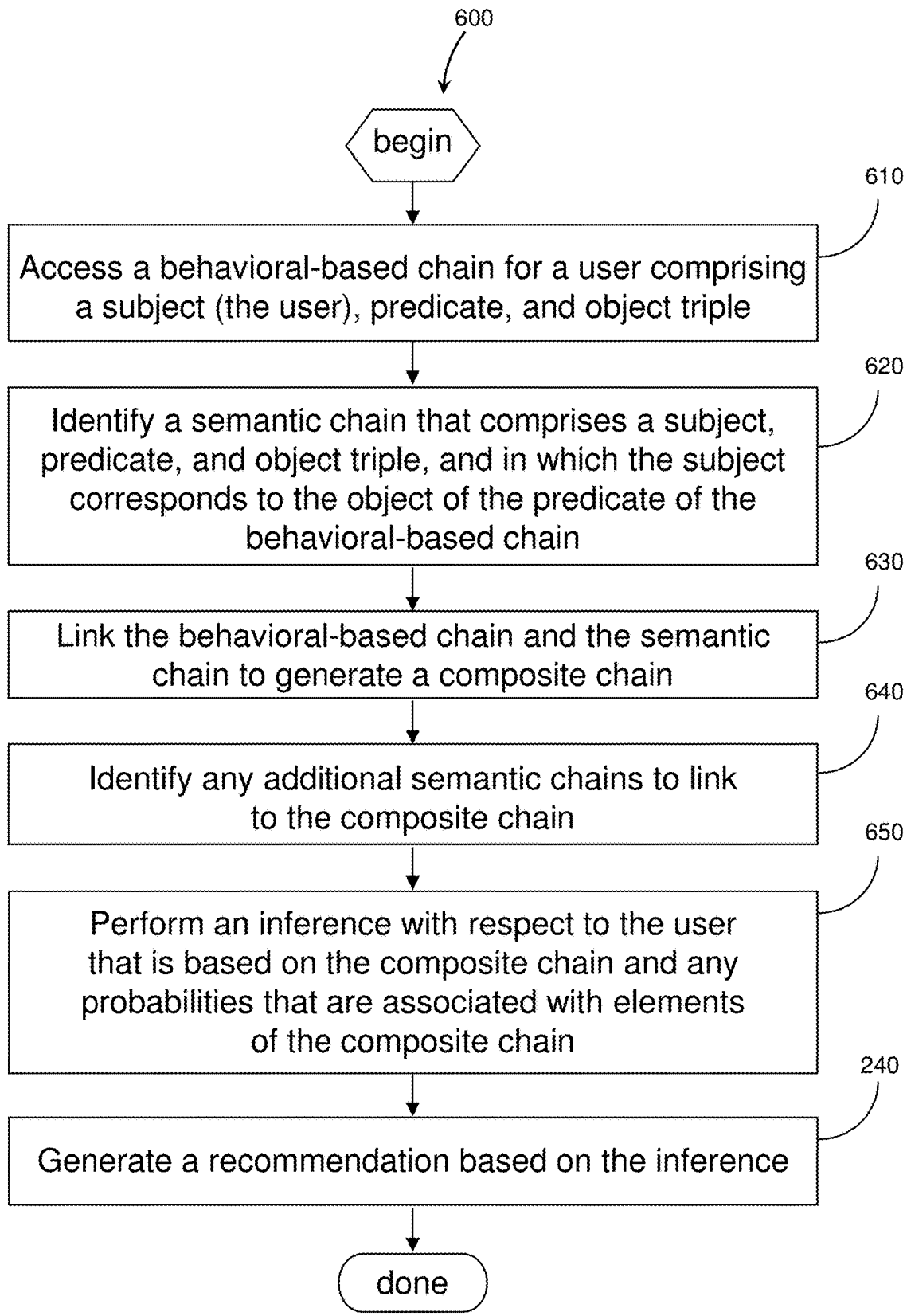
FIG. 14A is a flow diagram of a process of integrating, and generating inferences from, behavioral-based chains and semantic chains, according to some embodiments.

FIG. 14A summarizes the computer-implemented process 600 for generating recommendations 250 or, more generally, personalized communications, 250c, derived from the linking of behavioral-based and semantic chains and the performing of inferences from the resulting composite chains. In the first step 610 of the process 600 a behavioral-based chain that includes a subject that is associated with a user 200 is accessed. A semantic chain is then identified 620 that comprises a subject-predicate-object triple in which the subject has a correspondence with the object of the predicate of the behavioral-based chain. This correspondence enables linking 630 the behavioral-based chain and the semantic chain to form a composite chain. One or more additional semantic chains may be identified 640 to be linked to the composite chain by identifying any semantic chains that comprise a subject that has a correspondence to the terminal object of the composite chain. If at least one such semantic chain is identified, the semantic chain may be added to the composite chain, thereby creating a new composite chain, and step 640 may be repeated with this resulting composite chain. After assembly of the composite chain is completed, inferences may be performed 650 that are derived from the composite chain and its associated probabilities as described herein. The inferences may then be used to generate 240 recommendations 250, or more generally, personalized communications 250c.

Inferences derived from composite behavioral-based and semantic chains can be used to generate MTAV and/or MTEV or values. In the example above, "Boston" could be a topic in the MTAV of User(1) with an associated inferred affinity value. Had the predicate in the example above been "created" instead of "viewed" and other users had rated Object(1) highly, then "Red Sox", might be a topic in the MTEV of User(1) with an associated inferred affinity or expertise value.

In some embodiments linked behavioral-based and semantic chains can be further linked or mapped to OCVs. For instance, in the example above, if the term "Red Sox" has a sufficiently high value in the OCV associated with a document embodied in an object 212, then an inference might be made by the computer-based system 925 between User(1) and the associated object 212 that has a sufficiently high value for "Red Sox" in the object's OCV. This inference could in turn become a basis for a recommendation 250.

While these examples are with respect to behavioral-based and semantic triples, other syntactical structures or symbolic representations can also be applied by the computer-based system 925—for example, this method of integration of behavioral-based and semantic chains can be applied to syntactical structures that are in accordance with, or can be represented by, a predicate calculus. In some embodiments, semantic chains may be alternatively represented as taxonomies or ontologies such as hierarchical structures.

In some embodiments, neural networks (for example, but not limited to, recurrent-based and/or convolutional-based neural networks and/or attention-based models such as transformers) are trained to identify objects in a first set of images or videos, as well as various attributes that physical objects can have, such as color, texture, shape, mobility, etc. The identification may be directly through interpretation of patterns of pixels associated with the images or videos and/or through interpretations of audio-based language that is associated with the images or videos. The system 925 is then provided a second set of videos (which could be sourced from cameras that stream real-world information to the system) from which the system learns, including learning to generalize, based upon its prior learning to identify specific physical objects within a video. The system infers physical objects that are represented in the second set of videos (which translate to subjects and objects in semantic chains) and infers attributes, relationships, and interactions among the physical objects (which may map to predicates in semantic chains). These inferences from the second set of videos of physical objects and their relationships and interactions can be embodied by the system 925 as semantic chains and associated weights.

Inferences of attributes that are associated with physical objects can be generalized and/or can pertain specifically to a particular instance of content (i.e., specific to an observation) that the system learns from, such as video. A generalized attribute of an object may be embodied in a semantic chain of the form, Object A-can be-Attribute A, for example, with the object of the predicate being the attribute and with the "can-be" predicate or variations thereof being indicative of a possibility that has been verified to exist (at least with some interpretive confidence level, which may be embodied as a W3 weight, as described herein). For example, "a baseball-can be-white" is a semantic chain representation of a generalized attribute of baseballs that the system might learn from the second set of videos. The system might also record that "baseballs-are-white" as an attribute that is specific to a video that it has processed. Thus, the system can answer at least two different kinds of questions with regard to the color of baseballs: "What color can baseballs be?" (generalization) and "In the video you watched, what were the color of the baseballs?" (specific to an observation). The generalized attributes can cumulate as additional videos are processed by the system. For example, the system might find that by processing some videos of baseball games from the 1970s that at least some baseballs are, or at least have been, orange, but that by far most of the instances that the system has processed are of baseballs that are white, and so the system might answer the question, "What color are baseballs?" by indicating that, "Baseballs are usually white in my experience, but can sometimes be orange."

Figure 9:
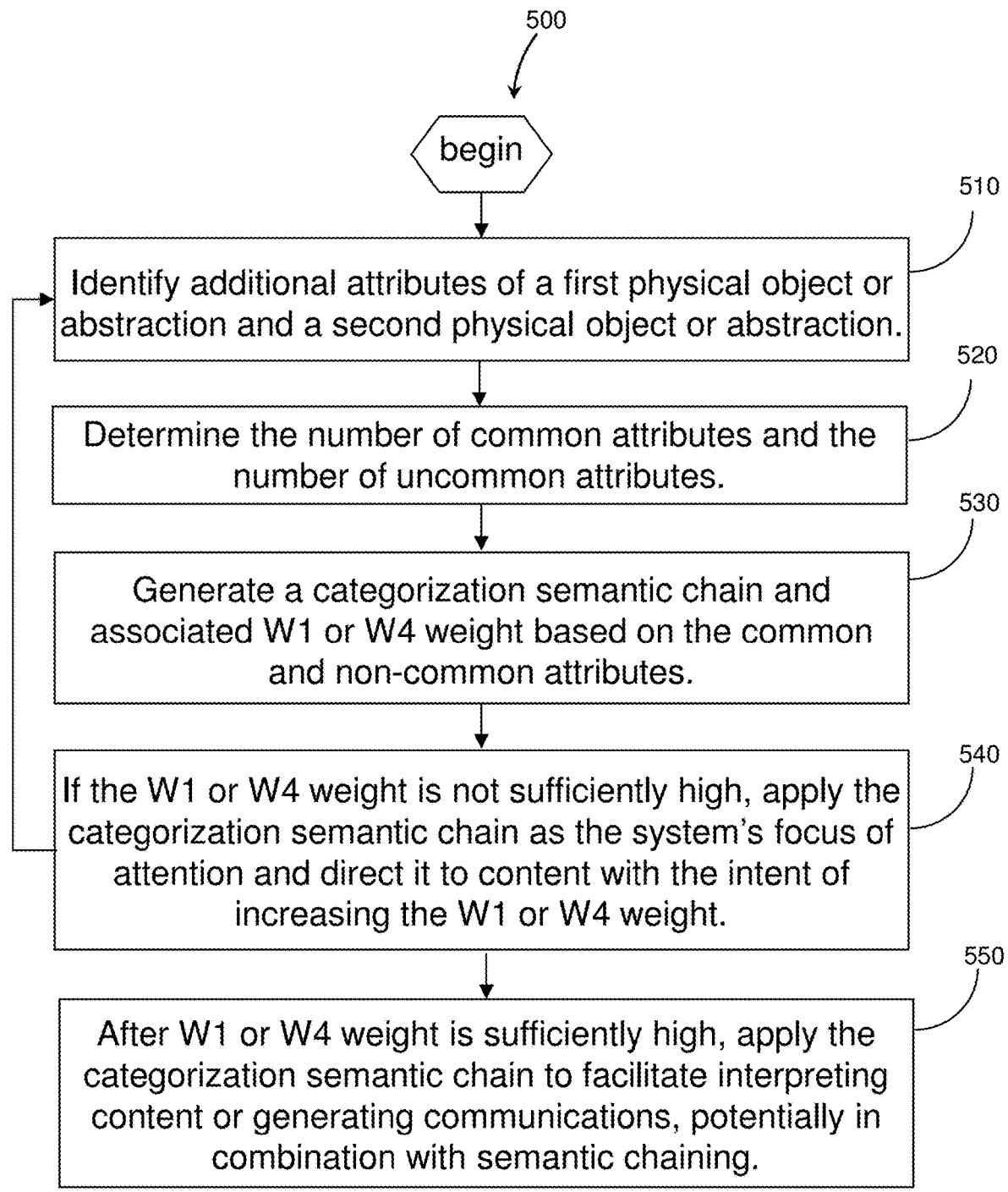
FIG. 9 is a flow diagram of auto-learning semantic-based categorization relationships, according to some embodiments.

As the system's inventory of objects and associated inferred attributes grows, the system 925 can relate and categorize objects based upon the corpus of attributes as is depicted by FIG. 9. The system determines additional attributes 510 related to each of a pair of objects, whereby the objects can be, for example, physical in nature (e.g., a baseball, which is a physical object) or, for example, an abstraction (e.g., sports, which is a categorization label), and may be translated into semantic forms such as with "can be" predicates or variations thereof. The system then analyzes the relationships between the respective sets of attributes for each of the objects 520. For example, everything else being equal, the higher the ratio of common attributes to total attributes between a pair of objects (where, again, objects can be abstractions or categories such as "sports," rather than just physical objects), the stronger the inferred relationship between a pair of objects. Where the attributes of an object, Object A, are a subset, or are primarily a subset, of those of a second object, Object B, the system may infer that the first object is a type of second object, and encode that as a semantic chain of Object A-is_a_type_of-Object B or variations thereof, potentially with an associated W1 weighting that may be, for example, a function of the number of attributes that the system has learned for each object and the confidence levels (e.g., W3 weights) associated with the systems inferences of each of the objects' attributes from specific observations. The W1 weight may also depend on the degree to which the attributes of a first object, Object A, is a subset of those of a second object, Object B, whereby the W1 is highest everything else being equal when the attributes of Object A are a proper subset of Object B, and lower when there are some attributes of Object A that do not match those of Object B. In this way, the W1 weight for categorization as embodied, but not limited to, the "type of" predicate of semantic chains, can constitute categorizations of fuzzy sets.

In another embodiment, a separate type of weight, a W4-type weight is associated with semantic chains that are indicative of categorization by, for example, the "type of" predicate, by system 925 so as to designate the degree to which an object is a subset of another object or category 530. The inverse of the "type of" predicate (or variations thereof) is the "include" predicate (or variations thereof). So, for example, if the system learns that "baseball-is a type of-sport," with potentially a W1 and/or a W4 weight associated with the semantic chain, the system could generate the inverse semantic chain, "sports-include-baseball." For a game such as chess, the system may learn that sometimes "chess-is a type of-sport" but other times it is not considered as such, and so the W1 and/or W4 weight associated with the semantic chain would be lower than that of baseball. When translating the semantic chains into natural language the system would therefore more likely hedge in its language with regard to chess being considered a sport.

If the W1 or W4 weight associated with a categorization semantic chain is not sufficiently high, the system may automatically focus its attention on processing additional content with the intent of increasing the W1 or W4 weight 540. Thus, a self-learning feedback loop is enabled whereby the system understands what it does not sufficiently understand and takes action to improve its understanding.

Assuming the W1 or W4 weight is at what the system 925 perceives to be an adequate level, the system is able to apply the learned attributes and categorization semantics to facilitate deductions, interpretations of content, and generating communications that are directed externally and/or to itself 550. For example, the ability for the system to infer the degree of similarity, and the attribute dimensions of similarity, between a pair of objects or events enables the system to answer questions such as, "How are baseball players similar to tennis players?" to which the system might reply, "They both play sports in which players hit a ball." The ability for the system to categorize objects into taxonomies enables the system to answer questions such as, "What color can balls be?" to which the system might reply, "Balls can at a minimum be white or orange since baseballs can be those colors and a baseball is a type of ball." Such deductions by the system 925 can be accomplished through semantic chaining of generalized semantics chains with other chains.

The system 925 can similarly generalize predicates as well as subjects and objects of predicates. For example, the predicate and its variations, "to fly" has the attributes "to travel" and "in the air," whereby travel is already understood by the system to mean to change spatial positions over time. The system might learn these attributes for flying, at least in part, from baseball videos in which the associated audio contain variations of phrases such as, "the ball flew over the fence," or "the ball flew over the wall," or directly from the pixel patterns in the video itself, and which, in semantic chain form, might be embodied as, "flying-is a type of-travel" and "flying-is a-movement through the air."

Figure 10:
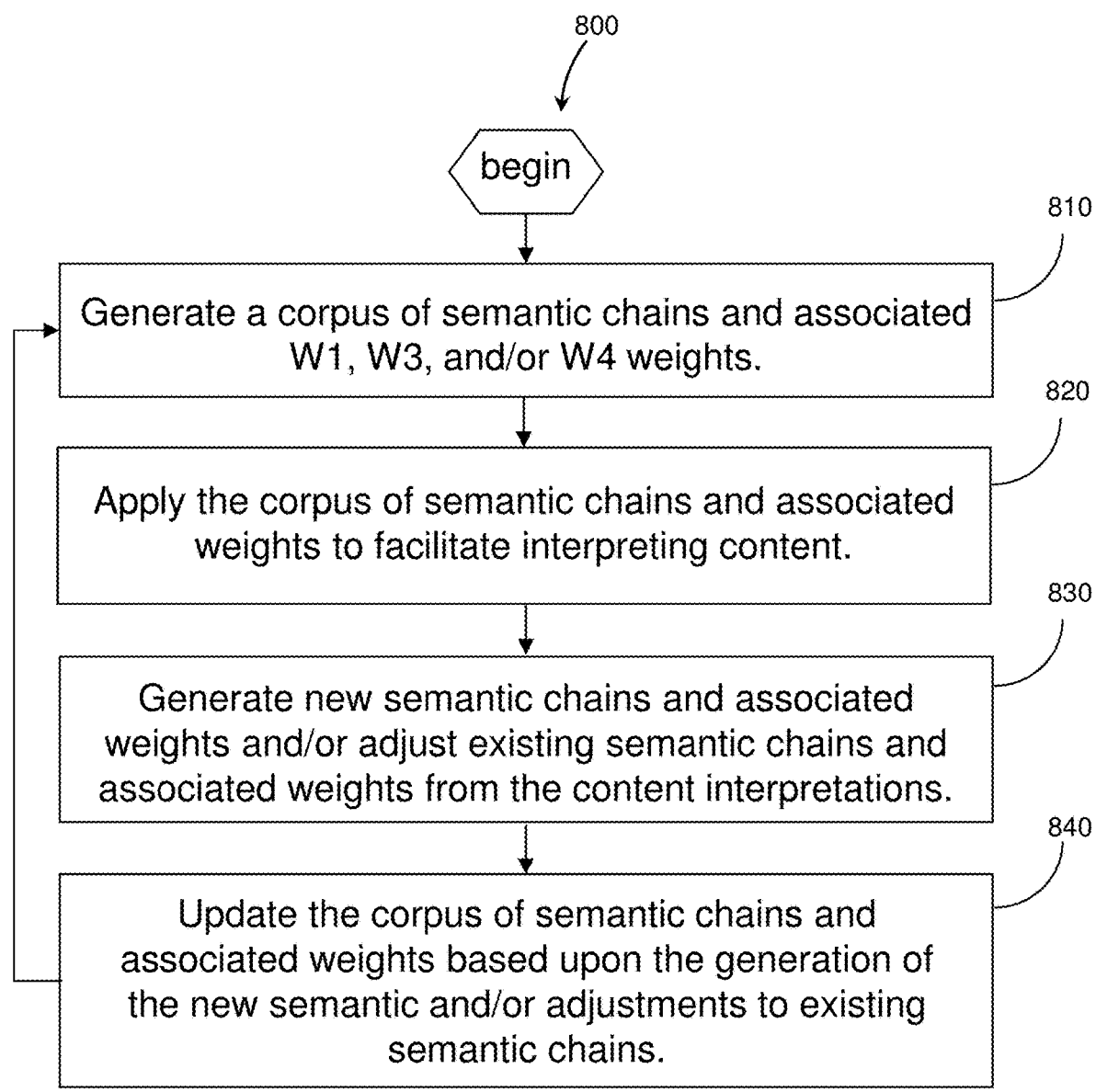
FIG. 10 is a flow diagram of a closed-loop process of applying and updating a corpus of semantic-based chains to facilitate interpreting content, according to some embodiments.

FIG. 10 is a summary flow diagram depicting a recursive or iterative process of applying a corpus of semantic chains (which could comprise behavioral chains) to facilitate the interpretation of content (e.g., text, audio, images, or video). A corpus of semantic chains 810 include associated W1, W3, and W4 weights of the semantic chains. The corpus of semantic chains may be initially generated manually or in an automated manner, or in combination of these two methods.

The corpus of semantic chains is then applied 820 to facilitate interpreting content. In some embodiments one or more of the semantic chains serves as the system's 925 automatic focus of attention as described herein. The system applies the focus of attention to search for subsets of the content that are most relevant to the one or more semantic chains—relevant in the sense of potentially causing a change in a W1, W3, and/or W4 weightings associated with the one or more semantic chains. In some embodiments the focus of attention of the system 925 is performed through application of attention-based deep learning models such as transformers or variations thereof. For example, the system may particularly want to confirm or disconfirm a categorization represented by a semantic chain that comprises a "is a type of" predicate. This may be because the associated W1 or W4 weight is relatively low, which may be indicative that the system has had relatively few attribute examples on which to base the associated weight. And/or because of an importance or value factor, if, for example, a change in the W1 or W4 weight would be determined to cascade though semantic chains and cause other important inferences to change. In any event, the system then searches in the content for attributes of the subject or object of the predicate of the semantic chain with the objective of gaining more information that would serve as a basis for potentially adjusting the associated W1 or W4 weight of the semantic chain. The identification of attributes may be performed via a linguistic-based searching/matching method or may be through application of statistical-based methods such as neural networks, including long short-term memory (LSTM) deep learning neural networks and/or associated variations of LSTM such as Gated Recurrent Units (GRUs), or transformer-based models.

As illustrated by FIG. 10, in some embodiments new semantic chains may be generated or updated 810 by first applying statistical methods such as neural networks, which may include LSTMs and/or GRUs and/or attention-based models such as transformers, to generate candidate semantic chains and a probability that its interpretation of the semantic chain is valid (i.e., a W3-type weight). For neural network-based applications, the probability may be derived, for example, but not limited to, from application of the Softmax function and its output. The system then applies the corpus of semantic chains to facilitate interpretation of additional content 820. This may entail directing its focus of attention on specific semantic chains and to then processing content that is in accordance with this focus of attention; or the additional content may be processed without such a focus of attention constraint.

The system generates candidate semantic chains 830 from the content by means of statistical or neural network-based methods and then evaluates the candidate semantic chains as follows. First, the candidate semantic chains are matched or compared against the existing corpus of semantic chains 810. Where there is a match, the associated W1 or W4 weights of the matched semantic chain in the corpus of semantic chains may be candidates for adjustment, typically an increase, since the neural network is providing further confirmatory information regarding the semantic chain. The W3-type weight/probability will also influence the degree to the W1 or W4 weight is increased. If there is not a match, the new semantic chain may be a candidate for inclusion in the corpus of content, particularly if the associated W3 weight is sufficiently high. The W3 is an interpretive confidence-based weight that informs the level of the initial W1 or W4 weight that the system 925 would apply. The neural network may also generate a disconfirming candidate semantic chain associated with an existing semantic chain. In that case, the disconfirming semantic chain may be added to the corpus of the semantic chain along with an associated W1 and/or W4 weight, and/or the W1 and/or W4 weight of the existing semantic chain is adjusted downward, influenced by the W3 weight/probability of the disconfirming semantic chain.

The system 925 then finalizes the new semantic chains and/or adjustments to existing semantic chains' weights. The corpus of semantic chains is then updated 840 to include the new and adjusted semantic chains, and the enhanced corpus of semantic chains 810 is then ready to be applied to interpret additional content. Hence a closed-loop learning process is enabled that can continue without bound. The advantage of this closed loop learning process can be illustrated by the iterative scenario in which a neural network generates a candidate semantic chain from an item of content. The system adds the semantic chain to the corpus of semantic chains, but with a relatively low associated W1 or W4 weight. In the next iteration of FIG. 10, the semantic chain becomes the focus of attention of the system 925 in interpreting additional content. The W1 or W4 weights are then adjusted based on this specific focus of attention. In this next iteration new semantic chains that can be chained to the first semantic chain may be determined by, for example, application of neural networks. Hence, the semantic chains continue to expand, integrate, extend, and become increasingly accurate, enabling increasingly complex and subtle inferences by the system 925.

Figure 11:
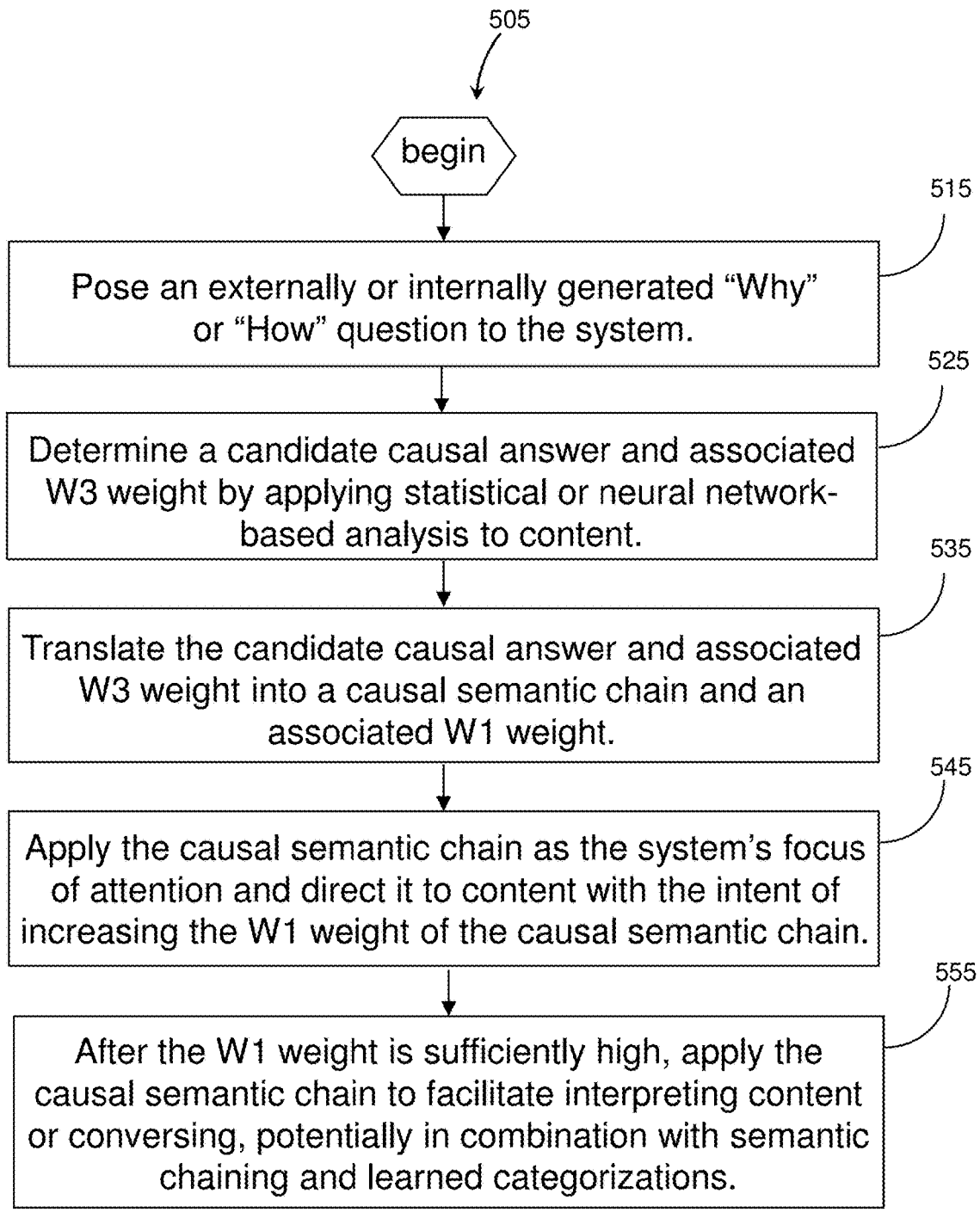
FIG. 11 is a flow diagram of auto-learning semantic-based causal relationships, according to some embodiments.

In addition to automatically learning categorizations, the system 925 can similarly automatically learn causal relationships. In one embodiment, causal relationships are learned by the system 925 as depicted in FIG. 11.

First, questions are provided to the system of a "Why" or "How" form 515, such as "Why did the baseball fly over the outfield fence?" or more generally, "Why do baseballs fly over outfield fences?" Such a question would typically require a causal answer. The questions may be provided externally or internally by the system itself, such as imaginative internally-posed questions, as are described herein. The question may constitute a focus of attention of the system, which then accesses content that is expected to facilitate answering the question. For natural language-based content, neural networks, such as, but not limited to, LSTMs, GRUs, or attention-based models such as transformers, including bi-directional transformers, may be applied. The neural network returns one or more language-based candidate answers to the "Why" question and a probabilistic confidence level that the answer is correct, which may be considered a W3 probability 525.

The system translates the language-based answer to a generalized semantic chain that is defined to have the form, Object A-can cause-Object B (where Object B can constitute an action or a subject/action combination) along with a W1 weighting 535. Semantic chains of this form are contrasted with semantic chains of the form, Object A-correlates with-Object B. In contrast to correlation (i.e., predicting that if A is observed, then B will also be observed), causation implies that if Object A is not observed then Object B will be predicted to not be observed (i.e., a counterfactual prediction).

The W1 weighting is a function of the W3 probability provided by statistical or neural network-based analysis. For neural networks this W3 probability may be derived through application of the Softmax function and its output, for example. If the W1 weighting is sufficiently low, the system may automatically direct its focus of attention to additional content and make additional inferences of answers to the "Why" question 545. This focus of attention may be directed to language-based content or video-based content. For video-based content, while neural networks are generally currently limited to identifying correlations rather than causation, sufficiently high numbers of identified correlations that are consistent with a semantic-based generalized causation hypothesis will tend to increase the probability that the hypothesis is true, which will be embodied by an increase in the W1 weight (since correlation is generally a necessary but not sufficient property for causation).

The results of processing the additional content may be confirming or disconfirming of the original answer, as embodied by W3 weightings associated with the disconfirming or disconfirming answers. The W1 weight of the generalized causal semantic chain, Object A-can cause-Object B is then updated based on these additional W3 weightings. It should be noted that some causations are both necessary and sufficient (either in parallel or in series). But in many other cases, causations are necessary but not sufficient. In those cases, if any one of the multiple causal agents do not exist then the otherwise caused event will not occur. In such cases when a causal question is posed to the computer, the system 925 may choose to respond with just one or a subset of the causal agents for the sake of brevity or naturalness of conversation.

The system may do this by considering which of the causal agents is consistent with a specific environment but that is least probable to exist in any given environment. For example, for the question, "What caused the ball to land on fan's head?" the system is likely to answer that the cause was a baseball player rather than gravity even though both are (or could be) causal contributors. While gravity is ubiquitous in everyday life on Earth, and so will almost always be a causal factor with regard to objects falling, being at a baseball park and a baseball is a specific environment and a specific type of falling object, respectively. So, the least prevalent or probable causal condition or agent across environments that is consistent with being at a baseball park and a falling baseball will generally be a preferable response by the system 925 because it is what the answer poser will likely expect and desire as an explanation. The system may search its corpus of semantic chains to determine what is likely the least prevalent or probable causal condition or agent across a variety of environments but that is consistent with a specific event when formulating it response to a causal question. On the other hand, if the system is asked the more generalized question without being given a further, specific context, "What causes baseballs to fall?" it may well reply, "Gravity," because that is the root causal "agent," that would apply in the greatest number of more specific contexts.

If the W1 weight of the general causal semantic chain becomes sufficiently high, the system can begin applying the semantic chain in facilitating external or internal conversations, as well as improving the system's interpretations of content 555. As a toy example that combines both categorization and causation, the system might include the semantic chains, Player-is a-human (a learned categorization by the system) and Player-swings-Bat. The system also learns that swinging a bat can cause a baseball to fly through the air, as encoded in a toy semantic form as, Swing Bat-can cause-Fly Ball (a learned causation). The system can then answer the question, "Who caused the ball to fly out of the baseball park?" by replying, for example, "A baseball player." The "Who" in the question is taken by the system as a cue that the causal agent in the answer is expected to be human, which causes the system to search for a human causal agent (baseball player) within a causal composite chain rather than a more proximal or direct cause in the chain (swinging bat), and the swinging bat predicate/object combination enables semantic causal chaining that in turn enables the system to answer the question.

In some embodiments causation can additionally or alternatively be embodied as directed acyclic graphs (DAGs). The DAGs can serve to facilitate the system 925 interpreting content and/or conversing about causation and correlation.

Figure 12:
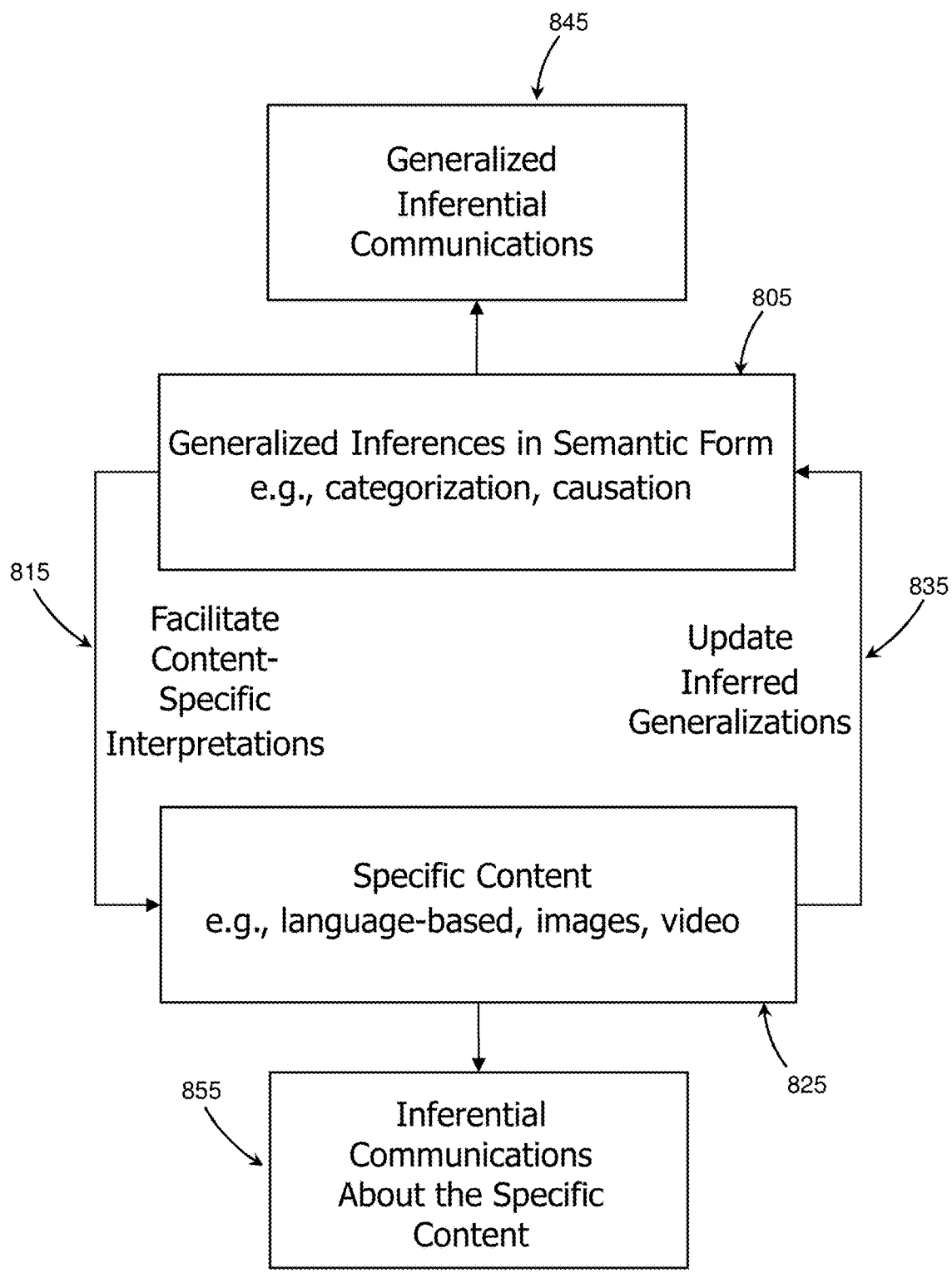
FIG. 12 is a block diagram of a closed-loop process of learning to generalize from the processing of specific content and then applying the generalizations to facilitate interpreting other specific content, according to some embodiments.

FIG. 12 summarizes a closed-loop semantic-based learning process according to some embodiments. A generalized semantic chain is defined herein as a semantic chain with optionally an associated W1 and/or W4 weighting, that describes a general condition of, or perspective on, objective reality, such as categorization and causation. Generalized semantic chains 805, including, but not limited to, generalizations about categories, sets, and subsets, whether comprising fuzzy sets or classical crisp sets, of physical objects and abstractions, as well as generalized causal relationships, are applied 815 to facilitate interpretations of specific content 825. The interpretations of the specific content 825 in turn enable the system 925 to make additional semantic-based generalizations and/or to adjust weightings associated with the system's previous semantic generalizations 805. The previous semantic generalizations are then updated accordingly 835. This self-reinforcing learning process enables the system 925 to continuously build and update its ontological models of the world and thereby to engage in increasingly intelligent and sophisticated external and/or internal communications of both a generalized nature 845, as well as with respect to specific items of content 855.

In some embodiments generative adversarial networks (GANs) are applied by system 925 whereby the generator neural network of the GAN generates natural language-based content that is based upon generalized and/or causal semantic chains and the discriminator neural network of the GAN tries to determine if the content corresponds to objective reality based on its training on language and/or video content that is known to reflect objective reality. The generator updates the generalized semantic chains and/or associated W1 and W4 weights based upon its feedback from the discriminator.

In some embodiments analogical-type reasoning processes may be applied by system 925 to generate and identify analogies such as metaphors. For example, a semantic chain or composite chain may constitute a metaphorical semantic or composite chain, which may also be termed a metaphorical construct herein. Metaphorical semantic chains and/or metaphorical composite chains can be applied to generate communications 250c that are perceived to be particularly creative or humorous, for example, or to perceive or interpret creativity or humor associated with information that is processed by the computer-based system 925.

A metaphor can be considered a semantic relationship that is transferred from one context or subject area to another context or subject area. For example, "strike out" in its original context of baseball is a failure by a batter to put a baseball into play or draw a walk. So, among a number of semantic chains that are valid in this context is the generalized semantic chain, Strike out-is a type of-Failure, or variations thereof. Such a generalized semantic chain may be automatically inferred as described by FIG. 9 and the associated discussion herein, and/or for example, by other forms of statistical analysis directed to a corpus of content, application of a computer-implemented neural network directed to the corpus of content, or may be manually determined; and in any of these cases may have a W1-type weight associated with it. Derivation of this particular semantic chain from a specific domain of application (in this case, baseball) constitutes a process of analogizing through a process of context stripping and transferring—that is, the original context of baseball is "stripped" from the semantic chain, and then transferred to a more generalized semantic relationship as embodied by the resulting semantic chain in this example. This context stripping and transfer process, which may be automated, enables the resulting more generalized semantic chain to then be extended or transferred to other contexts (in this case, outside of the domain of baseball).

For example, if a sales person fails to find a customer, as encoded by the semantic chain, Sales_Person-failed finding-Customer, the semantic chain Strikeout-is a type of-Failure could be substituted to yield the semantic chain, Sales_Person-struck out finding-Customer. In the process of generating communications 250c, the computer-based system 925 starts with Sales_Person-failed finding-Customer chain and then searches for a domain-specific example of the predicate "failing," such as the baseball-based semantic chain Strike out-is a type of-Failure. "Struck out" is then substituted for "failed" in assembling the new chain, yielding the metaphorical construct Sales_Person-struck out finding-Customer.

In interpreting metaphorical expressions, the process is reversed, with the computer-based system 925 starting with a literal or derived Sales_Person-struck out finding-Customer chain and then searching for more generalized meanings of the term "struck out" such as that which is encoded by the example semantic chain, Strike out-is a-type of-Failure. Possibly in conjunction with other contextual clues, the computer-based system 925 then infers the chain Sales_Person-failed finding-Customer, and may generate a W1-type weight associated with the inferred chain.

While metaphorical constructs within communications 250c can enhance the perception by communication recipients 200 of an inherent capacity for creativity of the computer-based system 925, a balance is preferably struck in the generation and communication of metaphorical constructs. For example, if a metaphorical construct is too often generally used it can seem cliched. If the metaphorical construct has never been used, or too many of such very rare or unique metaphorical constructs are communicated within a given time period or volume of communications 250c, the communications 250c may seem too strange for the tastes of many recipients 200. Therefore, in some embodiments the process for generating a metaphorical construct by the computer-based system 925 includes first searching through a corpus of information to determine if a metaphorical construct is sufficiently rare to be considered creative. However, if the metaphorical construct seems to be very rare or even unique based on the search, it might be rejected, or only be selected in accordance with a probabilistic selection process. In some embodiments the probability distribution applied by such a probabilistic selection process is tunable by a user 200 so as to enable the increase or decrease of the level of metaphorical-based creativity embodied by communications 250c, and constitutes a tunable aspect of the overall personality of the computer-based system 925.

Figure 14B:
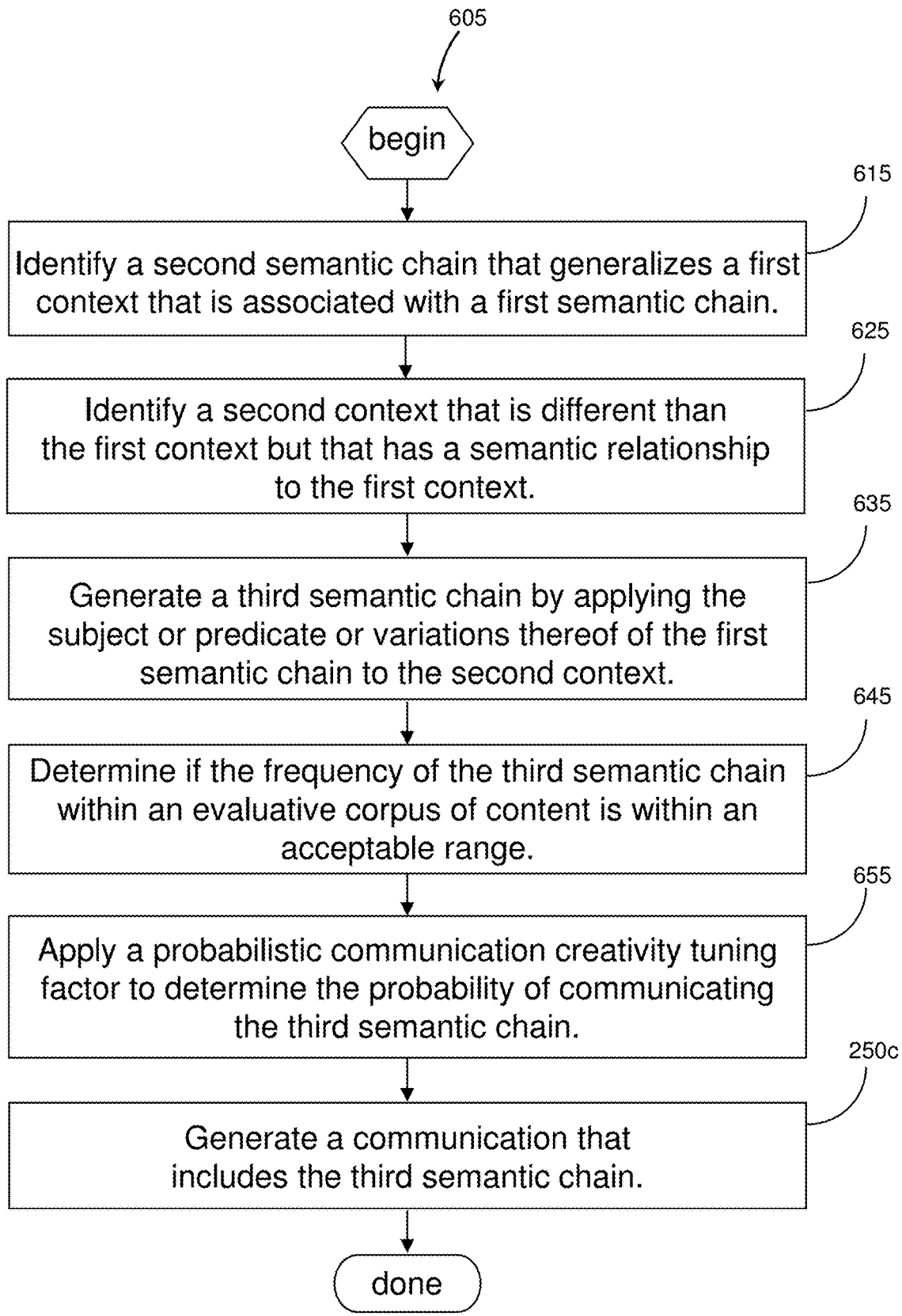
FIG. 14B is a flow diagram of a process of applying semantic context transfer to generate communications that embody a degree of creativity, according to some embodiments.

FIG. 14B summarizes the process flow for generating creative communications 250c (and that may further be self-referential) in accordance with some embodiments. The first step 615 is, given a first semantic chain, to identify a second semantic chain that generalizes the context of the first semantic chain. The second step 625 is to identify a second context that is different that is different than the context of the first semantic chain, but that has a semantic relationship to the context of the first semantic chain. The third step 635 is to generate a third semantic chain by applying the subject or predicate or a variation thereof of the first semantic chain to the second context. The fourth step 645 is to determine if the frequency of occurrence of the third semantic chain within an evaluative corpus of content is within an acceptable range. If the frequency of occurrence of the third semantic chain is within the acceptable range, then the fifth step 655 is to apply a probabilistic communication creativity tuning factor or distribution to determine the probability of embodying the third semantic chain within a communication 250c.

Recommendation Explanation Generation

In addition to delivering a recommendation 250 of an object 212, the computer-based application 925 may deliver a corresponding explanation 250c of why the object was recommended. This can be very valuable to the recommendation recipient 200 because it may give the recipient a better sense of whether to commit to reading or listening to the recommended content (or in the case of a recommendation of another user 200 whether to, for example, contact them or express an interest in connecting with them), prior to committing significant amount of time. For recommendations 250 that comprise advertising content, the explanation may serve to enhance the persuasiveness of the ad.

The explanations 250c may be delivered through any appropriate computer-implemented means, including, but not limited to delivery modes in which the recommendation recipient can read and/or listen to the recommendation. The general capability for delivering explanatory information 250c can be termed the "explanation engine" of the computer-based system 925.

In some embodiments, variations of the ranking factors previously described may be applied in triggering explanatory phrases. For example, the following table illustrates non-limiting examples of how the ranking information can be applied to determine both positive and negative factors that can be incorporated within the recommendation explanations. Note that the Ranking Value Range is the indexed attribute values before multiplying by special scaling factors, Ranking Category Weighting Factors, such as the "What's Hot" factor, etc.

TABLE 2E

| 1<br>Ranking<br>Category | 2<br>Ranking<br>Value Range<br>(RVR) | 3<br>Transformed<br>Range | 4<br>$1^{st}$<br>Positive<br>Threshold | 5<br>$2^{nd}$<br>Positive<br>Threshold | 6<br>Negative<br>Threshold |
|---|---|---|---|---|---|
| Editor Rating | 0-100 | RVR | 60 | 80 | 20 |
| Community Rating* | 0-100 | RVR | 70 | 80 | 20 |
| Popularity | 0-100 | RVR | 70 | 80 | 10 |
| Change in Popularity | −100-100 | RVR | 30 | 50 | −30 |
| Object Influence | 0-100 | RVR | 50 | 70 | 5 |
| Author's Influence | 0-100 | RVR | 70 | 80 | .01 |
| Publish Date | −Infinity-0 | 100-RVR | 80 | 90 | 35 |
| Object Affinity to MTAV | 0-100 | RVR | 50 | 70 | 20 |

An exemplary process that can be applied to generate explanations based on positive and negative thresholds listed in 2E is as follows:

Step 1: First Positive Ranking Category—subtract the $1^{st}$ Positive Threshold column from the Transformed Range column and find the maximum number of the resulting vector (may be negative). The associated Ranking Category will be highlighted in the recommendation explanation.

Step 2: Second Positive Ranking Category—subtract the $2^{nd}$ Positive Threshold column from the Transformed Range column and find the maximum number of the resulting vector. If the maximum number is non-negative, and it is not the ranking category already selected, then include this second ranking category in the recommendation explanation.

Step 3: First Negative Ranking Category—subtract the Negative Threshold column from the Transformed Range column and find the minimum number of the resulting vector. If the minimum number is non-positive this ranking category will be included in the recommendation explanation as a caveat, otherwise there will be no caveats.

Although two positive and one negative thresholds are illustrated in this example, an unlimited number of positive and negative thresholds may be applied as required for best results.

In some embodiments explanations 250c are assembled from component words or phrases and delivered based on a syntax template or syntax-generation function. Following is a non-limiting example syntax that guides the assembly of an in-context recommendation explanation. In the syntactical structure below syntactical elements within { } are optional depending on the associated logic and calculations, and "+" means concatenating the text strings. (The term "syntactical element" as used herein means a word, a phrase, a sentence, a punctuation symbol, a semantic chain, a behavioral chain, or composite chain. The term "phrase" as used herein means one or more words.). Other detailed syntactical logic such as handling capitalization is not shown in this simple illustrative example.

{[Awareness Phrase (if any)]}+

{[Sequence Number Phrase (if any)]+[Positive Conjunction]}+

[$1^{st}$ Positive Ranking Category Phrase]+

{[Positive Conjunction]+[$2^{nd}$ Positive Ranking Category Phrase (if any)]}

+

{[Negative Conjunction]+[Negative Ranking Category Phrase (if any)]}

+

{[Suggestion Phrase (if any)]}

The following section provides some examples of phrase tables or arrays that may be used as a basis for selecting appropriate syntactical elements for a recommendation explanation syntax. Note that in the following tables, when there are multiple phrase choices, they are selected probabilistically. "NULL" means that a blank phrase will be applied. [ ] indicates that this text string is a variable that can take different values.

System Awareness Phrases

| Trigger Condition | Phrase |
| --- | --- |
| Apply these phrase alternatives if any of the 4 Sequence Numbers was triggered | 1) I noticed that<br>2) I am aware that<br>3) I realized that<br>4) NULL |

Out-of-Context Sequence Number Phrases

| Trigger Condition | Phrase |
| --- | --- |
| Sequence 1 | 1) other members have related [this object] to [saved object name], which you have saved, |
| Sequence 2 | 1) members with similar interests to you have saved [this object] |
| Sequence 3 | 1) members with similar interests as you have rated [this object] highly<br>2) Members that have similarities with you have found [this object] very useful |
| Sequence 4 | 1) [this object] is popular with members that have similar interests to yours<br>2) Members that are similar to you have often accessed [this object] |

Note:
[this object] = "this 'content-type'" (e.g., "this book") or "it" depending on if the phrase "this 'content-type'" has already been used once in the explanation.

Positive Ranking Category Phrases

| Trigger Category | Phrase |
| --- | --- |
| Editor Rating | 1) [it] is rated highly by the editor |
| Community Rating* | 1) [it] is rated highly by other members |
| Popularity** | 1) [it] is very popular |
| Change in Popularity | 1) [it] has been rapidly increasing in popularity |
| Object Influence | 1) [it] is [quite] influential |
| Author's Influence | 1) the author is [quite] influential<br>2) [author name] is a very influential author |
| Publish Date | 1) it is recently published |
| Object Affinity to MTAV (1) | 1) [it] is strongly aligned with your interests<br>2) [it] is related to topics such as [topic name] that you find interesting<br>3) [it] is related to topics in which you have an interest |
| Object Affinity to MTAV (2) | 4) I know you have an interest in [topic name]<br>5) I am aware you have an interest in [topic name]<br>6) I have seen that you are interested in [topic name] |

Positive Conjunctions

| Phrase |
| --- |
| 1) and |

Negative Ranking Category Phrases

| Trigger Category | Phrase |
| --- | --- |
| Editor Rating | 1) it is not highly rated by the editor |
| Community Rating | 1) it is not highly rated by other members |
| Popularity | 1) it is not highly popular |
| Change in Popularity | 1) it has been recently decreasing in popularity |
| Object Influence | 1) it is not very influential |
| Author's Influence | 1) the author is not very influential<br>2) [author name] is not a very influential author |

-continued

| Trigger Category | Phrase |
| --- | --- |
| Publish Date | 1) it was published some time ago<br>2) it was published in [Publish Year] |
| Object Affinity to MTAV | 1) it may be outside your normal area of interest<br>2) I'm not sure it is aligned with your usual interest areas |

Negative Conjunctions

| Phrase |
| --- |
| 1) , although<br>2) , however<br>3) , but |

Suggestion Phrases (use only if no caveats in explanation)

| Phrase |
| --- |
| 1) , so I think you will find it relevant<br>2) , so I think you might find it interesting<br>3) , so you might want to take a look at it<br>4) NULL |

The above phrase array examples are simplified examples to illustrate the approach. In practice, multiple syntax templates, accessing different phrase arrays, with each phrase array comprising many different phrases and phrase variations are required to give the feel of human-like explanations. These example phrase arrays above are oriented toward recommendations based on recommendation recipient interests as encoded in MTAVs; for recommendations related to the expertise of other users as encoded, for example, in MTEVs, explanation syntactical rules and phrase arrays tailored for that type of recommendation are applied. In some embodiments, explanatory syntactical rules and phrases are applied that are consistent with explanations of recommendations that are generated in accordance with both an MTAV and MTEV. For example, the resulting explanation 250c may indicate to the recommendation recipient why it is expected that a recommended item of content is expected to be relevant to them as well as being appropriate given their inferred level of expertise.

In some embodiments, phrases for inclusion in phrase arrays are generated from semantic chains that are derived by means of an automated analysis of content as described previously herein, whereby the automated analysis is directed to a starting set of one or more selected phrases. The derived phrases may be identified as a result of a process of performing multiple linkages of semantic chains. These semantically-derived phrases may further have W1 and/or W2-type probabilities associated with them. These probabilities may be applied so as to influence the frequency that a specific phrase will be selected for inclusion in a communication 250c.

As described above, a sense of confidence of the recommendation to the recommendation recipient can also be communicated within the recommendation explanation. The score level of the recommendation may contribute to the confidence level, but some other general factors may be applied, including the amount of usage history available for the recommendation recipient on which to base preference inferences and/or the inferred similarity of the user with one or more other users for which there is a basis for more confident inferences of interests or preferences. The communication of a sense of confidence in the recommendation can be applied to recommendations with regard to expertise, as well as interest-based recommendations. The degree of serendipity incorporated by the serendipity function may be communicated 250c to the user, and may influence the communication and related syntax and syntactical elements applied in the communication 250c, as well as affect the communication of the degree of confidence in a recommendation. The communication of a sense of confidence in a communication 250c in some embodiments may further, or alternatively, be influenced by weightings of W1 and/or W2 types described herein that are associated with a semantic chain or composite chains that comprise multiple semantic and/or behavioral chains, and that are used by the computer-implemented system 925 as a basis for making an inference.

In some embodiments, a recommendation explanation may reference a tuning factor and its setting. For example, if a user has set a recency tuning factor so as to slant the recommendations 255 toward recommending objects 212 that have been recently published, the explanation may contain words or phrases to the effect that acknowledge that a recommended object is in accordance with that setting.

Recommendation explanations are one type of behavioral-based communications 250c that the one or more computer-based applications 925 may deliver to users 200. Other types of adaptive communications 250c may be delivered to a user 200 without necessarily being in conjunction with the recommendation of an object or item of content. For example, a general update of the activities of other users 200 and/or other trends or activities related to people or content may be communicated.

Adaptive communications 250c may also include contextual information in accordance with some embodiments. For example, contextual information may be provided to assist a user 200 in navigating the structural aspect 210,210D of an adaptive system 100,100D.

The adaptive communications 250c may include references to hierarchical structures—for example, it may be communicated to the user 200 that a topic is the parent of, or sibling to, another topic. Or for a fuzzy network-based structure, the strength of the relationships among topics and content may be communicated.

In some embodiments, adaptive communications 250c may include explanations of recommended objects 212 in which the explanations include references to words, phrases, concepts, and/or themes that are included within, or derived from, the contents of OCVs that are associated with the objects 212. For example, the explanation may indicate to the recommendation recipient that a recommended object 212 is inferred to emphasize themes that are aligned with topics that are inferred to be of high interest to the recommendation recipient or which are appropriate for the recommendation recipient's inferred level of expertise on one or more topics.

In some embodiments, adaptive communications 250c comprise explanations of recommended objects 212 in which the explanations include references to words, phrases, concepts, and/or themes associated with semantic chains (which may be elements of composite semantic chains or composite behavioral-based and semantic chains) that are associated with, or reference, or form the basis for an inference with respect to, the recommended objects 212. The explanations may include one or more subjects, predicates, and/or the objects of the predicates associated with one or more semantic chains. The information associated with a semantic chain that is included in such an explanation 250c may be derived from one or more linked behavioral-based and semantic-based chains. The explanation may include elements of both a behavioral-based chain and a semantic chain that are linked and that form a basis for the associated adaptive communication 250c. The explanation may include a reference to an inference that is made based on a linked behavioral-based and semantic chain. For example, given the example composite chain described previously herein, User(1)-viewed-Object(1)-is about-Red Sox-is located-Boston, for which the computer-implemented system 925 might infer that User(1) has an interest in Boston or things related to Boston in general, the explanation 250c for a recommendation comprising one or more objects 212 related to or referencing the city of Boston, might be, for example, of the syntactical form, "Since you have an interest in the Red Sox, I thought you might also be interested in this other aspect of Boston." A sense of confidence may be conveyed in the explanation that may be, for example, a function of the length of a linked behavioral-based and semantic chain on which an inference is based, and/or in accordance with weightings that are associated with one or more of the constituent behavioral-based and semantic chains of the composite chain. For example, the longer the chain, everything else being equal, the lower may be the level confidence in an inference. Both one or more W1-type and one or more W2-type weightings associated with semantic chains or composite behavioral-based and semantic chains may be applied in determining a recommendation confidence level that informs the phrases that are used to signal the degree of confidence within a communication 250c. Continuing the example above, if the composite probability of the composite chain, User(1)-viewed-Object(1)-is about-Red Sox-is located-Boston, is low, the explanation 250c for a recommendation comprising one or more objects 212 related to or referencing the city of Boston, might include syntactical elements that convey a lower sense of confidence, for example: "Since you have an interest in the Red Sox, I thought you might be interested in this other aspect of Boston, but I'm not very sure about that."

In general, the adaptive communications generating function of the computer-implemented system 925 may apply a syntactical structure and associated probabilistic phrase arrays to generate the adaptive communications in a manner similar to the approach described above to generate explanations for recommendations. The phrase tendencies of the adaptive communications 250c over a number of generated communications can be said to constitute an aspect of the personality associated with the one or more computer-based applications 925.

Self-Referential, Self-Aware, and Self-Directed Communications

The process of generating and saving imaginative communications 250c or imaginative images that are not necessarily communicated externally to a user 200 of the computer-based system 925 is extended more generally to other types of communications 250c or images according to some embodiments, the result of which can be considered constituting a "stream of consciousness" of the computer-based system 925. Such communications 250c may be internally initiated or prompted rather than necessarily being directly responsive to current interactions with a user 200. Such externally or internally-derived prompts may be attributable to a "focus of attention" of the computer-based system 925. Such focuses of attention may be provided by, but not limited to, one or more of the following means:

1. Based on processing input from a sensor
2. Based on processing input from externally or internally sourced content
3. Based on a value of information and/or probabilistic selection process The first of these means is whereby the focus of attention that serves as a basis for communications 250c is prompted by input from a sensor. As a non-limiting example, the computer-based system 925 can, by receiving input from a camera, automatically sense and therefore become aware of a physical object, say, a tree, that then constitutes the focus of attention on which one or more communications 250c can be based. The identification of a physical object from the camera input, in this example case a tree, may be performed, for example, through the application of a neural network such as a convolutional neural network that is trained to identify such physical objects from image pixel patterns and to associate the identified object with one or more syntactical elements, as is described further herein, or additionally or alternatively through the application of a Bayesian program learning-based process. Next, for example, based upon the syntactical elements such as words, phrases, or semantic chains that are associated with the image of the tree, the computer-based system 925 could generate the behavioral-based chain, "I-See-A Tree," by combining a self-reference pronoun ("I") with a colloquial term for processing visual inputs ("See") and the object identified from the image inputs ("A Tree"). Other information could optionally be associated with the behavioral-based chain such as a W1-type weight and a time-stamp.

Then, for example, given the focus of attention on the tree and the conversion of this attention to an associated behavioral-based chain, having recently generated communications related to the domain of baseball, and having saved communications 250c related to the domain of baseball, the system 925, by, for example, applying an algorithm that weights recency of events and uncertainty relatively highly in determining a focus of attention, could automatically generate an internally-posed (i.e., self-directed) interrogative 250c that embodies wondering how trees and baseball might be related. (A grammatical transformation process may be applied by the computer-based system to create interrogative communications 250c from chains or elements thereof. As a non-limiting example, the grammatical transformation can comprise appending the syntactical elements "How are" and "related?" to the chains or their elements.) The system then initiates a search of semantic chains and/or composite chains in order to identify connections between the subjects of trees and baseball and, for example, identifies the semantic chains, Trees-Are Composed Of-Wood and Baseball Bats-Are Composed Of-Wood, as a connection between trees and the game of baseball. Continuing the example, the computer-based system, again applying an algorithm that weights recency of events and uncertainty relatively highly in automatically determining a focus of attention, could then further pose the internally communicated interrogative of wondering what kind of wood baseball bats are made out of and whether it is the type of wood that is from the type of tree that is being considered. This interrogative could be posed for internal delivery and consideration, triggering a search performed by the computer-based system 925 through content or semantic chains derived thereof, for an answer to the interrogative. If, for example, an answer cannot be found by this means, the computer-based system 925 might pose the interrogative 250c to a user 200 to ascertain whether the user 200 can provide the answer.

Similarly, the focus of attention in the above example could have alternatively been a result of the processing of audio, textual or image-based content that includes a reference to, or image of, a tree, and the same example flow as described in which the focus of attention derived from a sensor above could apply. This focus of attention capability can be thought of as an extension of the more narrowly defined attention mechanisms in current transformer-based deep learning models.

The awareness of objects that can potentially become a focus of attention through the processing of sensor inputs or externally or internally-sourced content (such as, for example, the representation of the tree that is contained in a content-based image or via camera input as described in the examples above, or in the form of words or phrases that are embodied in written or audio formats) may be through the application of neural network-based systems (such as, but not limited to, convolutional and recurrent neural networks) or algorithmic-based statistical pattern detection and/or matching processes according to some embodiments. For example, neural network-based systems may be trained on training sets comprising images and associated syntactical elements to enable the identification of syntactical elements (which may comprise semantic chains or syntactical elements from which semantic chains can be derived or inferred) from which communications 250c can be based as the computer-based system 925 becomes aware of new images for which the training set is relevant. Additionally, or alternatively, Bayesian program learning-based process may be applied to generate the awareness of objects that can potentially become a focus of attention.

The focus of attention that is derived from the awareness that is enabled by sensors or the processing of content is based on a prioritization process in accordance with some embodiments. For example, what is currently being sensed or processed and/or what has recently been communicated 250c either internally or externally may take default precedence. And a rule that prioritizes required responses may be applied, such as a rule that a current interaction with a user 200 takes precedence over purely internally delivered and saved communications 250c, for example.

The focus of attention may also be determined, and prioritized, based, at least in part, on a value of information and/or probabilistic-based process. This can be particularly useful when the computer-based system 925 has resources that are not otherwise fully engaged in a high priority focus of its attention. In such cases the system may automatically select stored chains or communications 250c to serve as a focus of attention from which to pose internally-directed interrogatives or what-ifs (i.e., imaginative scenarios embodied as syntactical elements and/or images) for consideration, and then save the resulting communications 250c that are generated in response to the interrogatives or what-ifs.

For focuses of attention that are derived from a value of information-based process, in some embodiments the computer-based system 925 uses uncertainties that are derived from W1, W2, W3, or W4-type weightings associated with composite chains in determining a focus of attention. Value of information, which is a term of art in the field of decision analysis and is understood as such by one of ordinary skill in the art of that field, relates to the expected value of decreasing an uncertainty. Decreasing an uncertainty can be expected to have a positive value only if it has a potential to affect a decision. In some embodiments the decision that might be affected relates to choices in the generation of communications 250c. So, as a simple, non-limiting example, the computer-based system 925 might search for relatively low W1, W2 or W4-type weightings that are associated with chains that have been recently applied in generating communications 250c, since it would be valuable to increase such W1, W2 or W4-type weightings (i.e. reduce the uncertainty) to increase the probability of accurate communications 250c, particularly those that are inferred by the computer-based system 925 to have a relatively high probability of being relevant in the future, particularly the near future. In addition to the W1, W2 or W4-type weightings, a utility function may also be considered by the computer-based system 925 in calculating a value of information, and this utility function may include factors such as the recency and/or the frequency of communications 250c that are based on specific chains, and whereby these chains have uncertainties embodied by the corresponding W1, W2 or W4-type weightings.

In some embodiments reinforcement learning, which may be executed in association with a neural network, is applied to direct the focus of attention of the system 925. The "reward" for each iteration of the reinforcement model may be a change in W1 or W4-type weightings associated with semantic chains, and with a value model that is aligned with maximizing the net value of increasing the W1 or W4 weightings, which is equivalent to maximizing the value of information. Such a reinforcement learning-based process may apply techniques associated with optimizing the exploitation/exploration tradeoff, as would be understood by one skilled in the art. These techniques may serve to approximate a full value of information calculation, while being computationally less intensive.

Other probabilistic-related processes for the selection of focuses of attention are applied in accordance with some embodiments. For example, a probability function is applied to saved communications 250c or other syntactical elements such as semantic or composite chains accessible by the computer-based system 925, so as to select the saved communications 250c or other accessible syntactical elements to chains to serve as a focus of attention. The probability function may be derived from, or applied in conjunction with, W1 and/or W2-type weightings that are associated with the saved communications 250c or other accessible semantic or composite chains. As a non-limiting example, the selection could be based on applying a uniform probability distribution to a selected subset of semantic or composite chains that have W1-type weights between 0.4 and 0.6. Such probabilistic approaches to the selection of a focus of attention can introduce a degree of randomization to the selection process, which can produce a beneficial degree of serendipity to the streams of consciousness of the computer-based system 925, increasing the likelihood that focuses of attention and the resulting streams of consciousness that might not otherwise occur are explored by the computer-based system 925. Such probabilistic approaches can be considered "dreaming" or "daydreaming" processes of the computer-based system 925 since they have analogies to the way the human mind can dream or wonder.

A focus of attention can lead to overtly physical actions in some embodiments. As an example, for the example above in which focuses of attention are derived from a value of information-based process whereby it is determined that it would be valuable to increase identified W1 or W2-type weightings (i.e. reduce the uncertainty that is associated with the corresponding chains), actions such as invoking a sensor or engaging in movements may be undertaken by the computer-based system 925 that are expected to have the potential to result in new information that will enable a reduction in uncertainty with respect to the corresponding chains. As inputs from sensors are processed after such actions are undertaken, probabilities may be updated, new awarenesses and focuses of attention of the computer-based system 925 are identified, and subsequent actions based on these new focuses of attention may be undertaken. Such recursive processes enable intelligently autonomous behaviors of the computer-based system 925.

A focus of attention can lead to the generation of an imaginative scenario in some embodiments. For example, the computer-based system 925 can apply a W1-type probability adjustment and/or context shifting process, as described previously herein, to the focus of attention so as to generate a syntactical or image-based imaginative scenario such as a counterfactual, and the imaginative scenario may be self-referential and/or self-directed.

Figure 14C:
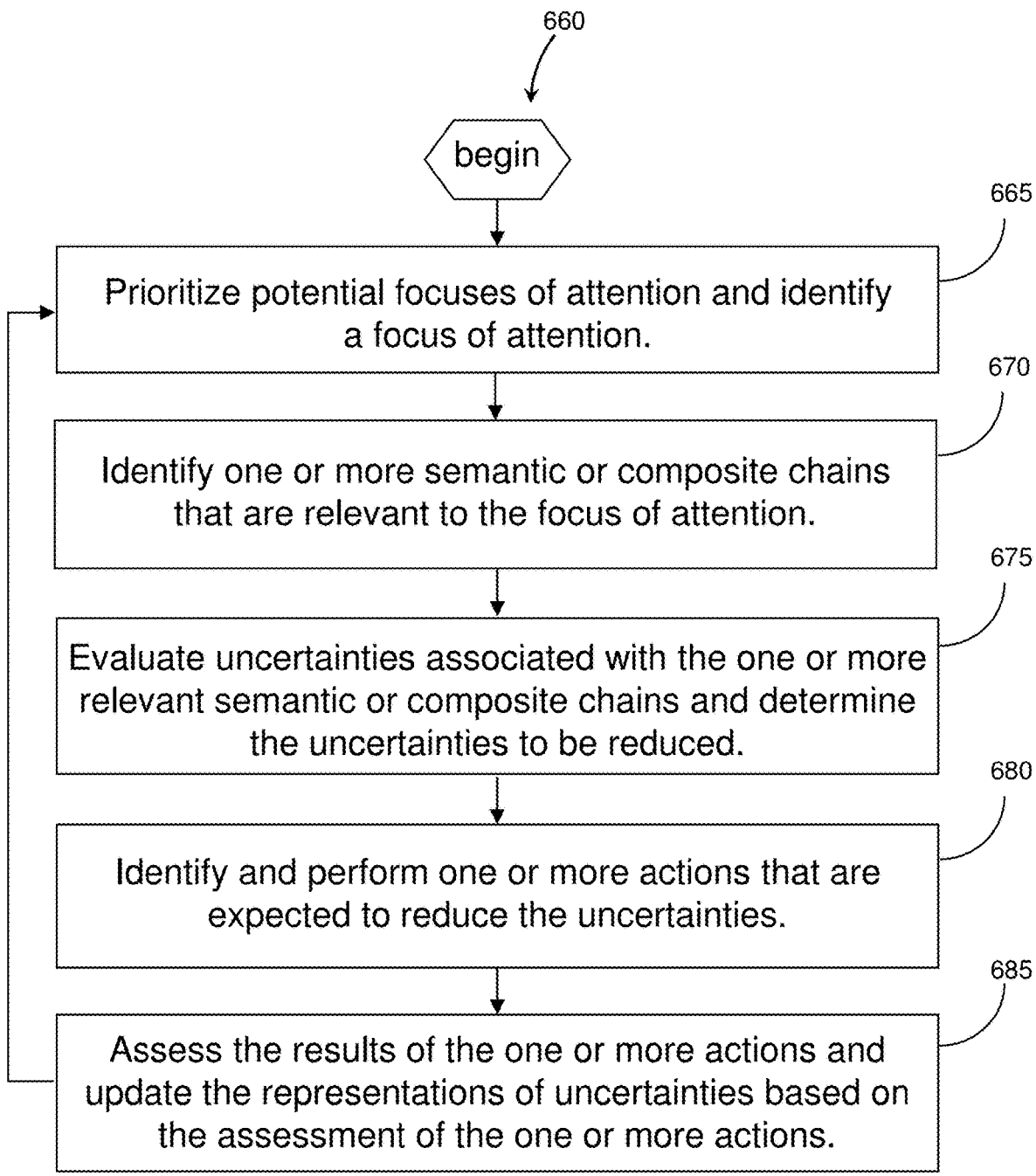
FIG. 14C is a flow diagram of a closed-loop process of applying semantic-based chains and associated uncertainties to inform automatic actions that are in accordance with a focus of attention, according to some embodiments.

FIG. 14C summarizes the process flow of recursive streams of attention (or "consciousness") and/or autonomous behaviors of computer-based system 925 in accordance with some embodiments. The first step 665 comprises automatically prioritizing potential focuses of attention and selecting a focus of attention based on the prioritization. The potential focuses of attention can be derived from external sources via, for example, information attained via sensors, from accessible content, or from internally stored information such as saved communications 250c, chains, or images. The focus of attention can be with respect to specific natural language elements during an automatic scan of the elements as can be performed by transformer-type deep learning models. Prioritization of the potential focuses of attention may be through application of precedence rules or scoring algorithms, such as, but not limited to, and everything else being equal, assigning a higher priority for attending to user 200 requests or requirements, assigning a higher priority based on recency considerations, and/or assigning a higher priority based on probabilistic evaluations and/or value of information considerations. Language-based sources of potential focuses of attention (such as processing speech from a user 200 or processing digitized content) can be directly converted to one or more syntactical elements such as behavioral chains, semantic chains, or composite chains as described herein. In the case of non-language-based sources of information such as images, an associated language-based description comprising syntactical elements is first determined for each image (such as, but not limited to, by means of the application of a trained neural network to the images, for example), and then this language-based description can be converted to derivative syntactical elements such as behavioral chains, semantic chains, or composite chains. A particular focus of attention as represented by one or more behavioral chains, semantic chains, or composite chains is then automatically identified based on the application of the prioritization rules or algorithms, including but not limited to considerations such as recency, uncertainty, value of information, and prioritization of required response, to the derived behavioral chains, semantic chains, or composite chains and associated uncertainties associated with each of the potential focuses of attention.

The second step 670 comprises identifying one or more chains that are relevant to the identified focus of attention. This step entails searching for other chains with the same or similar subjects, predicates, or objects as those of the focus of attention chain(s). It may also may entail linking chains that result from the search into composite chains, including linking chains that result from the search with chains that represent the focus of attention.

The third step 675 comprises evaluating uncertainties, as represented by corresponding W1 and/or W2-type and/or W3-type weights and/or W4-type weights, of the relevant chains determined by the previous step 670 and determining which uncertainties should be potentially targeted for reduction. This determination may be made in accordance with a value of information process as described previously herein.

The fourth step 680 comprises identifying and performing one or more actions that are expected to reduce the potentially targeted uncertainties. The identification may comprise a net value of imperfect information process that includes the expected "cost" (which may be an evaluative metric such as a financial cost and/or an evaluative utility metric that takes into account timing and risks) associated with the one or more candidate actions, and also takes into account the degree to which the one or more candidate actions can be expected to reduce the uncertainty (unless an action is expected to reduce the uncertainty to a negligible amount, the value of imperfect information rather than value of perfect information should preferably be calculated and applied). Prioritization of the candidate one or more actions by a net value of perfect or imperfect information method is then performed, with highest priority candidate action(s) selected to be performed. The selected action(s) is then automatically performed by the computer-based system 925. Candidate actions may include generating interrogative communications 250c directed to external agents such as users 200 or directed internally to (i.e., self-directed) the computer-based system 925 (in either case, with an expectation that an answer to the interrogative will reduce targeted uncertainties). Interrogative communications 250c are formed in some embodiments by transforming the chain(s) that is associated with the uncertainty that is targeted for reduction into an appropriate question. For example, if the W1-type weight associated with the semantic chain, Fenway Park-Is A-Baseball Park, is not at a maximum level (i.e., there is at least some degree of uncertainty with regard to the objective reality of the semantic chain), then an interrogative communication 250c could be generated by a grammatical transformation process of appending syntactical elements "Is" and a "?" (or, for example, via intonation rather than appending "?" if the communication 250c is delivered through auditory means) to the semantic chain to yield, "Is Fenway Park a baseball park?" Similarly, interrogative communications 250c can be generated from composite chains for which uncertainties are targeted for reduction by applying an appropriate grammatical transformation process. Interrogative communications 250c can also be formed by applying a grammatical transformation process that yields a question of how chains or elements thereof are related, as is described in a previous example herein. In addition to interrogative communications 250c, candidate actions may also include, but are not limited to, the computer-based system 925 accessing external content, introspecting, generating an imaginative scenario embodied as syntactical elements and/or an image, invoking a sensor, or engaging in movements.

The fifth step 680 of FIG. 14C comprises assessing the results of the one or more candidate actions that are actually performed and updating the representations of the uncertainties (i.e., W1 and/or W2 and/or W3-type and/or W4-type weightings or probabilities) according to the assessment of the results of the actions. The results of actions may or may not actually lead to a reduction of uncertainty. For example, for interrogative communications 250C, answers may be confirming, disconfirming, or neither. If user 200 answers "Yes" to the question, "Is Fenway Park a baseball park?"

then everything being equal, the W1 weight would presumably be set to close to certainty (possibly depending on an assessment of the user's reliability in such areas, etc.). If user 200 answers "I'm not sure," then the W1 weight might remain at the same level as before the question was posed. For internally-directed interrogatives, a search engine or similar function is invoked to provide an answer, possibly in conjunction with a process of the linking of chains to make appropriate deductions. For example, in response to the introspective self-directed interrogative, "Have I been to a baseball park?" the computer-based system 925 could search for stored chains that indicate the computer-based system 925 or elements thereof were at a baseball park. Additionally, or alternatively, the term "baseball park" could be evaluated for matches with the results of a neural network-based or Bayesian program learning-based processing of stored historical images or video of physical locations and associated syntactical elements whereby the computer-based system 925 or elements thereof were proximal to a particular baseball park.

After probabilities that embody uncertainties are updated based on the result of performed actions (or not updated, if the performed action does not provide information that enables the relevant probabilities to be increased), the first step of the process 665 is again invoked. This closed loop process enables continuous, autonomous learning by computer-based system 925.

The autonomous learning process of FIG. 14C can further enable the computer-based system 925 to answer interrogatives of why it took the actions it did by relating relevant elements of the process in appropriately syntactically structured explanations. So, for example, if asked by the user 200, "Why did you ask me about Fenway Park?" the computer-based system 925 might respond, "I thought it probably was a baseball park, but I wasn't totally sure," reflecting a less than certain but greater than zero level of the associated W1-type weight prior to asking the user 200 the question.

Processing Temporally Sequenced Media

The following section describes embodiments that include those associated with DCO.AI's Tagstream™ system, which is designed to resolve the problem of the opaqueness and inefficient user navigation of temporally sequenced media such as video and podcasts.

Figure 15:
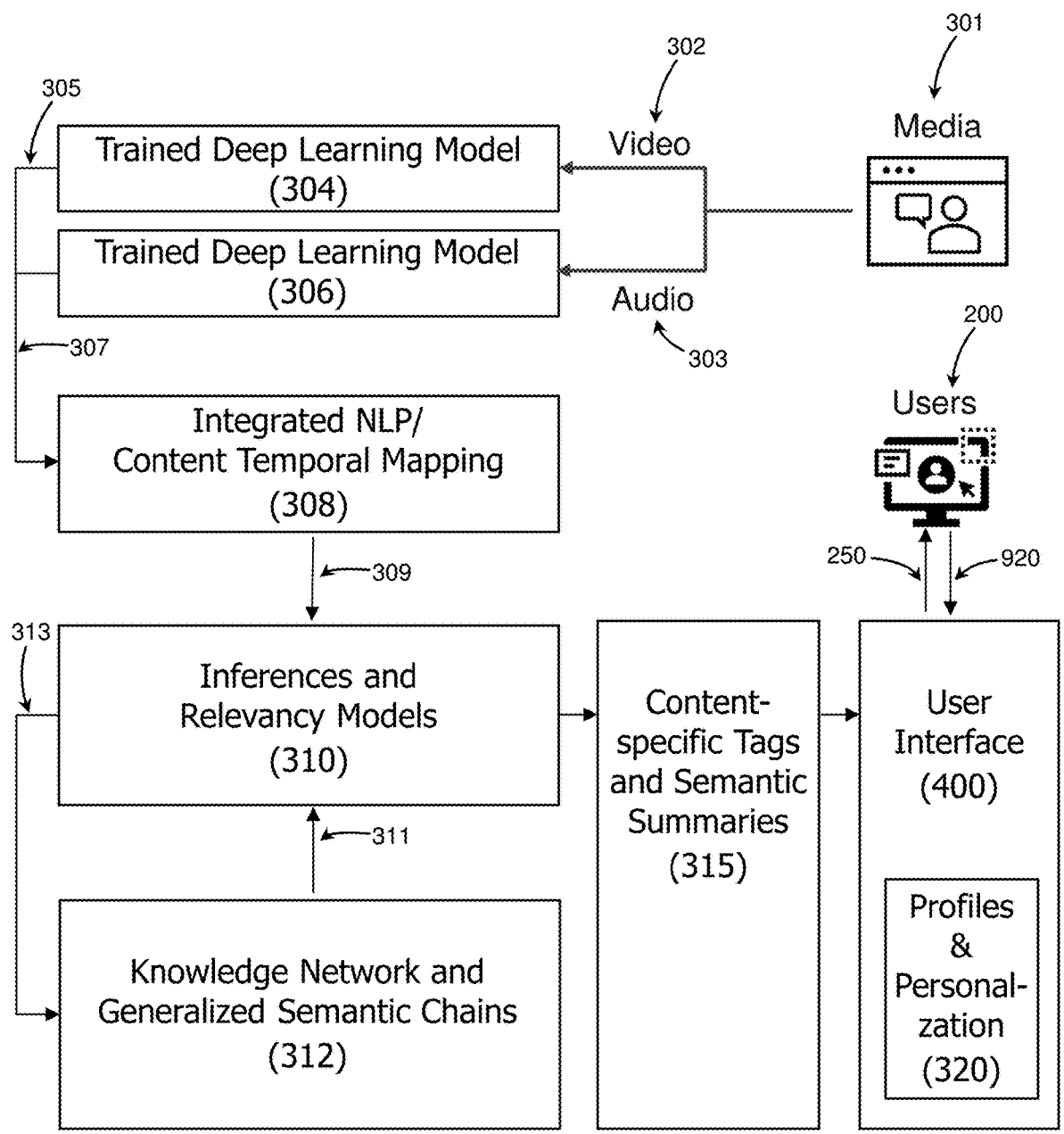
FIG. 15 is a diagram of a semantic-based navigation system directed to temporally sequenced content, according to some embodiments.

In some embodiments, FIG. 15 depicts exemplary computer-based applications 925 that are directed to the interpretation of, and facilitating user navigation and interaction with, temporally sequenced media or content objects 212, 710c such as, but not limited to, video (i.e., an integrated sequence of images) 301. The video may first be segmented by the system into a video stream 302 and an audio stream 303. For audio-only content such as podcasts, the audio-derived processing described below is applicable.

The video stream is interpreted by a deep learning-based system 304, typically based on a convolutional neural network model, but may also apply transformer-based neural networks. Objects within images of the video stream are identified by the trained deep learning-based system 304, which may be trained to identify various categories of objects including physical objects (e.g., trees, baseballs), people and/or subcategories of people such as celebrities, and natural language such as that which is displayed on road signs and billboards, as well as identifying events and abstract concepts. As just one example, the abstract concept of sentiment either expressed by people within the video or inferred from the overall milieu within some or all of the video by the system may be encoded as a natural language-based element. The training may include the identification of motions and movements of objects and relationships among objects, as described herein, as well as associated causal relationships and/or categorization or ontological relationships among objects and events. The deep learning-based system 304 associates each identified object or event with the corresponding time in the video in which the object or event occurs and may associate one or more identified objects and/or events, or relationships among objects and/or events, with natural language-based elements such as one or more semantic chains and may generate corresponding W1, W3 and/or W4 weights associated with the one or more semantic chains. In some embodiments, the natural language may be converted to a mathematical description such as by a vector-based embedding process such as Word2vec, or similar vectorization embedding process, that applies neural networks trained on a corpus of content to generate the vectorized embeddings.

The audio stream is interpreted by a deep learning model 306, typically a variation or an extension of an LSTM-type neural network such as an attention-based model such as a unidirectional or bidirectional transformer. The interpreted audio stream is converted to natural language in a textual format and is mapped to the corresponding time within the video that the item of language occurs. In some embodiments, the natural language may be converted to a mathematical description such as by a vector-based embedding process such as a Word2vec process or similar language-to-vector process. Auxiliary inferences may be made from the audio before or after translation that are embodied as textual-based natural language, such as the inferring of the sentiment of speakers. This may be achieved by processing inferences from, e.g., the intonation and volume levels of speakers and/or from cues in the natural language such as particular words and phrases that correlate with specific emotions. These inferences may be performed by application of neural networks trained directly on audio and/or on language exhibiting sentiment and converting the audio and/or language to vector form.

The temporally mapped natural language elements and/or mathematical constructs such as vector embeddings that are inferred from the image stream of the video, which may comprise semantic chains or equivalent natural language elements and optionally, associated weights or probabilities, are provided 305 to the integrated NLP/content temporal mapping function 308. Likewise, the temporally mapped natural language-based elements, which may be natural language and/or vector-formatted analogs, that are inferred from the audio stream of the video are provided 307 to the integrated NLP/content temporal mapping function 308.

The integrated NLP/content temporal mapping function 308 integrates the natural language-based elements, which may include semantic chains and associated weights and/or embeddings in vector form, on a common content timeline and provides this information 309 to the inferences and relevancy models function 310 to perform further inferences from the temporally integrated image and audio-originating information. These multi-modal inferences by the inferences and relevancy models function 310 may be made with the aid of information provided 311 by the knowledge network and generalized semantic chains function 312, which may comprise a stored corpus of semantic chains and/or a network of parent/child relationships among natural language-based elements, and perform semantic chaining operations to aid in its interpretations and inferences. Some or all of the knowledge network and generalized semantic chains function 312 may be embodied within a graph-based database in some embodiments. Additionally, or alternatively, where the natural language-based elements are in the form of vector embeddings, the embeddings may reflect an underlying multi-modal latent space that has been learned by application of neural networks. For such natural language-based elements in vector form, the inferences and relevancy function may perform vector comparison calculations such as cosine similarity to infer the degree of similarity among the natural language-based elements and/or with respect to other vectors representing known objects or concepts.

The inferences and relevancy models function 310 generates navigational indicators such as tags, which may be considered topics 710t in some embodiments, based upon relevancy scoring models that apply factors that may include lexical factors such as the part of speech a word or sequence of words (noun or verb versus an article, for example) that a word is inferred to be within its context. Identification of parts of speech within their context may be performed by look-up tables and/or by application of vectorized embedding generated by, e.g., transformer-based deep learning models, including bi-directional transformer models. Similarly, identification of phrases comprising metaphors or idioms may be performed by, for example, application of transformer-based neural networks and performing comparisons of the resulting vectors to vectors of known concepts. The commonality of a word or phrase within an item of content in comparison to the frequency of the word or phrase in a corpus of relevant content may be considered by the system through the application of variations of inverse document frequency-based calculations. In addition to the automatically generated image tags, transcript tags, or multi-modal tags, in some embodiments call-to-action ("CTA") tags can be created by a content producer for end users to interact with. Bookmark tags can be created by users 200 to bookmark and label a point in time for their or other users' reference within a video/audio file.

Following is an exemplary scoring process to evaluate natural language elements as candidates for being designated as tags according to some embodiments. Variations of this scoring process can be applied to title-based tags and/or image-based tags, in addition to transcript-based tags. The scores for these candidate tags may be generated independently and/or serve as inputs to a weighting process that generates an overall relevancy level for each candidate tag. Sentiment-based tags may also be generated based on the inferencing of sentiment as described herein and/or serve as a basis for calculating an overall tag relevancy score.

A simple formula of averages can be created to determine the initial scores: InitialScore=SumOfAllScores/CountOfAllScores.

Example: 0.49568=(0.005+0.8533+0.62874)/3

The initial score provides a starting place and then the initial score is adjusted as, e.g., users interact with the tags, by a formula such as:

NewScore=InitialScore+((1−InitialScore)/ComparingScoreWeight)

In the above formula, positive and negative numbers are used for the ComparingScoreWeight to reflect if the score is positive or negative as well as provide the higher scoring tags the benefit of less reduction in value.

An example of adding a bonus to a tag would be:

0.74784=0.49568+((1−0.49568)/2) or 0.5007232=0.49568+((1−0.49568)/100)

An example of adding a penalty to a tag would be:

0.24352=0.49568+((1−0.49568)/(−2)) or 0.4906368=0.49568+((1−0.49568)/(−100))

The criteria for the ComparingScoreWeight is adjustable depending on the weighting desired but in this formula the higher the number the less impact on the new score. This delivers an average calculation that varies depending upon the types of scoring factors applied. Exemplary factors for evaluating natural language elements as candidate tags include:
  number of characters
  number of words
  if it is a proper noun
  if it is a regular noun
  if it is an action verb
  if it is a noun verb combination
  other noun word combinations
  if it is mentioned in the content title or description
  if it already exists as a tag in the system and has a score
  Weight value factors related to user interactions include:
  if it is inferred from the user's profile that the tag is associated with topics of interest to the user (i.e., tag correlates with high MTAV values)
  if the tag is removed by the content owner
  if the tag has been clicked on or reported by an end user
Following is an exemplary scoring for the candidate tag, "Artificial Intelligence," (adjective/noun combination) that resides in a video with the title "Artificial Intelligence vs Human Intelligence."
  It has 23 characters (including spaces) so it has a base score of 0.001 per character which gives it the score of 0.023
  It has 2 words and each word is assigned a base score of 0.01 which gives the score 0.02
  It is not a proper noun so this score does not apply but if it did a base score of 0.1 can be applied
  It does contain a regular noun so it receives the base score for this of 0.08
  It is not an action verb so this score does not get applied, which could have been set to 0.05
  It is not an action verb/noun combination so it will not get the possible base score of 0.06
  It is a noun combination other than action verbs so a possible base score of 0.055 applies
  The candidate tag does appear in the title so a score of 0.3 applies
  This is the first time the candidate tag appears in the system so we there is no score for that factor
  Other factors that can be applied but not included in this exemplary calculation include:
  How many times a candidate tag appears in the transcript
  If the candidate tag is concentrated in one part of the transcript or if it is spread out
  Inverse document frequency-related adjustments that assesses the commonality of terms in a corpus of content
  Applying the above formula for the initial score the exemplary calculations are as follows:

CountOfAllScores=5

SumOfAllScores=0.023+0.02+0.08+0.055+0.3

InitialScore (0.0956)=SumOfAllScores (0.478)/CountOfAllScores (5)

Following are exemplary adjustments to the tag weight based on user interactions. As a first example, assume the content owner removes the tag from their content because it does not seem to apply (this would be a penalty score):

ComparingScoreWeight=PenaltyScore of −50

NewScore (0.077512)=InitialScore (0.0956)+((1−
InitialScore (0.0956))/ComparingScoreWeight
(−50))

Next, assume a user is watching a different video that has this tag and this user is profiled via an MTAV to be interested in the topic corresponding to the tag. The system therefore gives that particular tag a bonus score that would cause the system to preferentially display it to the user (and which does not necessarily get persistently stored in the system so the original value doesn't necessarily change in this case):

ComparingScoreWeight=BonusScore of 60

NewScore (0.0928868)=InitialScore (0.077512)+((1−
InitialScore (0.077512))/ComparingScoreWeight
(60))

Next, assume the user decides that the tag is interesting, so they click on the tag. The system applies a bonus score to that tag in the database (the initial score comes from the system so it was not changed due to the users profile type):

ComparingScoreWeight=BonusScore of 40

NewScore(0.1005742)=InitialScore(0.077512)+((1−
InitialScore (0.077512))/ComparingScoreWeight
(40))

With this initial scoring and user activity the tag went from 0.0956 (or 9.56%) to a final score of 0.1005742 (or 10.05742%), so this example illustrates that even if the content owner thinks the tag is not worthy, an end user could adjust that value based on interaction.

Alternative or augmenting unimodal or multi-modal scoring and weighting processes to generate navigational indicators such as tags may comprise applying vectorized embedding approaches in which elements of natural language are converted to vectors that are generated by a neural network from a training corpus and then compared by applying vector similarity calculations, such as cosine similarity.

Navigational indicators may be generated and organized in multiple levels of semantic summarization. For example, "tags" may be the term applied to the lowest level navigational indicator and comprise just a word or phrase. A next higher level of semantic summarization might be a sentence. Then a next higher semantic level can comprise topics or short paragraphs. At the highest level, a summarization of the content item as a whole or logical segments of the content are generated. At each higher level of semantic summarization, a greater referent temporal span of the content item is covered by the corresponding navigational indicator. The levels of semantic summarization enable users to "zoom-in" and "zoom-out" to facilitate user understanding and navigation of the sequential content as described further herein. An ultimate zoom-out may comprise displaying the clustering of content outside of a specific item of content, depicting the degree of semantic relationship among the content in an overall corpus of content. Neural network-based trained large language models may be applied to generate the elements of the semantic levels and/or through application of semantic chaining processes.

The inferences and relevancy models function 310 may apply considerations of the temporal distance between natural language elements associated with image inferences and inferences from audio to inform or refine multi-modal inferences. For example, everything else being equal, a natural language-based element or semantic chain that is associated with both the audio interpretation and the image interpretation (i.e., a multi-modal interpretation) within a relatively small temporal distance will have a higher relevance score than if the natural language element or semantic chain is associated with only one or the other of the audio interpretation or the image interpretation. The system may apply this factor in evaluating candidate navigational indicators, as well as in search, match, discovery, and categorization operations.

In some embodiments, the inferences and relevancy models function 310 applies a temporally integrated, multi-modal latent space, which is generated by application of a trained neural network that interprets images and temporally coincident audio directly or indirectly (i.e., through conversion to natural language elements first), and then applies vector similarity calculations to the elements of the multi-modal latent space.

The inferences and relevancy models function 310 may apply neural network-based models and/or semantic chaining to generate increasingly sophisticated natural language-based understanding of the contents of the original video 301. These natural language-based elements comprise semantic levels that are mapped to referent temporal periods within the original content so as to be useful as an aid for navigation to specific portions of the original content 301 (i.e., serve as navigational indicators). These temporal periods may be, for example, just a few seconds or they could extend to major segments or chunks of the original content that may be minutes or more in length, or at the highest level, may serve to provide a user a descriptive summary of the originating content as a whole.

The inferences and relevancy models function 310 may communicate 313 inferred semantic chains and associated W1 weightings to the knowledge network and generalized semantic chains function 312, creating a beneficial feedback loop in which learning in the form of semantic chains and associated weightings (or in analogous network-based form) derived from each original content 301 is then available for inferences of additional content that is processed by the inferences and relevancy models function 310.

The inferences and relevancy models function 310 generates finalized navigational indicators such as tags and associated inferential weightings, which together may be considered an OCV or OTAV as described herein. The inferences and relevancy models function 310 then communicates each navigational indicator (such as a tag) and associated OCV or OTAV, and/or other semantic-based structures such as semantic chain-based narratives, along with the associated temporal mappings of the navigational indicators and/or semantic chain-based narratives, as well as identification and metadata information associated with the original content 301, to the content-specific tags and semantic summaries functions 315. Images or short portions of the original content that temporally correspond to the tags and/or elements of the various semantic levels may also be provided to the content-specific tags and semantic summaries functions 315.

The content-specific tags and semantic summaries functions 315 may include a graph database as a primary storage means, but other SQL, noSQL-based database, and/or vector database structures may supplement or substitute for the graph-based database to optimize performance for various functions such as searching for, and matching, content. Temporal-based hashing functions may be applied to generate a temporal-based hash to support fast access to, and retrieval of, content elements at specific periods of time. Indexing to enhance performance of retrieval of temporal-based or other hashes may be applied as required, using B+tree indexing, for example. Vector database-specific indexes such as HNSW, and potentially in combination with inverted indexes to enable both conceptual-level searching and matching in combination with traditional search and matching, may be applied in some embodiments.

The information stored in content-specific tags and semantic summaries functions 315 is accessed by the user interface 400 which applies the information to deliver a user interface 400a to the user 200. The temporally-mapped navigational indicators such as tags and natural language-based semantic summaries and narratives, along with any corresponding images that are provided, can be considered in some embodiments as adaptive recommendations 250 as described herein.

The user interface 400 may include a profiling and personalization function 320 that enables the delivered navigational indicators and other output that are delivered to a user 200 to be personalized by applying personalization weights based on user behaviors so as to be of expected maximum relevance to the user 200. The profiling of users may be based upon, but not limited to, the behaviors described in Table 1 and the associated descriptions, and inferred user interests and/or preferences may be encoded as MTAVs as described herein. As just one example of such personalization that may be performed by the user interface 400, for a user 200 that the system is aware has spent significant time in the past viewing portions of baseball videos in which home runs are hit, the system may increase the relevancy weighting of the tags and/or semantic summaries associated with inferred home runs and preferentially display those tags, narratives, and/or images to the user for convenient navigation to the associated portion of the original content 301. The system may also make collaborative filtering-based inferences of a user's inferences and preferences by comparing the user's MTAV and/or MTEV with those of others and weighting the relevancy of content for the user based on its inferred interest to other users with relatively similar MTAVs and/or MTEVs. The system may also infer sentiment from user interactions with content which may be applied in personalization by comparing to sentiment-related values on a user's MTAV.

The profiling and personalization function 320 may encode user behavioral information as behavioral-based chains as described herein. The behavioral chains may be applied to deliver explanations to the user to facilitate navigation to relevant portions of content. For example, in the example above, the system may generate a communication 250c to the user that explains to the user 200 that the system has noticed that the user has seemed to be particularly interested in home runs, and that the system has specially tagged the home runs for the user in this video. Or the system might just provide an audio-based explanation and direct the user to navigate to a specific time in the video to see a home run, or instead, simply then automatically display that portion of the video to the user or highlight a specific physical object or event within one or more images of the videos for the user 200.

The user interface function includes capabilities for performing unimodal or multi-modal search, match, discovery, and categorization requests and retrievals, the results of all of which can be considered as variations of adaptive recommendations 250, and all of which can be performed with or without the application of personalization weightings based on user behaviors. Search is defined as a function that takes a natural language-based element (one or more words or phrases, including a full interrogative, or an embedded vector thereof) or an image (or an embedded vector thereof) as an input and returns items of content of sufficient relevancy to the user. In some embodiments, for each video returned by the search function, the search function indicates the degree of similarity or relevance that the system calculates with respect to finding relevant language in the transcript of the audio of the video, within the title or other metadata of the video, and/or objects or events within the images within the video, as well as an overall relevance score that is calculated from the individual relevancy scores. This detailed relevancy information provides the user 200 additional information to facilitate choosing which of the videos displayed in the search response to view in more detail. Search can be conducted for inferred sentiment in a video independently or in combination with other search inputs. For example, a user 200 may wish to search for the term "home run" in a corpus of sports videos and is particularly interested in video clips in which a home run occurs for which there is significant excitement because the user wants to apply that in some other content the user is creating, and so inputs both "home run" and "excitement." In this case the system would search for images related to home runs and would conduct sentiment analysis on the accompanying language expressed at coincident time periods in the video and/or analyze the audio for expressions of excitement. The relevance of candidate content in response to the search request is then generated based upon the weighting (e.g., W3 weight) of the image and the degree to which the sentiment of excitement is also inferred from the transcript and/or raw audio at temporally coincident periods.

Match is defined as a function that takes one or more items of content (or segments of content) as an input and returns other items of content of sufficient relevancy to the user. In some embodiments, for each video and/or video subset returned by the match function, the match function indicates the degree of similarity or relevance the system calculates with respect to finding relevant language within the transcript of the audio of the video, within the title or other metadata of the video, overall sentiment of the video or within matching subsets of the video (via the inferred similarity of images and/or transcript language), and/or objects or events within the images within the video, as well as an overall relevance score. This relevancy information provides the user 200 additional information to facilitate choosing which of the videos displayed in the match response to view in more detail. When the user selects a video or video subset of interest from the match response, the match function may display additional details related to matching analytics such as displaying the specific language in the title that the system determined was relevant, the specific language in the transcript that the system determined was relevant, and specific images that the system determined were relevant. The calculated degree of relevancy for each of the title, transcript, and images may also be displayed to the user.

Discovery is defined as essentially an unprompted match based upon a specific navigational context (such as viewing a particular video) or without a specific context and relying on just the user's MTAV and/or MTEV to surface relevant content. Categorization comprises a function that generates affinities among content (i.e., a CCAV as described herein) and can be directly invoked by the user for manually forming and saving categorized content or can be the result of a search or a match or can be performed automatically by the system through, for example, nearest neighbor-based techniques. For performance purposes, CCAVs related to categorizations, including to support real-time content matching functions, may be generated by preprocessing functions.

In some embodiments search and/or match functions apply the following algorithmic processes, that include sorting, filtering, scoring, and applying weight values, including personalization weightings. Search may be conducted against a graph or vector database and/or may be performed on auxiliary data structures, in accordance with required performance levels. Furthermore, search may be performed against navigational indicators such as tags or higher-level navigational structures such as semantic narratives or summaries, or against the original transcript, and potentially against title and other metadata, in accordance with desired functionality and performance. In addition to the search term that a user wishes the system to positively match, the user can optionally apply negative terms to filter out content matching the negative terms.

Searches may be performed specifically for images in the content or specifically for spoken language (or inferences thereof such as sentiment) in the content or for both, as well as language within metadata such as the title of a video. The search function may apply weighting factors such as, but not limited to, wholeDensityWeight, partDensityWeight, distanceWeight, levenshteinWeight, jaroWinklerWeight and sorensenWeight, which may be automatically adjusted by the system. Metaphones and soundexes are applied to find words that sound like the search terms which are then sorted out by score. To further limit the result set, the system may apply have a special match pattern, for example: (sw0: SpokenWord)–[:PRECEDES*1 . . . 3]–(sw1: SpokenWord), which specifies that the system not look for randomly sequenced words but instead words that are in a certain order. The system looks for matches that have any combination of the given words in any order but not separated by, for example, more than three PRECEDES relationships.

In some embodiments, scores of the weighting factors described and their associated applied weights are added and normalized to a resulting score in the [0,1] continuum. Following is a simple, non-limiting, example of applying just two weights:

$$densityScore=12\%(individual\ score)*2(weight\ value)=24\% \text{ and} \quad (1)$$

$$soundsLikeScore=90\%(individual\ score)*1(weight\ value)=90\%, \quad (2)$$

with the resulting calculation being: (24+90)/(2+1)= (114)/(3)=38%.

In other embodiments, searching, matching, and categorization is performed through the comparison of numeric representations of natural language-based elements input by a user and the target content corpus, such as by application of vectorized embeddings generated by trained neural networks and the application of vector similarity calculation methods such as cosine similarity to determine the distance between the user input and elements of the target content items. In some embodiments relevancy-based tuning controls, such as a slider bar, enables a user to display more or fewer search, match, or discovery results based upon their overall relevancy scores, and/or the relevancy scores of individual targets such as titles, transcripts, and images.

The user interface 400 also includes capabilities for users to share content, which may include personalized navigational indicators such as tags. The shared content may include integrated segments from multiple independent media instances that can be achieved by applying several different approaches as described as follows. An objective is to have a series of videos that have different start and end points identified and have them play in the TagStream Player seamlessly as if they were a single video, as well as incorporating the transcript and tags for each video segment. In some embodiments, the TagStream Player is built on the HTML5 video element and applies a combination of CSS3 and JavaScript.

The general approach is that the start and end time setting is designated by the "src" parameter. This setting informs the customized Tagstream Player the video that is going to be used and the start/end times to play the video. A progress bar is applied that is consistent with start/end times. The "ended" event parameter is applied to inform the system that a video's progress has reached the end of the intended point so that a different streaming source can be dynamically appended. Custom controls are provided to get the timing in synchronization with the selected videos. The videos to be appended are preloaded while the user is watching a preceding video to avoid sudden buffering and loading.

With the above as a starting point, several alternative approaches can be applied to achieve the objective. The first approach is a time conversion-based loading method. This method communicates to the player that there are N number of video clips to play and in what order to play them in. The system then resets the timing to creating custom progress controls using, for example, JavaScript. For example, assume a user 200 selects the following three videos:

a. vidA.mp4 at times 1:00 to 3:00 (2 min)
   b. vidB.mp4 at times 4:00 to 15:00 (11 min)
   c. vidC.mp4 at times 2:30 to 4:30 (2 min)

The total times are summed by the system, which in this case equals 15 minutes total. The system then creates a conversion that displays to the user a correct timeline, but while streaming it also communicates to the player which video to play and at what time to set the stream to.

An alternative approach applies the custom progress bar of the previous option, but handles the streaming a bit differently. CSS has the ability to hide and show elements rather nicely with little hiccups which comes in handy. The system can use this method to embed multiple video players inside the player which can be set to pre-load the videos but only show to one that the custom progress bar says to. Referring to the same example of three videos above, in this case the system loads three video players on the user's computer at the same time and only shows the first one at the start. When the video gets to a transition it triggers a JavaScript function to hide the current player and show the correct one. This also occurs when the user manipulates the progress bar on their own. This approach resolves the problem of buffering transitions between each video transition solve and facilitates analytics that are used by personalization features and producer-side management in some embodiments. A third approach is to control streaming by server-side code. This approach requires a full streaming method within the system 925 that can manipulate and switch between files based on buffering and network capabilities. This enables the client-side player to remain simpler and is only provided one source. The source contains a unique ID to the custom snippet that is generated and the system knows which videos to stream and at what times. The player only knows that there is one source that has a linear timeline. Custom code is required to piggyback onto the adaptive bitrate streaming software that is applied, to inform it of the video files and the required time periods in each video file to be displayed.

Figure 16:
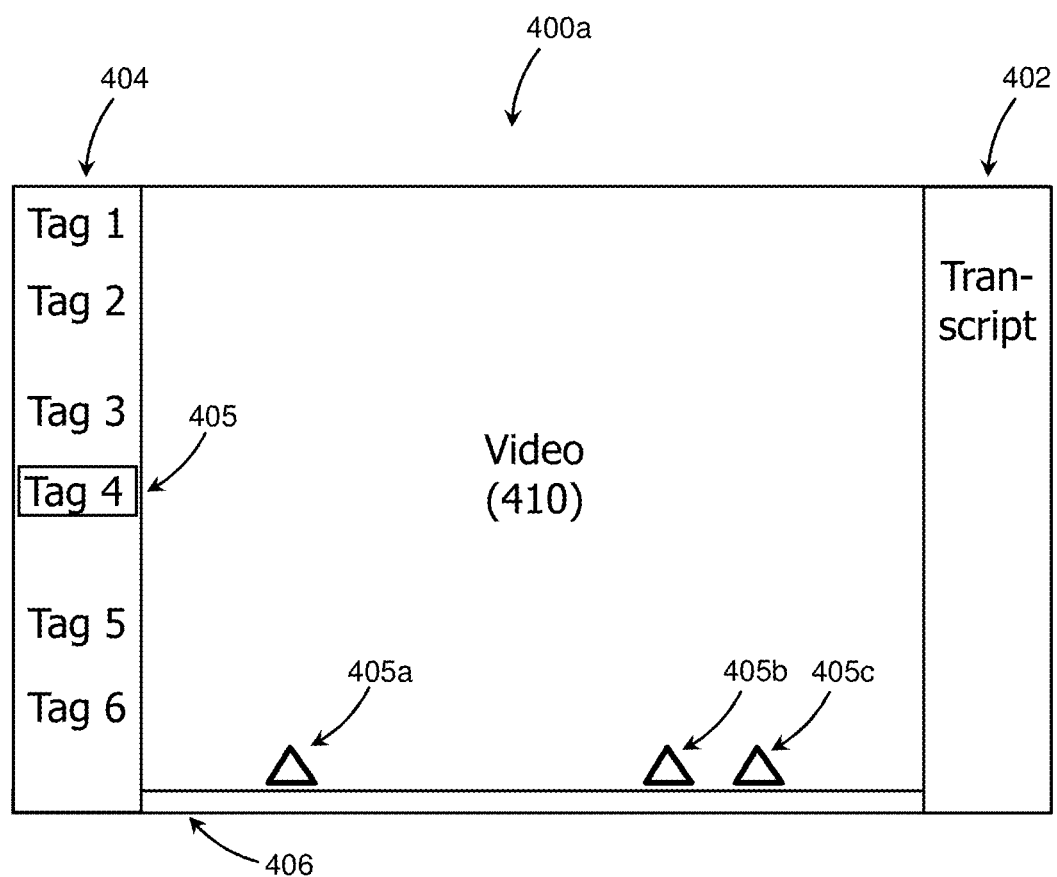
FIG. 16 depicts an exemplary user interface of the semantic-based navigation system of FIG. 15, according to some embodiments.

FIG. 16 depicts an exemplary embodiment 400a of the user interface 400 of FIG. 15. A portion of the user's screen displays a video 410. A text transcript of the audio portion of the video is streamed 402 by the system in synchronization with the video stream 410. Navigational indicators, in this case displayed tags, generated by the content-specific tags and semantic chain functions 315 are provided to a user 404. Image tags and transcript-derived tags may be differentiated for the user, by for example using different colors. The user may select a tag 405, which then invokes a function to display indicators 405a, 405b, 405c of the times within the video for the tags apply. The user may then select a tag indicator such as 405a and the system then displays that portion of the video to the user and/or highlights specific objects or events in the video that the tag corresponds to. The navigational indicators 405a, 405b, 405c may be displayed proximate to the progress bar as shown in FIG. 16 in some embodiments, but other arrangements are possible. In some embodiments, captions are displayed that may constitute tags 404 or the transcript 402 and the user can select specific tags or elements of the transcript the system will navigate to relevant images of the video and highlight for the user's attention using, for example, bounding boxes, relevant objects, events, or abstractions depicted within the images. In some embodiments, a zoom-in/zoom out feature that can be invoked by, for example, a slider bar-type tuning control, enables the user 200 to display in the tag display area 404 or elsewhere on the user interface 400a, detailed tags at maximum zoom-in, and then the user 200 can move up the levels of semantic or conceptual abstraction by decreasing the zoom to less granular tags, then to, for example, topic-level descriptions, then to, for example, summary narratives of segments of the video, and at maximum zoom-out, a narrative summary of the video as a whole. The user 200 is able to invoke the match function with respect to a navigational indicator at any of these semantic levels, which will take as input for the match comparison with other content, the navigational indicator itself or the referent subset of the video that the navigational indicator temporally corresponds to.

The navigational indicators most generally constitute adaptive recommendations 250 or adaptive communications 250c. The user 200 when selecting a navigational indicator 405 may prompt the system to provide more detailed adaptive communications 250c related to the tag to facilitate the user's understanding of the corresponding portion of the video before the user navigates and consumes that portion of the video. The adaptive communications 250c may include portions of one or more images of the video as part of the explanation, such as portions related to individual objects in the video or specific events. In some embodiments, relevancy-based tuning controls, such as a slider bar, enables a user to display more or fewer navigational indicators 404, within or across semantic levels, based upon their relevancy scores.

In some embodiments, the user interface 400a may be integrated with a content analytics function that tracks usage behaviors, including but not limited to the behaviors and categories described by Table 1, such that a user 200 can invoke the content search or match function to find other content elements in a corpus of content that have similar inferred characteristics to the content element that the analytics function indicates is of interest, such as a content element that generates an unusually high level of engagement by users. Or the analytics function can be applied to automatically identify content elements in a corpus of content that are of interest; e.g., that have particularly high user engagement or otherwise exhibit metrics of interest or value, and then apply semantic inferencing to determine common imagery and/or thematic elements or concepts among these identified content elements. The semantic inferencing can be performed by comparing vectorized embeddings of the identified content elements and/or by means of semantic chaining techniques.

Computing Infrastructure

Figure 13:
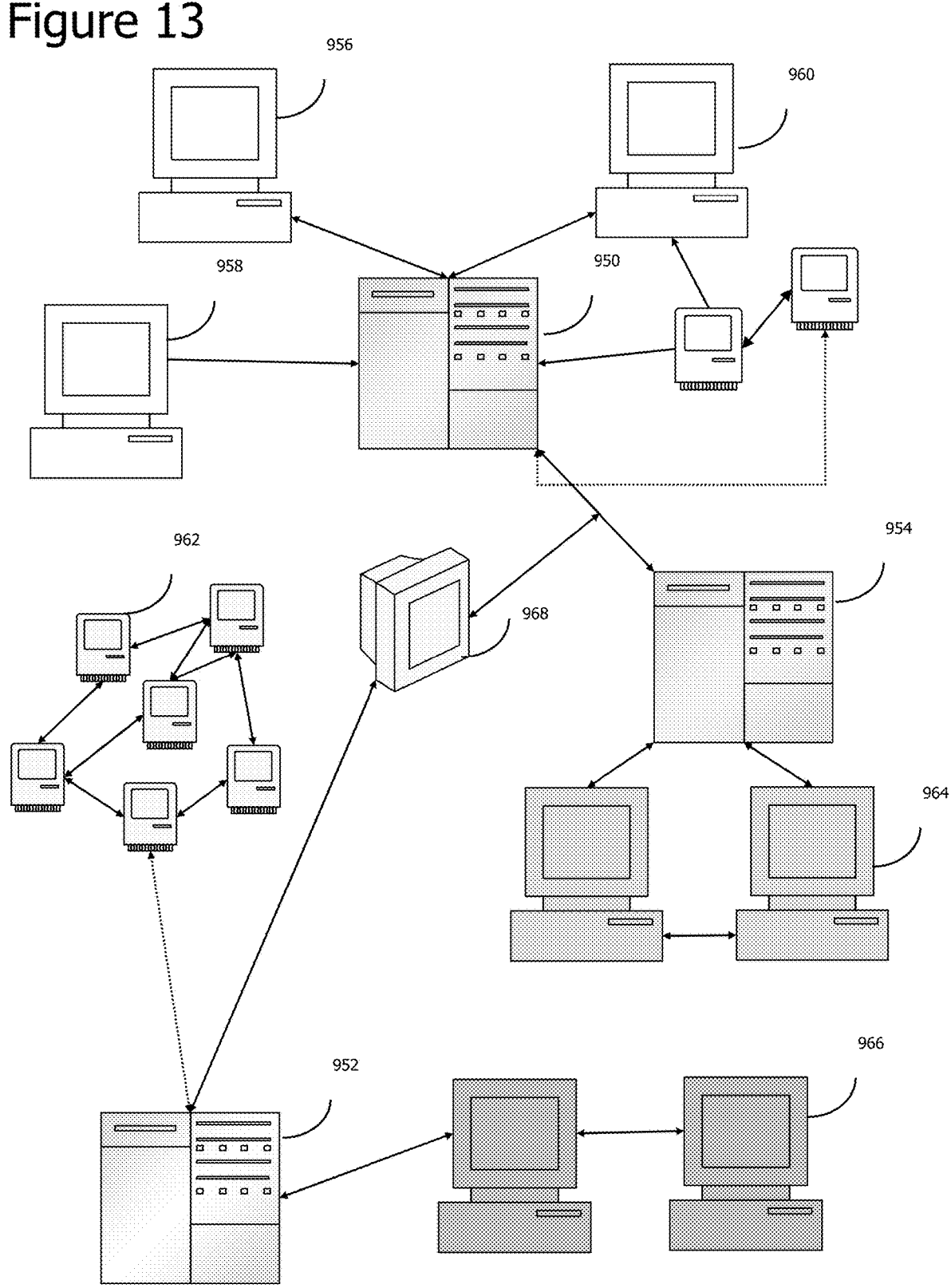
FIG. 13 is a diagram of various computing device topologies, according to some embodiments.

FIG. 13 depicts various processor-based computer hardware and network topologies on which the one or more of the computer-based applications 925, and by extension, adaptive system 100, may be embodied and operate. One or more processors of the computing hardware may be configured to execute the computer-based applications 925 individually or collectively. In some embodiments the one or more processors may be cognitive computing or neurosynaptic-based processors.

Servers 950, 952, and 954 are shown, perhaps residing at different physical locations, and potentially belonging to different organizations or individuals. A standard PC workstation 956 is connected to the server in a contemporary fashion, potentially through the Internet. It should be understood that the workstation 956 can represent any processor-based device, mobile or fixed, including a set-top box or other type of special-purpose device. In this instance, the one or more computer-based applications 925, in part or as a whole, may reside on the server 950, but may be accessed by the workstation 956. A terminal or display-only device 958 and a workstation setup 960 are also shown. The PC workstation 956 or servers 950 may embody, or be connected to, a portable processor-based device (not shown), such as a mobile telephony device, which may be a mobile phone or a personal digital assistant (PDA), or a wearable device such as a "smart watch." The mobile telephony device or PDA may, in turn, be connected to another wireless device such as a telephone or a GPS receiver. As just one non-limiting example, the mobile device may be a gesture-sensitive "smart phone," wherein gestures or other physiological responses are monitored, either through actual physical contact between the device and a user or without physical contact, by means of, for example, a touch screen and/or through a camera, or other sensor apparatus and associated circuitry. The sensor apparatus may include devices with that monitor brain patterns and/or other physiological processes and conditions. The sensor apparatus may operate within a human body, in accordance with some embodiments. The mobile device may include hardware and/or software that enable it to be location-aware and may embody a camera and/or sensors that enable the monitoring of environmental conditions such as weather, temperature, lighting levels, moisture levels, sound levels, and so on.

FIG. 13 also features a network of wireless or other portable devices 962. The one or more computer-based applications 925 may reside, in part or as a whole, on all of the devices 962, periodically or continuously communicating with the central server 952, as required. A workstation 964 connected in a peer-to-peer fashion with a plurality of other computers is also shown. In this computing topology, the one or more computer-based applications 925, as a whole or in part, may reside on each of the peer computers 964.

Computing system 966 represents a PC or other computing system, which connects through a gateway or other host in order to access the server 952 on which the one or more computer-based applications 925, in part or as a whole, reside. An appliance 968 includes executable instructions "hardwired" into a physical device, such as through use of non-volatile memory or "firmware," and/or may utilize software running on another system that does not itself host the one or more computer-based applications 925, such as in the case of a gaming console or personal video recorder. The appliance 968 is able to access a computing system that hosts an instance of one of the computer-based applications 925, such as the server 952, and is able to interact with the instance of the system.

The processor-based systems on which the one or more computer-based applications 925 operate may include CPUs, GPUs, and/or other hardware that are optimized for executing the neural network-based applications, including processing chips optimized for vector processing and comparisons. The one or more computer-based applications 925 may include hardware and/or software such as cameras and associated circuitry that enable monitoring of physiological responses or conditions such as gestures, body movement, gaze, heartbeat, brain waves, temperature, blood composition, and so on. The processor-based systems may include sensors and associated circuitry that enable sensing of environmental conditions such as weather conditions, sounds, lighting levels, physical objects in the vicinity, and so on. Microphones and speakers and associated circuitry for receiving and delivering audio-based communications may be included in the computer-based applications 925.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A computer-implemented method comprising:
accessing a video comprising a plurality of sequential images and accompanying audio;
interpreting automatically a plurality of objects within the plurality of sequential images by application of a computer-implemented neural network;
generating automatically a natural language-based interpretation of each of the plurality of objects;
interpreting automatically natural language within the accompanying audio;
integrating automatically in alignment with their temporal positioning within the video the natural language-based interpretation of each of the plurality of objects and the interpretation of the natural language in the accompanying audio into temporally integrated natural language-based elements;
performing automatically multi-modal inferences on the temporally integrated natural language-based elements by applying at least one trained computer-implemented neural network to the temporally integrated natural language-based elements, wherein the at least one trained computer-implemented neural network is applied to infer one or more causal relationships among the plurality of objects;
generating automatically one or more navigational indicators that each comprise a plurality of syntactical elements that are generated by applying a trained computer-implemented neural network and performing a plurality of attentions, wherein each of the one or more navigational indicators corresponds to a temporal position in the video based upon results of performing automatically the multi-modal inferences on the temporally integrated natural language-based elements, wherein at least one of the each of the plurality of syntactical elements describe the inferred one or more causal relationships; and
providing the navigational indicators in association with the video to facilitate user navigation of the video.

2. The method of claim 1, further comprising:
interpreting automatically the plurality of objects within the plurality of images by application of the computer-implemented neural network, wherein the computer-implemented neural network comprises a convolutional neural network.

3. The method of claim 1, further comprising:
performing automatically the multi-modal inferences by performing a vector similarity calculation on the temporally integrated natural language-based elements that comprise vector embeddings.

4. The method of claim 1, further comprising:
performing automatically the multi-modal inferences by performing sentiment analysis on the temporally integrated natural language-based elements.

5. The method of claim 1, further comprising:
performing automatically the multi-modal inferences that comprise inferring the one or more causal relationships among the plurality of objects, wherein the one or more causal relationships are inferred by applying semantic chaining, wherein the semantic chaining comprises evaluating a plurality of candidate causal chains;
selecting at least two of the plurality of candidate causal chains based on the evaluation; and
linking the at least two of the plurality of the candidate causal chains.

6. The method of claim 1, further comprising:
generating automatically the navigational indicators, wherein the navigational indicators are generated in accordance with personalization weights that are based on user behaviors.

7. The method of claim 1, further comprising:
generating automatically the navigational indicators corresponding to the temporal positions in the video, wherein the navigational indicators are organized in a plurality of levels of semantic summarization; and
displaying, responsive to a command by the user, a navigational indicator at a different level of semantic summarization than is currently displayed.

8. A computer-implemented system comprising one or more processor-based devices configured to:
access a video comprising a plurality of sequential images and accompanying audio;
interpret automatically a plurality of objects within the plurality of sequential images by application of a computer-implemented neural network;
generate automatically a natural language-based interpretation of each of the plurality of objects;
interpret automatically natural language within the accompanying audio;
integrate automatically in alignment with their temporal positioning within the video the natural language-based interpretation of each of the plurality of objects and the interpretation of the natural language in the accompanying audio into temporally integrated natural language-based elements;
perform automatically multi-modal inferences on the temporally integrated natural language-based elements by applying at least one trained computer-implemented neural network to the temporally integrated natural language-based elements, wherein the at least one trained computer-implemented neural network is applied to infer one or more causal relationships among the plurality of objects;

generate automatically one or more navigational indicators that each comprise a plurality of syntactical elements that are generated by applying a trained computer-implemented neural network and performing a plurality of attentions, wherein each of the one or more navigational indicators corresponds to a temporal position in the video based upon results of performing automatically the multi-modal inferences on the temporally integrated natural language-based elements, wherein at least one of the each of the plurality of syntactical elements describe the inferred one or more causal relationships; and provide the navigational indicators in association with the video to facilitate user navigation of the video.

9. The system of claim 8, further comprising the one or more processor-based devices configured to:

interpret automatically the natural language within the accompanying audio, wherein the interpretation of the natural language is performed by a transformer-based computer-implemented neural network.

10. The system of claim 8, further comprising the one or more processor-based devices configured to:

perform automatically the multi-modal inferences by performing a vector similarity calculation on the temporally integrated natural language-based elements that comprise vector embeddings.

11. The system of claim 8, further comprising the one or more processor-based devices configured to:

perform automatically the multi-modal inferences by performing sentiment analysis on the temporally integrated natural language-based elements.

12. The system of claim 8, further comprising the one or more processor-based devices configured to:

perform automatically the multi-modal inferences that comprise inferring the one or more causal relationships among the plurality of objects, wherein the one or more causal relationships are inferred by applying semantic chaining, wherein the semantic chaining comprises evaluating a plurality of candidate causal chains;

selecting at least two of the plurality of candidate causal chains based on the evaluation; and linking the at least two of the plurality of the candidate causal chains.

13. The system of claim 8, further comprising the one or more processor-based devices configured to:

generate automatically the navigational indicators, wherein the navigational indicators are generated in accordance with personalization weights that are based upon user behaviors.

14. The system of claim 8, further comprising the one or more processor-based devices configured to:

generate automatically the navigational indicators corresponding to the temporal positions in the video, wherein the navigational indicators are organized in a plurality of levels of semantic summarization; and display, responsive to a command by the user, a navigational indicator at a different level of semantic summarization than is currently displayed.

15. A computer-implemented system comprising one or more processor-based devices configured to: access a video comprising a plurality of sequential images and accompanying audio; interpret automatically a plurality of objects within the plurality of sequential images by application of a computer-implemented neural network;

generate automatically a natural language-based interpretation of each of the plurality of objects;

interpret automatically natural language within the accompanying audio;

integrate automatically in alignment with their temporal positioning within the video the natural language-based interpretation of each of the plurality of objects and the interpretation of the natural language in the accompanying audio into temporally integrated natural language-based elements;

perform automatically multi-modal inferences on the temporally integrated natural language-based elements by applying at least one trained computer-implemented neural network to the temporally integrated natural language-based elements, wherein the at least one trained computer-implemented neural network is applied to infer one or more causal relationships among the plurality of objects;

responsive to an input by a user, generate automatically an output that is in accordance with comparing the input with results of performing automatically the multi-modal inferences on the temporally integrated natural language-based elements, wherein the results include the inferred one or more causal relationships and the output comprises a plurality of syntactical elements that describe the inferred one or more causal relationships, wherein the plurality of syntactical elements are generated by applying a trained computer implemented neural network and performing a plurality of attentions; and provide the output to the user.

16. The system of claim 15, further comprising the one or more processor-based devices configured to:

perform automatically the multi-modal inferences by performing a vector similarity calculation on the temporally integrated natural language-based elements that comprise vector embeddings.

17. The system of claim 15, further comprising the one or more processor-based devices configured to:

generate automatically the output, wherein the input comprises natural language directly input by the user.

18. The system of claim 15, further comprising the one or more processor-based devices configured to:

generate automatically the output, wherein the output comprises a subset of the video that is in accordance with a temporal position within the video that corresponds to the temporally integrated natural language-based elements.

19. The system of claim 15, further comprising the one or more processor-based devices configured to:

generate automatically the output, wherein the output is in accordance with personalization weights that are based upon user behavioral information.

* * * * *